United States Patent
Lee et al.

(10) Patent No.: US 10,961,983 B2
(45) Date of Patent: Mar. 30, 2021

(54) BLADE TRANSPORT VEHICLE

(71) Applicant: DOOSAN HEAVY INDUSTRIES CONSTRUCTION CO., LTD., Gyeongsangnam-do (KR)

(72) Inventors: Sung Rae Lee, Gyeonggi-do (KR); Ki Hak Lee, Gyeonggi-do (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 382 days.

(21) Appl. No.: 15/417,103

(22) Filed: Jan. 26, 2017

(65) Prior Publication Data
US 2017/0267149 A1 Sep. 21, 2017

(51) Int. Cl.
*B60P 7/12* (2006.01)
*F03D 13/40* (2016.01)
*B60P 3/40* (2006.01)
*B61D 45/00* (2006.01)
*B61D 3/16* (2006.01)
*B62D 33/02* (2006.01)

(52) U.S. Cl.
CPC ............ *F03D 13/40* (2016.05); *B60P 3/40* (2013.01); *B60P 7/12* (2013.01); *B61D 3/16* (2013.01); *B61D 3/166* (2013.01); *B61D 45/003* (2013.01); *B62D 33/0207* (2013.01)

(58) Field of Classification Search
CPC ......... F03D 13/40; B61D 45/003; B61D 3/16; B61D 3/166; B60P 7/12; B60P 3/40; B62D 33/0207
USPC .................... 410/32, 33, 36, 42, 44, 45, 120
See application file for complete search history.

(56) References Cited

U.S. PATENT DOCUMENTS

| | | | | |
|---|---|---|---|---|
| 9,221,379 B2* | 12/2015 | Randall | | B60P 3/40 |
| 2009/0274529 A1* | 11/2009 | Broderick | | B60P 3/40 |
| | | | | 410/45 |
| 2012/0114443 A1* | 5/2012 | Cyrus | | B60P 3/40 |
| | | | | 410/44 |
| 2012/0124833 A1* | 5/2012 | Arendt | | F03D 13/10 |

FOREIGN PATENT DOCUMENTS

| | | |
|---|---|---|
| DE | 102012020233 A1 | 4/2014 |
| JP | 4048540 B2 | 2/2008 |
| KR | 101292293 B1 | 8/2013 |
| KR | 10-1564849 B1 | 11/2015 |
| KR | 101593222 B1 | 2/2016 |
| WO | 2010115964 A2 | 10/2010 |
| WO | 2010135737 A1 | 11/2010 |

OTHER PUBLICATIONS

An extended European search report issued by the European Patent Office dated Jul. 18, 2017 in connection with European Patent Application No. 17157041.9.
Korean Office Action issued by the Korean Patent Office dated Feb. 16, 2017 for Korean Patent Application No. 10-2016-0030986.

* cited by examiner

*Primary Examiner* — Stephen T Gordon
(74) *Attorney, Agent, or Firm* — Invenstone Patent, LLC

(57) ABSTRACT

Disclosed herein is a blade transport vehicle which includes a base, a blade fixing frame disposed on the base, a first moving device disposed at an upper end of the base to move the blade fixing frame in a longitudinal direction of the base, and a second moving device disposed at an upper end of the first moving device to move the blade fixing frame in a width direction of the base.

17 Claims, 53 Drawing Sheets

Related art

Related art

A

BLADE TRANSPORT VEHICLE

CROSS-REFERENCE(S) TO RELATED APPLICATIONS

This application claims priority to Korean Patent Application Nos. 10-2016-0030986, filed on Mar. 15, 2016, 10-2016-0030989, filed on Mar. 15, 2016, 10-2016-0030992, filed on Mar. 15, 2016, 10-2016-0030995, filed on Mar. 15, 2016 and 10-2016-0030999, filed on Mar. 15, 2016, the disclosures of each of which are incorporated herein by reference in their entirety.

BACKGROUND

Exemplary embodiments of the present disclosure relate to a blade transport vehicle.

Wind power equipment such as a wind turbine is an eco-friendly power generation facility which converts rotational energy by wind into electric energy, and is provided as a part of renewable energy projects that have been in the spotlight in these days in which the need for global environmental protection is magnified.

The wind power equipment may be largely classified into a nacelle and a tower. Among them, the nacelle is configured such that a plurality of blades rotated by wind is mounted circumferentially at predetermined intervals to a hub and a drive shaft of a rotor is connected to the center of the hub. When the blades are rotated by wind, rotational energy is transferred to the rotor. In this case, a generator connected to the rotor is built in the nacelle. The generator converts rotational energy into electric energy according to the rotation of the rotor.

The blades play a large role in the wind power generation. In order to transport the blades to the installation region of the wind turbine, a blade transport vehicle is used as illustrated in FIG. 1.

The blade transport vehicle mainly includes a lower trailer 8, a hydraulic cylinder 3, a fixed frame 4, a slewing bearing unit 5, and a blade adapter 6.

First, the lower trailer 8 is configured such that a plurality of wheels is arranged in multiple rows in a main body. The lower trailer 8 serves to distribute the load of each blade 7 and stably transport the blade 7. Support beams 2 are disposed at both sides of the lower trailer 8. The support beams 2 are extended to both sides of the lower trailer 8 in the width direction thereof by a hydraulic device and come into contact with the ground in order to move the blade 7 after the transport vehicle is stopped, thereby serving to support the load applied to the transport vehicle due to the load of the blade 7. Of course, the support beams 2 are separated from the ground by the hydraulic device while the transport vehicle is traveling.

The fixed frame 4 is disposed at the upper end of the lower trailer 8. The fixed frame 4 has a pair of columns disposed at the upper end of the lower trailer 8, and the hydraulic cylinder 3 is connected by a hinge between the columns. The end of the rod of the hydraulic cylinder 3 is connected by a hinge to the lower end of a bearing block 5b of the slewing bearing unit 5.

When the rod of the hydraulic cylinder 3 is extended by the operation of the hydraulic cylinder 3, the angle of the bearing block 5b is changed. Thus, the angle of the blade 7 is adjusted by a slewing bearing 5a mounted to the bearing block 5b and the blade adapter 6 which is integrally and rotatably coupled to the slewing bearing 5a. FIG. 1 illustrates the state in which the angle of the blade 7 is adjusted by the operation of the hydraulic cylinder 3 when compared to FIG. 2.

Here, the slewing bearing 5a is rotatably mounted to the bearing block 5b by a turning drive 5c disposed on the bearing block 5b. When a user operates the turning drive 5c to rotate the blade 7, the blade adapter 6 bolted to the slewing bearing 5a rotates along with the rotation of the slewing bearing 5a engaged with the turning drive 5c, thereby adjusting the angle of rotation of the blade 7.

However, when the ground on which the blade transport vehicle is stopped is inclined or the blade transport vehicle goes around a curve or ascends or descends a slope, there is always a risk that the vehicle overturns due to the blade 7 having a weight of several tens of tons.

The blade transport vehicle may not respond properly to such a situation since the user merely adjusts the vertical angle of the blade 7 using the hydraulic cylinder 3.

In addition, unexpected incidents may occur when the blade transport vehicle 1 travels. When the vehicle transports the large blade 7 having a weight of several tens of tons, the vehicle may not smoothly travel or overturn in special cases due to the motion and load of the blade 7 by the state of the ground or the effect of wind.

The blade 7 used for wind power generation has a curved cross section. Accordingly, it is possible to obtain power by rotating the rotor while the blade rotates in one direction by wind. However, due to the shape of the blade, when wind is blown to the blade 7 while the vehicle travels on the road, the blade 7 is greatly affected by the direction of wind depending on the arrangement of the blade 7 toward the wind, and thus the vehicle shakes. Hence, the vehicle may lean in the direction opposite to the wind. Of course, the rolling of the blade 7 may be caused by wind having strong velocity, which may lead to deterioration of coupling force with the blade adapter 6 or the abrasion and damage of the blade adapter 6.

In addition, the center of gravity of the vehicle may be unbalanced depending on the arrangement of the blade 7 even when the vehicle travels on the slope. For this reason, since a large load is applied to the specific wheel of the lower trailer 8 by the excessive weight of the blade while the vehicle is traveling, the vehicle may also overturn.

In addition, when the blade transport vehicle 1 travels in a sharp curve section or on a slope or passes through a tunnel or a pedestrian overpass, the blade transport vehicle may restrictively turn due to the length of the blade 7. The large blade 7 has a length of several tens of meters. If the curve section is very sharp, there is a risk that the large blade 7 collides with terrain features such as trees and street lights around the road since the large blade 7 is too long. Moreover, when the vehicle moves in the curve section in the tunnel, the vehicle may be damaged due to a collision between the end of the blade and the wall of the tunnel.

In addition, a base 9 for supporting the fixed frame 4 must be stably fixed to the lower trailer 8 in order to stably perform the transportation and attachment/detachment of the blade. Referring to FIGS. 3 and 4, the fixing method is performed by fastening a plurality of upper brackets 13 arranged along the side of the upper base 9 in the longitudinal direction of the vehicle and a plurality of lower brackets 14 arranged along the side of the lower trailer 8 in the longitudinal direction of the vehicle to a connection plate 15 through thread holes 13a and 14a using bolts 16a and 16b.

However, in the connection structure for the blade transport vehicle, the upper and lower brackets 13 and 14 each have a simple plate shape and are simply bolted to the connection plate 15 having a rectangular shape. Hence, due to the weak coupling force when the vehicle travels, the risk of fatigue failure may be increased due to the exposure of the bolts to vibration and shocks for a long time and the base 9 may not be securely fixed. In this case, when the vehicle travels, the blade may be decoupled from the vehicle.

BRIEF SUMMARY

The present disclosure has been made in view of the above-mentioned problem, and an object thereof is to provide an apparatus relating to a transport vehicle, which is capable of stably fixing a blade on a transport vehicle by changing the position of the blade in directions on a slope.

Another object of the present disclosure is to provide an apparatus capable of preventing a vehicle from overturning by adjusting an angle of arrangement of a blade and balancing a load applied to the vehicle.

Still another object of the present disclosure is to provide an apparatus capable of measuring a wind direction and a wind speed applied to a blade, a rolling acceleration of the blade, and an angle of arrangement of the blade in real time, and changing the position of the blade when the measured value reaches a limit value, thereby improving safety of blade transport.

Yet another object of the present disclosure is to provide an apparatus capable of minutely adjusting a blade adapter to improve a width of turning of a blade in a sharp curve section, a tunnel, a pedestrian overpass, a slope, or the like, thereby improving safety of vehicle traveling.

A further object of the present disclosure is to provide a connection structure capable of enhancing stiffness by improving a fastening device for connecting upper and lower portions of a blade transport vehicle.

Other objects and advantages of the present disclosure can be understood by the following description, and become apparent with reference to the embodiments of the present invention. Also, it is obvious to those skilled in the art to which the present disclosure pertains that the objects and advantages of the present invention can be realized by the means as claimed and combinations thereof.

In accordance with one aspect of the present disclosure, a balance adjustment apparatus for a blade transport vehicle includes a base disposed at an upper end of a lower trailer of the blade transport vehicle, a blade fixing frame disposed on the base, a first moving device disposed at an upper end of the base to move the blade fixing frame in a longitudinal direction of the base, and a second moving device disposed at an upper end of the first moving device to move the blade fixing frame in a width direction of the base.

The first moving device may include a first guide rail disposed at the upper end of the base in the longitudinal direction thereof, a first plate seated on the first guide rail, and a first drive unit disposed at the upper end of the base and connected to one end of the first plate so as to move the first plate.

The first drive unit may be a hydraulic cylinder.

Alternatively, the first drive unit may include first rack gears formed on both surfaces of the base in the longitudinal direction thereof on the first plate, first motors disposed to face the first rack gears at both sides of the base, and first pinion gears connected to shafts of the first motors and engaged with the first rack gears.

The second moving device may include a second guide rail disposed at an upper end of the first plate in the width direction of the base, a second plate seated on the second guide rail to support the blade fixing frame, and a second drive unit disposed at an upper end of the second plate to move the second plate.

The second drive unit may be a hydraulic cylinder.

Alternatively, the second drive unit may include second rack gears formed on both surfaces of the base in the width direction thereof on the second plate, second motors disposed to face the second rack gears at both sides of the second plate, and second pinion gears connected to shafts of the second motors and engaged with the second rack gears.

The blade transport vehicle may further include a balance block spaced apart from the blade fixing frame by a predetermined distance and disposed on the base, a third moving device disposed at the upper end of the base to move the balance block in the longitudinal direction of the base, and a fourth moving device disposed at an upper end of the third moving device to move the balance block in the width direction of the base.

The third moving device may include a third guide rail formed at the upper end of the base in the longitudinal direction thereof, a third plate seated on the third guide rail, and a third drive unit disposed at the upper end of the base and connected to one end of the third plate so as to move the third plate.

The third drive unit may be a hydraulic cylinder.

Alternatively, the third drive unit may include third rack gears formed on both surfaces of the base in the longitudinal direction thereof on the third plate, third motors disposed to face the third rack gears at both sides of the base, and third pinion gears connected to shafts of the third motors and engaged with the third rack gears.

The fourth moving device may include a fourth guide rail formed at an upper end of the third plate in the width direction of the base, a fourth plate seated on the fourth guide rail to support the balance block, and a fourth drive unit disposed at an upper end of the fourth plate to move the fourth plate.

The fourth drive unit may be a hydraulic cylinder.

Alternatively, the fourth drive unit may include fourth rack gears formed on both surfaces of the base in the width direction thereof on the fourth plate, fourth motors disposed to face the fourth rack gears at both sides of the fourth plate, and fourth pinion gears connected to shafts of the fourth motors and engaged with the fourth rack gears.

In accordance with another aspect of the present disclosure, an angle adjustment apparatus for a blade transport vehicle includes a base disposed at an upper end of a lower trailer of the blade transport vehicle, a blade fixing frame disposed on the base, an elevation plate disposed at an upper end of the base to support the blade fixing frame, and elevation devices disposed at both sides of the base in a width direction thereof and connected to a lower end of the elevation plate.

The elevation devices may include internal elevation devices disposed inside both sides of the base in the width direction thereof, and each of the internal elevation devices may include a first hydraulic cylinder disposed in a first seating groove formed in the base, a first support bracket disposed at the lower end of the elevation plate and connected to a rod of the first hydraulic cylinder by a hinge, and a horizontal gyro sensor disposed on the elevation plate or the base so as to measure an angle of inclination of the blade fixing frame.

The elevation devices may include external elevation devices disposed outside both sides of the base in the width direction thereof, and each of the external elevation devices may include a third support bracket disposed at the lower end of the elevation plate, a third hydraulic cylinder having a body disposed at an outer end of the base in the width direction thereof and a rod connected to the third support bracket by a hinge, and a horizontal gyro sensor disposed on the elevation plate or the base so as to measure an angle of inclination of the blade fixing frame.

In accordance with still another aspect of the present disclosure, a safety control system for a blade transport vehicle includes a wind vane and anemometer disposed at an end of a blade so as to measure a wind direction and a wind speed applied to the blade, at least one acceleration sensor disposed in a longitudinal direction of the blade to measure rolling of the blade, and a controller configured to adjust a position of the blade, based on values obtained by measuring the wind direction and speed applied to the blade and the rolling of the blade.

The controller may include a wind direction and speed measurement device configured to receive information on the wind direction and speed applied to the blade from the wind vane and anemometer in real time, and an acceleration measurement device configured to receive information on a rolling acceleration generated in the blade from the acceleration sensor in real time.

The blade transport vehicle may further include a first angle sensor disposed in a slewing bearing unit of the blade transport vehicle in order to measure an angle of inclination of the blade to a rod of a hydraulic cylinder.

The blade transport vehicle may further include a second angle sensor disposed in a base of the blade transport vehicle in order to measure an angle of inclination of the blade transport vehicle to the ground.

The controller may further include an angle measurement device configured to receive information on the angle of inclination of the blade from the first angle sensor and information on the angle of inclination of the blade transport vehicle from the second angle sensor.

The controller may further include a conversion device configured to receive information from the wind direction and speed measurement device, the acceleration measurement device, and the angle measurement device and to convert the information into a changed rotation value of the blade or an amount of hydraulic pressure corresponding to a changed angle value of the blade.

The controller may further include a hydraulic drive device configured to adjust the hydraulic cylinder according to the amount of hydraulic pressure received from the conversion device, and a rotation drive device configured to rotate a slewing bearing according to the changed rotation value received from the conversion device.

The controller may further include a limit device configured to drive the conversion device only when the measured values exceed preset limit values of wind direction and speed applied to the blade, a preset limit rolling acceleration value of the blade, and a preset limit gradient value of the blade.

In accordance with yet another aspect of the present disclosure, an adapter positioning apparatus for a blade transport vehicle includes a slewing bearing unit mounted at a fixed frame disposed at an upper end of a base of the blade transport vehicle, an angle adjustment cylinder connected to the slewing bearing unit and disposed at the fixed frame so as to adjust an angle of the slewing bearing unit, a blade adapter rotatably connected to the slewing bearing unit so as to fix one end of a blade, and a positioning device disposed to interlock with the slewing bearing unit and the blade adapter so as to adjust a position of the blade adapter.

The slewing bearing unit may include a bearing block disposed at an upper end of the fixed frame, a slewing bearing disposed at the bearing block and connected to one end of the blade adapter, and a turning drive disposed at the bearing block to rotate the slewing bearing.

The positioning device may include a rotary plate disposed along an outer peripheral surface of the slewing bearing, a plurality of first housing brackets disposed at positions corresponding to seating grooves in the blade adapter, each having a spherical hollow formed therein, and a plurality of first hydraulic cylinders respectively having a plurality of bodies arranged circumferentially at predetermined intervals on the rotary plate and rods connected to the first housing brackets by hinge balls.

Alternatively, the positioning device may include a rotary plate having a plurality of seating grooves formed circumferentially at predetermined intervals therein, the rotary plate being disposed along an outer peripheral surface of the slewing bearing, a plurality of second housing brackets disposed at positions corresponding to the seating grooves in the blade adapter, each having a spherical hollow formed therein, and a plurality of second hydraulic cylinders, each having a body disposed in the associated seating groove of the rotary plate and a rod connected to the associated second housing bracket by a hinge ball.

Alternatively, the positioning device may include a rotary plate having a plurality of seating grooves formed circumferentially at predetermined intervals therein while being tapered from outside to inside, the rotary plate being disposed along an outer peripheral surface of the slewing bearing, a support bracket disposed in each of the seating grooves of the rotary plate, and having a spherical hollow formed therein, and a plurality of third hydraulic cylinders, each having a body connected to the support bracket by a hinge ball and a rod connected to the blade adapter.

Each of the first, second, and third hydraulic cylinders may consist of four hydraulic cylinders arranged at intervals of 90 degrees on the rotary plate.

In accordance with still yet another aspect of the present disclosure, a connection structure for a blade transport vehicle includes lower brackets arranged along the side of a lower trailer of the blade transport vehicle, upper brackets arranged along the side of a base mounted to an upper end of the lower trailer, each of the upper brackets having a seating groove formed at the center thereof, and a connection plate having a protrusion block coupled to the seating groove, the connection plate connecting each of the upper brackets and the lower bracket associated therewith.

The seating groove of each of the upper brackets may include a first seating portion formed at an upper side of the upper bracket and inclined from top to down, and a second seating portion formed below the first seating portion.

The protrusion block of the connection plate may include a first protrusion portion having a shape corresponding to the first seating portion so as to be coupled to the first seating portion, and a second protrusion portion having a shape corresponding to the second seating portion and formed below the first protrusion portion so as to be coupled to the second seating portion.

The blade transport vehicle may further include a buffer pad disposed between the seating groove and the protrusion block in order to reduce abrasion of a contact surface between the seating groove and the protrusion block.

In accordance with a further aspect of the present disclosure, a connection structure for a blade transport vehicle includes lower brackets arranged along the side of a lower trailer of the blade transport vehicle, support slots arranged along the side of a base mounted to an upper end of the lower trailer, a fixed plate fitted into each of the support slots, and having a seating groove formed at the center thereof, and a connection plate having a protrusion block pressed against the seating groove, the connection plate connecting each of the lower brackets and the fixed plate associated therewith.

Each of the support slots may include a pair of support beams arranged at a distance corresponding to a horizontal length of the fixed plate on the base so as to support both sides of the fixed plate, a support plate configured to connect lower portions of the support beams so as to support a lower end of the fixed plate, and first extension portions protruding outward from the support beams while facing each other.

The fixed plate may further include second extension portions formed at both sides on a contact surface with the base and pressed against the first extension portions, and the seating groove of the fixed plate may include a first seating portion formed at an upper side of the fixed plate and having a plane shape, and a second seating portion formed below the first seating portion and having a plane shape.

The protrusion block of the connection plate may include a first protrusion portion having a shape corresponding to the first seating portion so as to be pressed against the first seating portion, and a second protrusion portion formed below the first protrusion portion so as to be pressed against the second seating portion.

The blade transport vehicle may further include a first elastic pad disposed on the side of the protrusion block facing the seating groove in order to reduce abrasion of a contact surface between the seating groove and the protrusion block.

The blade transport vehicle may further include a second elastic pad disposed on the side of the fixed plate facing the connection plate in order to reduce abrasion of a contact surface between the fixed plate and the connection plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
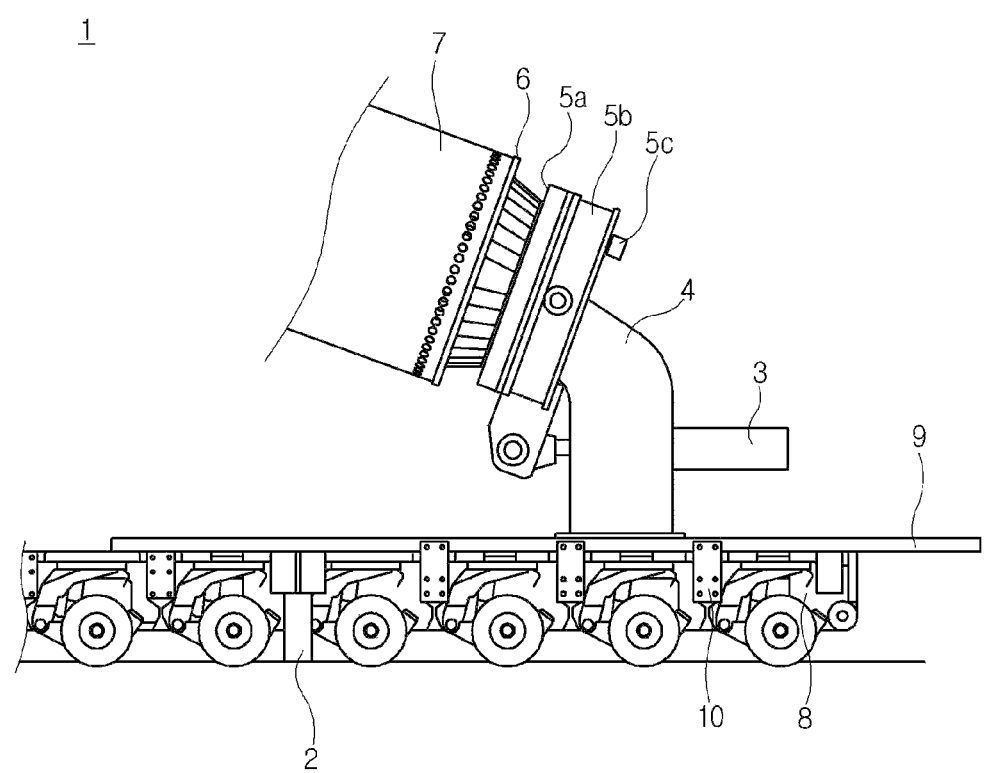
FIG. 1 is a view illustrating a blade transport vehicle.
Figure 2:
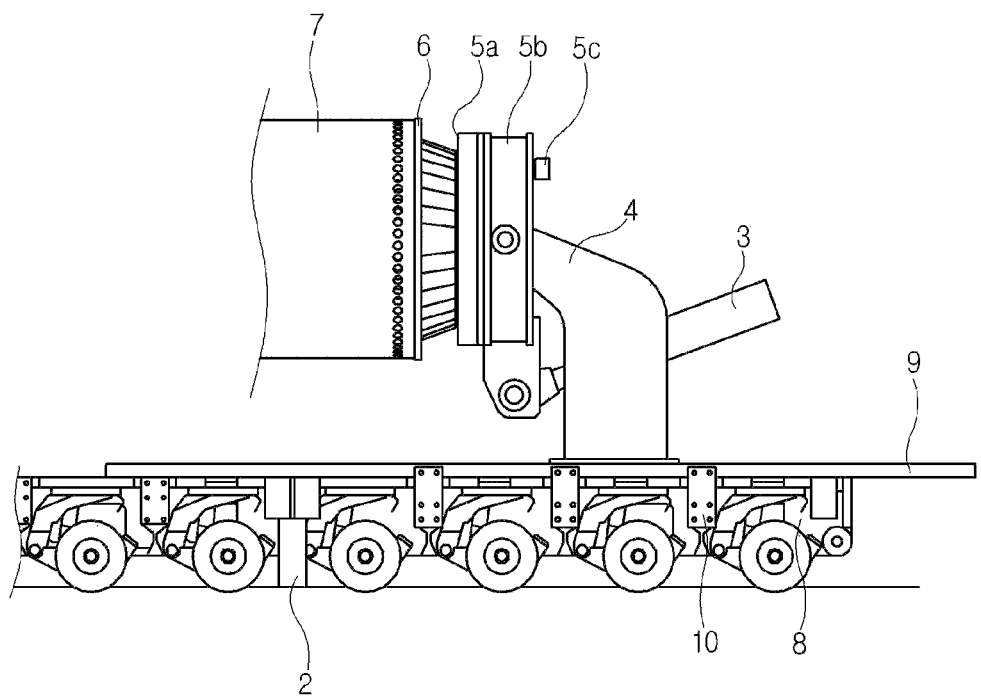
FIG. 2 is a view illustrating the blade transport vehicle of FIG. 1 with the blade in a different position.
Figure 3:
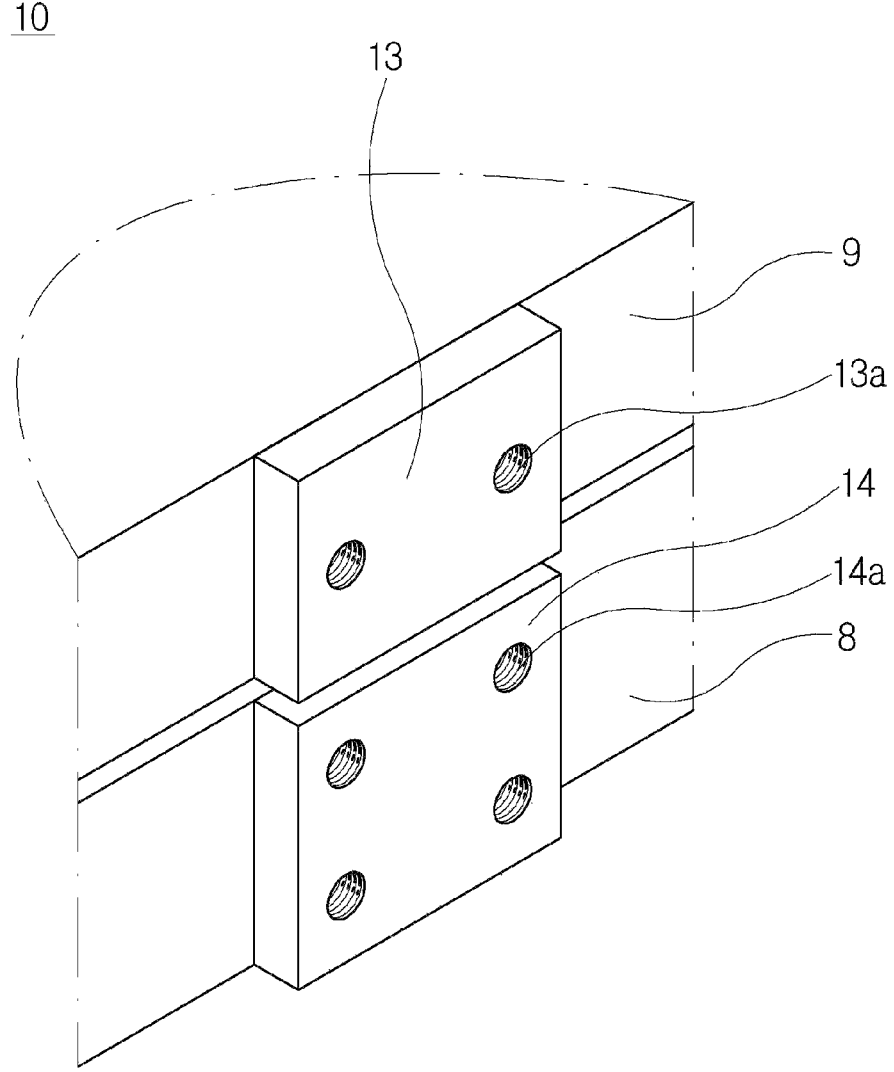
FIG. 3 is a view illustrating a connection structure between a base and a lower trailer of the blade transport vehicle of FIGS. 1 and 2.
Figure 4:
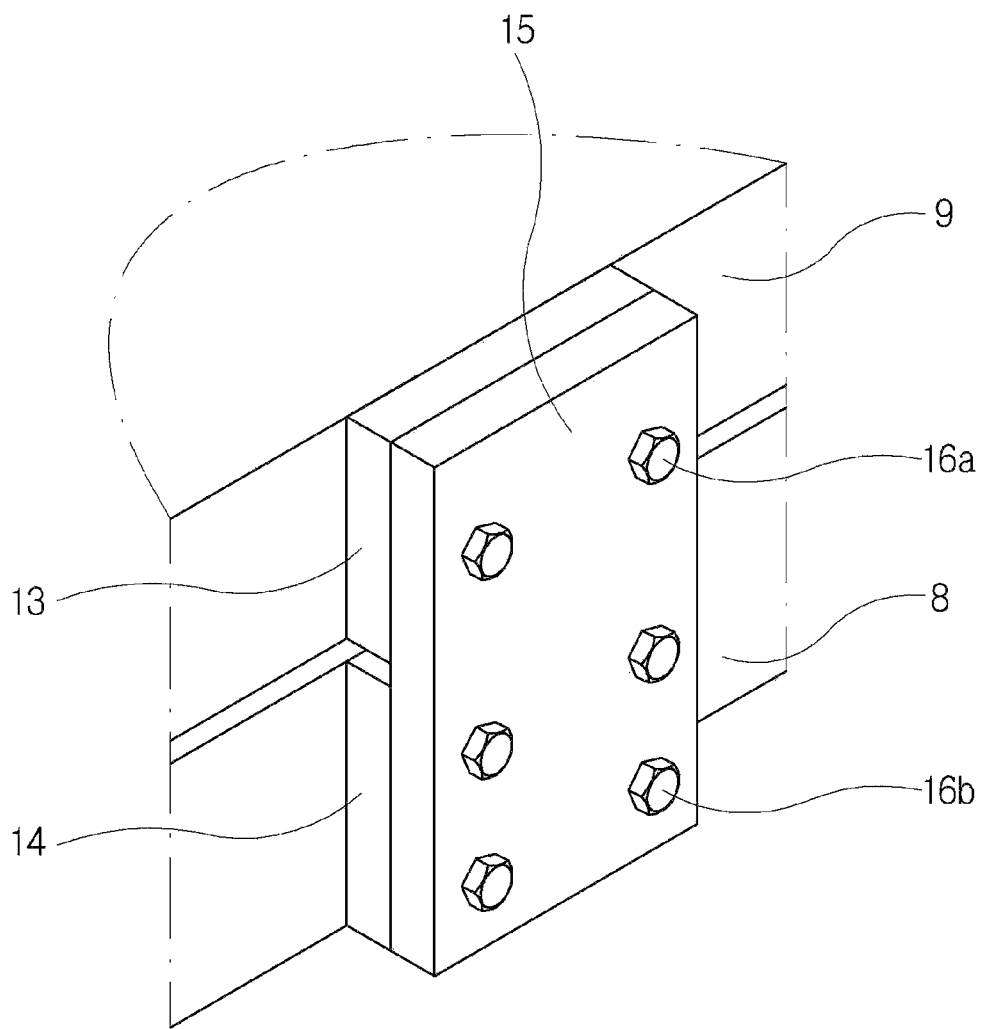
FIG. 4 is a view illustrating the connection structure of FIG. 3 including bolts.

Exemplary embodiments of the present disclosure will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

[Balance Adjustment Apparatus for Blade Transport Vehicle]

Hereinafter, a balance adjustment apparatus for a blade transport vehicle according to exemplary embodiments of the present disclosure will be described in detail with reference to the accompanying drawings.

Prior to description of each embodiment, the balance adjustment apparatus for a blade transport vehicle according to the present disclosure may include the following components.

The balance adjustment apparatus for a blade transport vehicle may include a base 110 which is disposed at the upper end of a lower trailer 160 of a blade transport vehicle, a blade fixing frame 120 which is disposed on the base 110, a first moving device 200 which is disposed at the upper end of the base 110 to move the blade fixing frame 120 in the longitudinal direction of the base 110, and a second moving device 300 which is disposed at the upper end of the first moving device 200 to move the blade fixing frame 120 in the width direction of the base 110.

The first moving device 200 may include a first guide rail 210 which is disposed at the upper end of the base 110 in the longitudinal direction of the base 110, a first plate 220 which is seated on the first guide rail 210, and a first drive unit 230 which is disposed at the upper end of the base 110 and is connected to one end of the first plate 220 so as to move the first plate 220.

The first drive unit 230 may be a hydraulic cylinder.

The first drive unit 230 may include first rack gears 233 which are formed on both surfaces of the base 110 in the longitudinal direction thereof on the first plate 220, first motors 234 which are disposed to face the first rack gears 233 at both sides of the base 110, and first pinion gears 235 which are connected to the shafts of the first motors 234 and are engaged with the first rack gears 233.

The second moving device 300 may include a second guide rail 310 which is disposed at the upper end of the first plate 220 in the width direction of the base 110, a second plate 320 which is seated on the second guide rail 310 and supports the blade fixing frame 120, and a second drive unit 330 which is disposed at the upper end of the second plate 320 and moves the second plate 320.

The second drive unit 330 may be a hydraulic cylinder.

The second drive unit 330 may include second rack gears 333 which are formed on both surfaces of the base 110 in the width direction thereof on the second plate 320, second motors 334 which are disposed to face the second rack gears 333 at both sides of the second plate 320, and second pinion gears 335 which are connected to the shafts of the second motors 334 and are engaged with the second rack gears 333.

In addition, the balance adjustment apparatus for a blade transport vehicle may include a balance block 130 which is spaced apart from the blade fixing frame by a predetermined distance and is disposed on the base 110, a third moving device 400 which is disposed at the upper end of the base 110 and moves the balance block 130 in the longitudinal direction of the base 110, and a fourth moving device 500 which is disposed at the upper end of the third moving device 400 and moves the balance block 130 in the width direction of the base 110.

The third moving device 400 may include a third guide rail 410 which is formed at the upper end of the base 110 in the longitudinal direction of the base 110, a third plate 420 which is seated on the third guide rail 410, and a third drive unit 430 which is disposed at the upper end of the base 110 and is connected to one end of the third plate 420 so as to move the third plate 420.

The third drive unit 430 may be a hydraulic cylinder.

The third drive unit 430 may include third rack gears 433 which are formed on both surfaces of the base 110 in the longitudinal direction thereof on the third plate 420, third motors 434 which are disposed to face the third rack gears 433 at both sides of the base 110, and third pinion gears 435 which are connected to the shafts of the third motors 434 and are engaged with the third rack gears 433.

The fourth moving device 500 may include a fourth guide rail 510 which is formed at the upper end of the third plate 420 in the width direction of the base 110, a fourth plate 520 which is seated on the fourth guide rail 510 and supports the balance block 130, and a fourth drive unit 530 which is disposed at the upper end of the fourth plate 520 and moves the fourth plate 520.

The fourth drive unit 530 may be a hydraulic cylinder.

The fourth drive unit 530 may include fourth rack gears 533 which are formed on both surfaces of the base 110 in the width direction thereof on the fourth plate 520, fourth motors 534 which are disposed to face the fourth rack gears 533 at both sides of the fourth plate 520, and fourth pinion gears 535 which are connected to the shafts of the fourth motors 534 and are engaged with the fourth rack gears 533.

Figure 5:
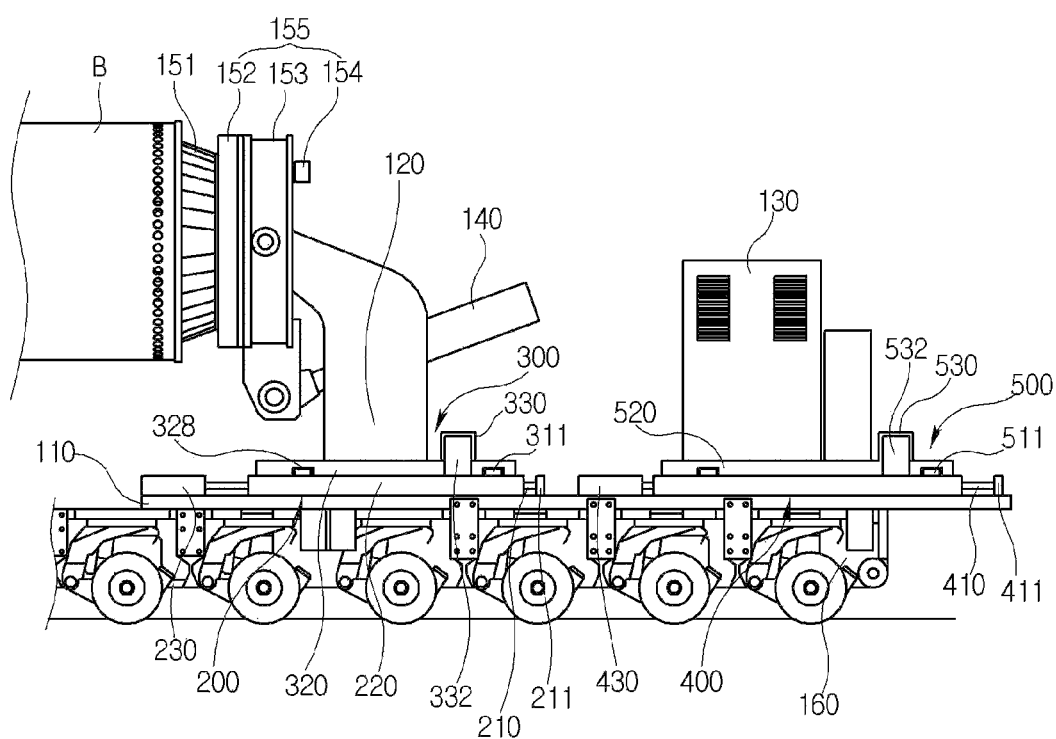
FIG. 5 is a side view illustrating a balance adjustment apparatus for a blade transport vehicle according to the present disclosure.
Figure 6:
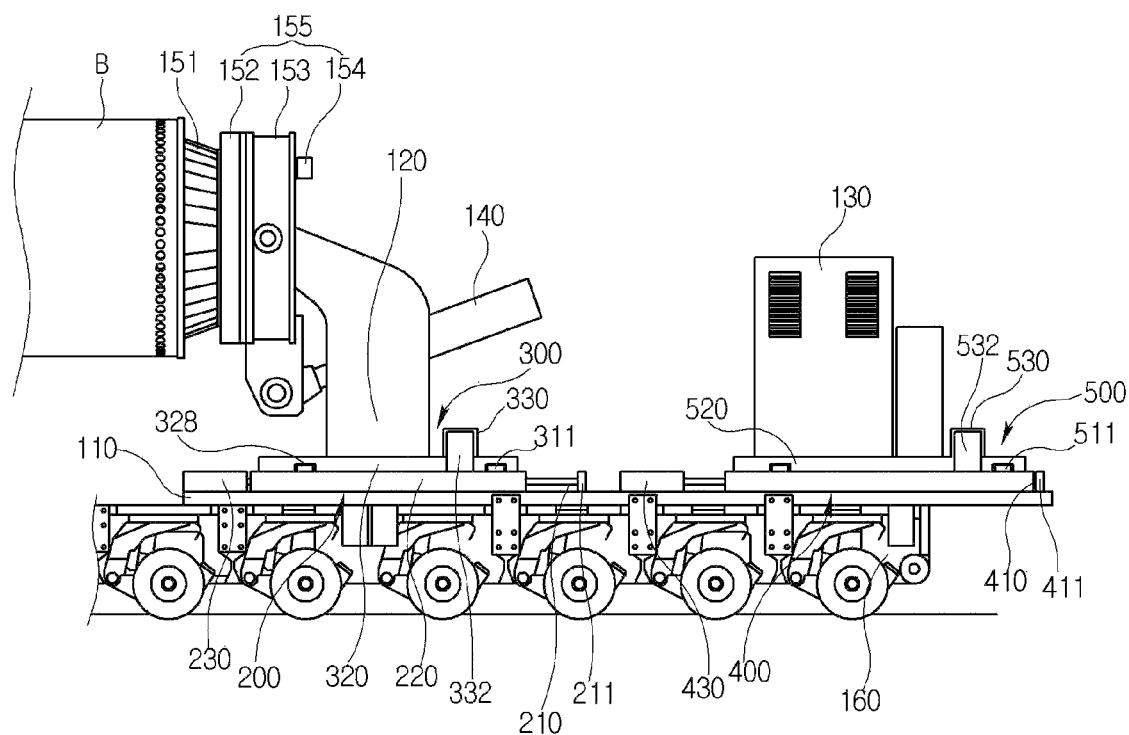
FIG. 6 is a side view illustrating a state in which the position of a blade adapter or a balance block of the vehicle of FIG. 5 is changed.
Figure 7:
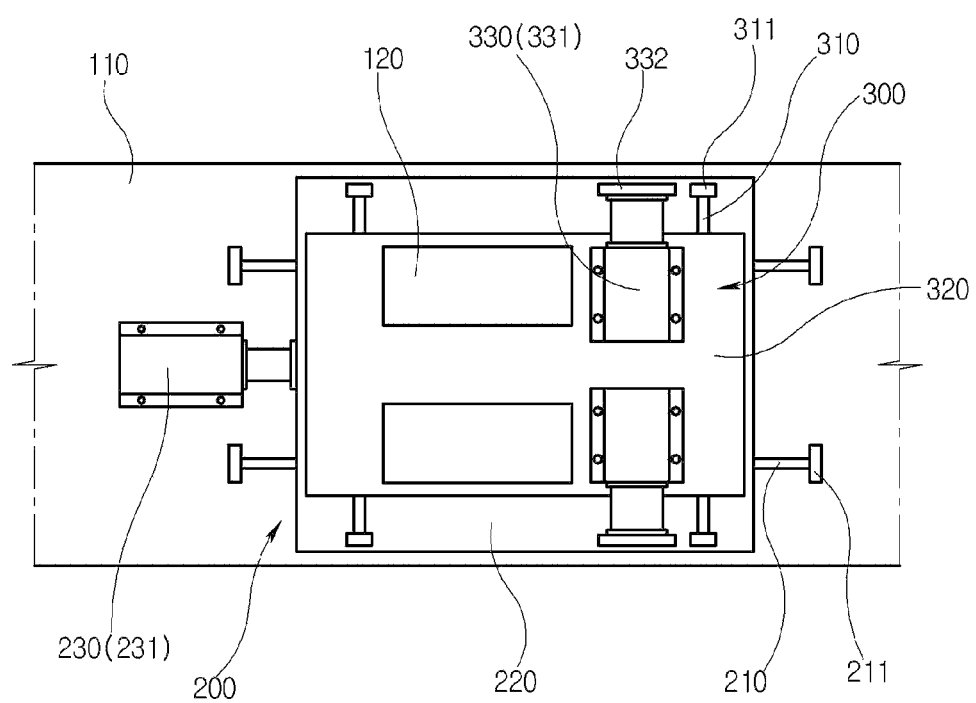
FIG. 7 is a top view illustrating a first embodiment of a position change structure of the blade adapter illustrated in FIG. 5.
Figure 8:
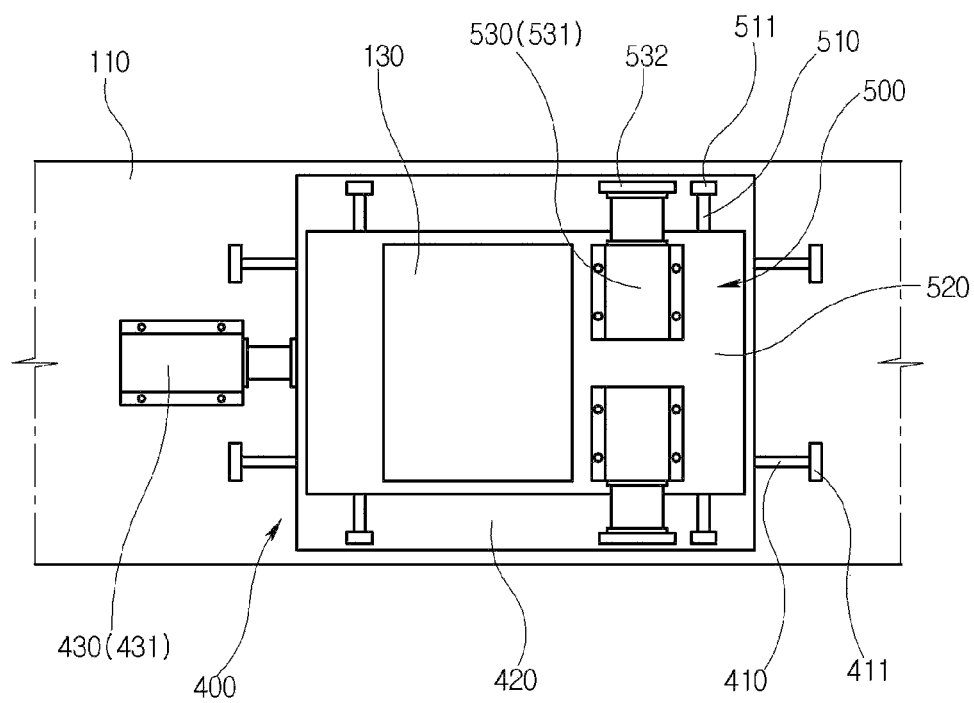
FIG. 8 is a top view illustrating a first embodiment of a position change structure of the balance block illustrated in FIG. 5.
Figure 9:
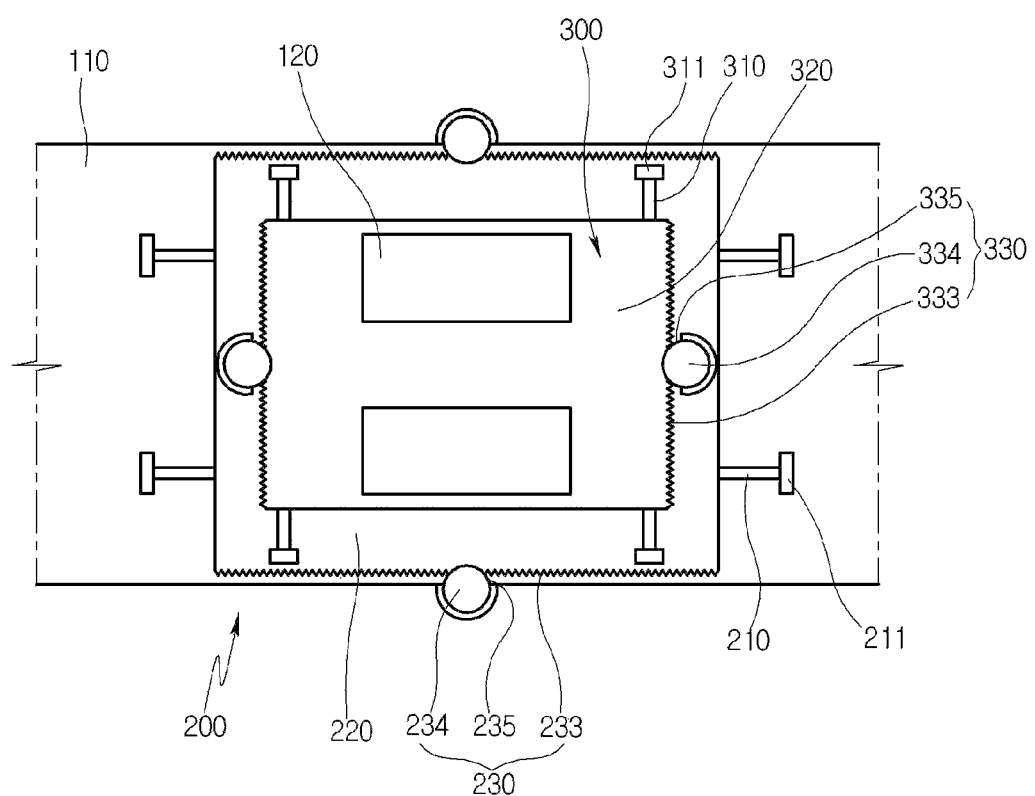
FIG. 9 is a top view illustrating a second embodiment of a position change structure of the blade adapter illustrated in FIG. 5.
Figure 10:
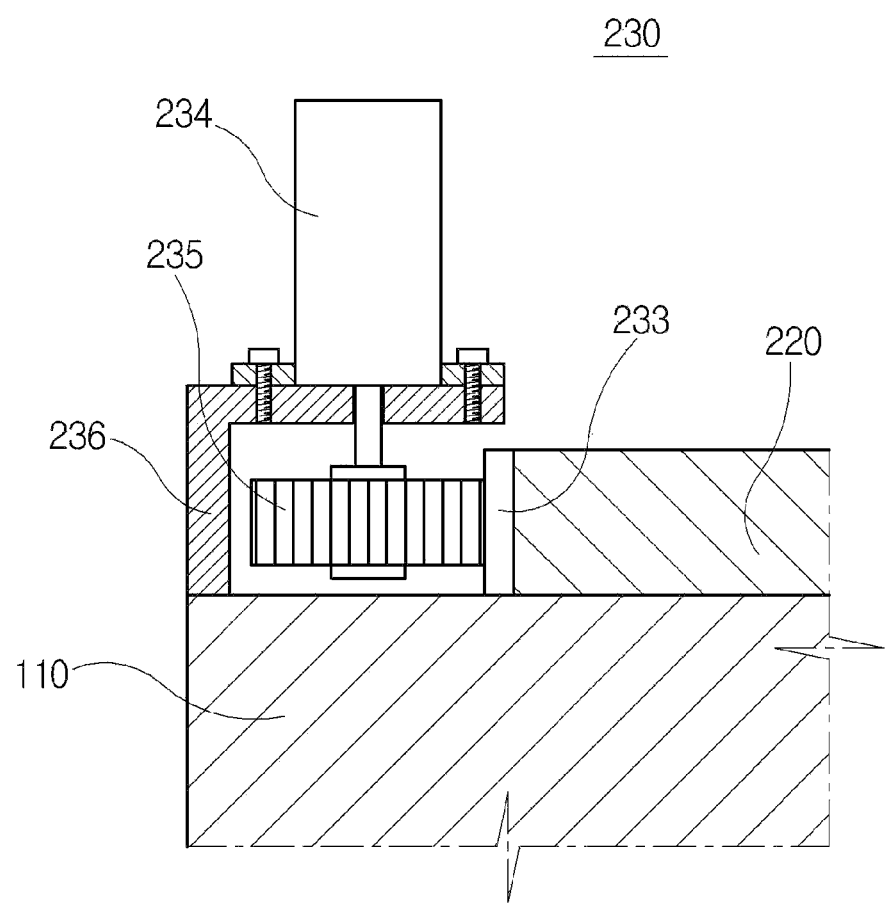
FIG. 10 is a view illustrating a rack and pinion gearing of the structure illustrated in FIG. 9.
Figure 11:
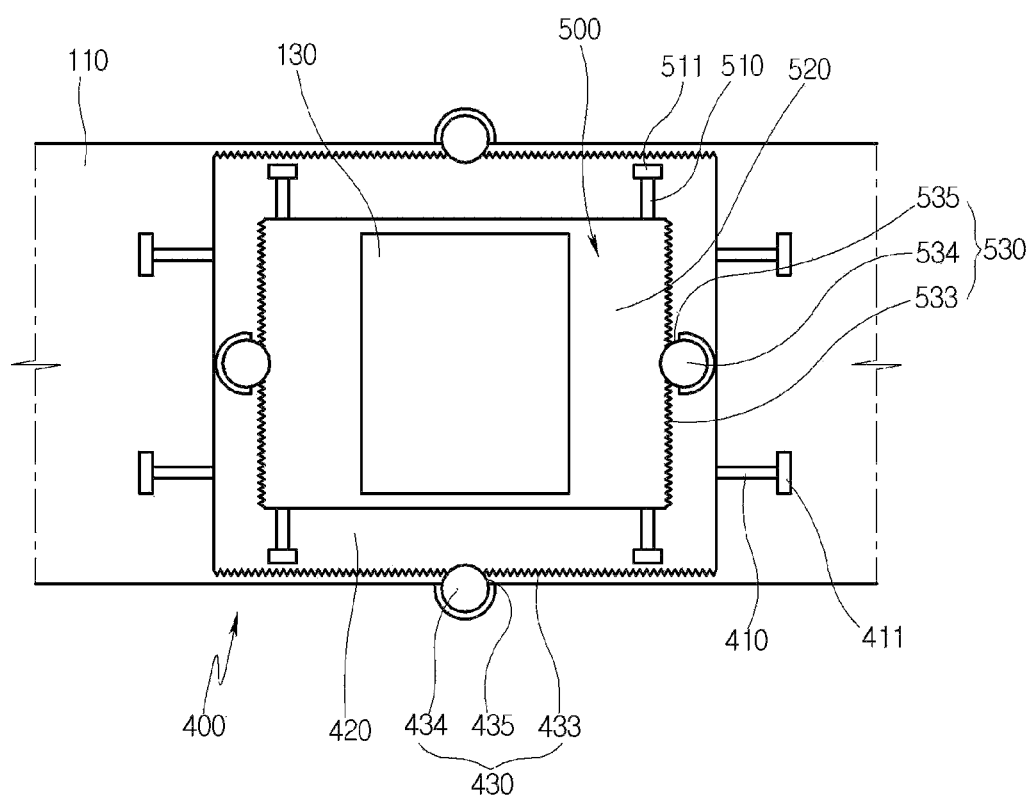
FIG. 11 is a top view illustrating a second embodiment of a position change structure of the balance block illustrated in FIG. 5.
Figure 12:
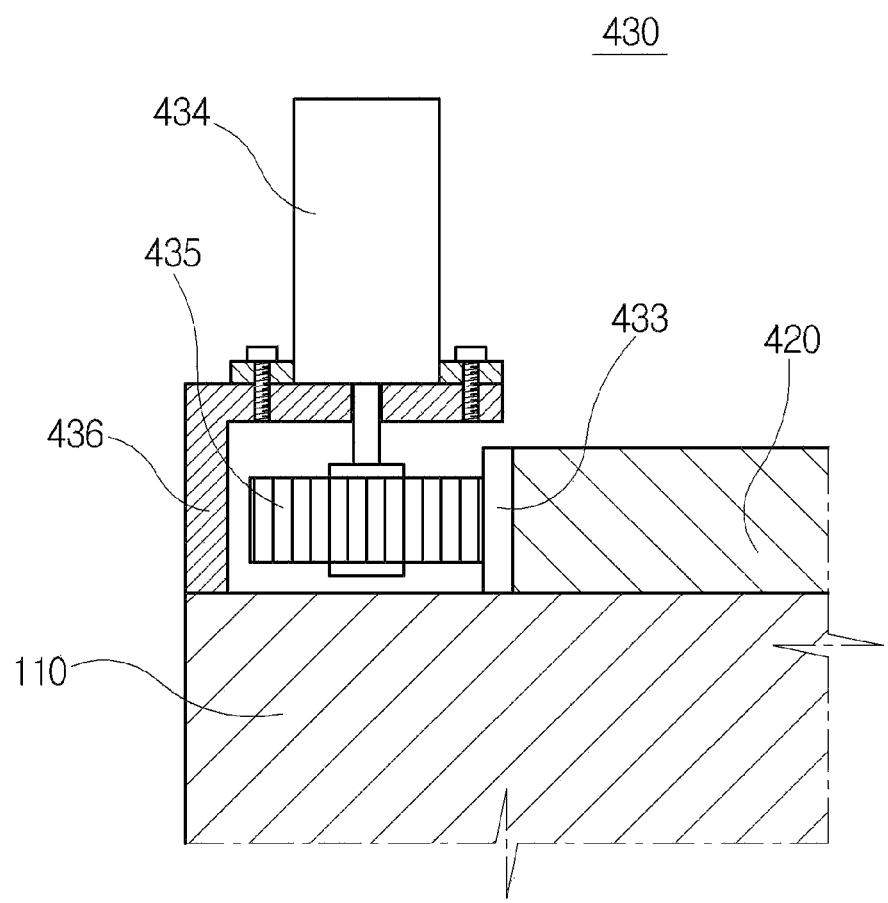
FIG. 12 is a view illustrating a rack and pinion gearing of the structure illustrated in FIG. 11.
Figure 13:
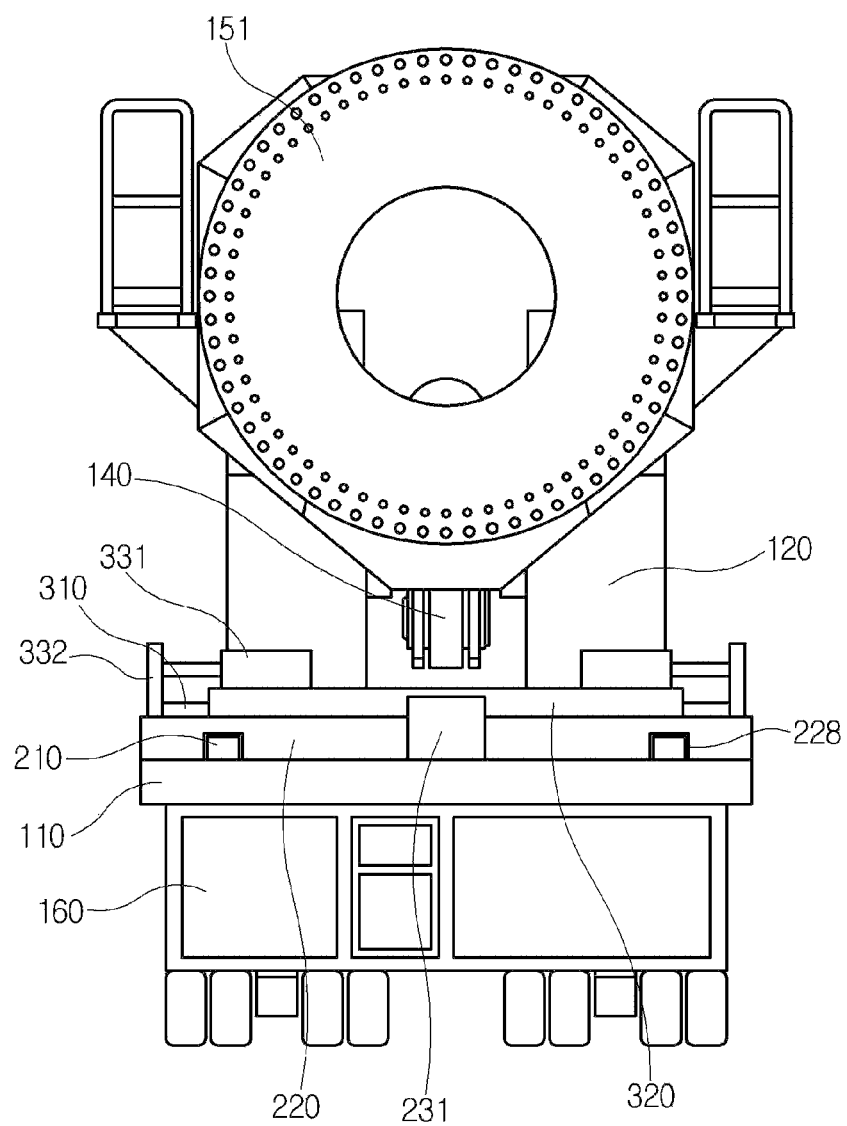
FIG. 13 is a view illustrating an operation state of the blade adapter illustrated in FIG. 5.
Figure 14:
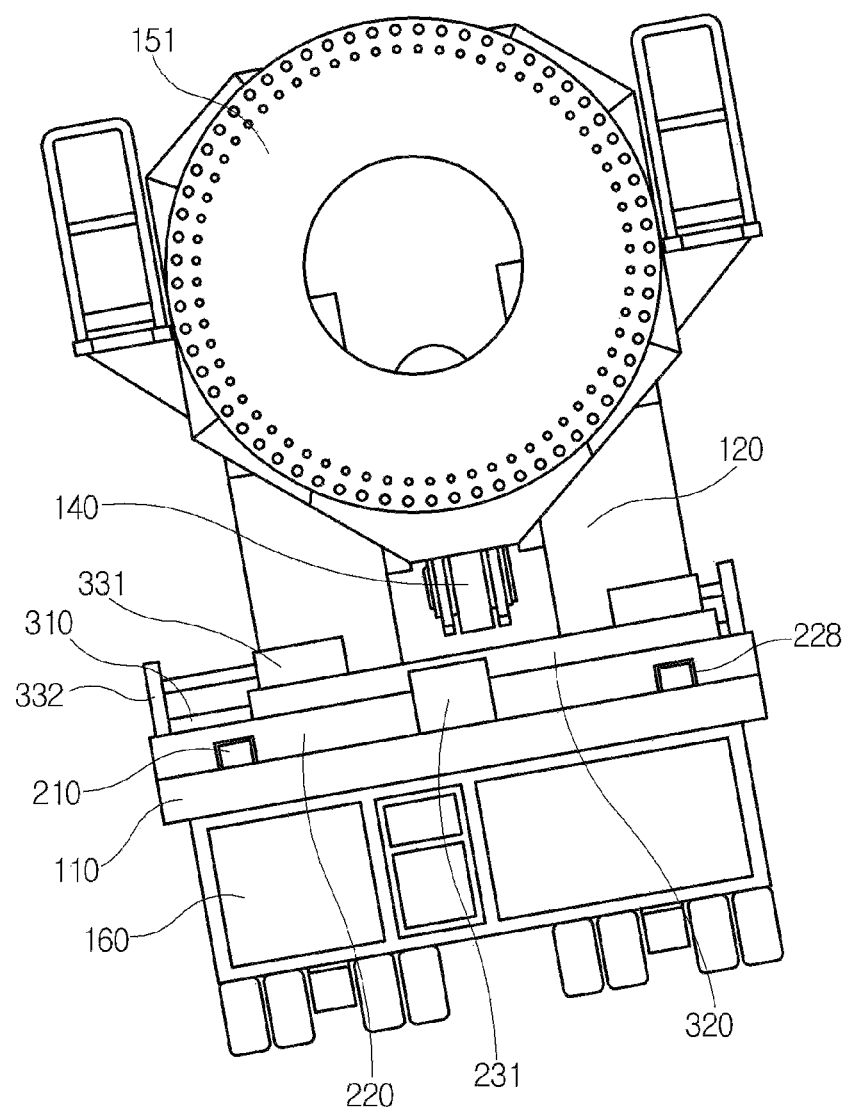
FIG. 14 is a view illustrating an operation state of the blade adapter illustrated in FIG. 5.

FIG. 5 is a side view illustrating an embodiment of a balance adjustment apparatus for a blade transport vehicle. FIG. 6 is a side view illustrating a state in which the position of a blade adapter or a balance block is changed. FIG. 7 is a top view illustrating a first embodiment of a position change structure of the blade adapter illustrated in FIG. 5. FIG. 8 is a top view illustrating a first embodiment of a position change structure of the balance block illustrated in FIG. 5. FIG. 9 is a top view illustrating a second embodiment of a position change structure of the blade adapter illustrated in FIG. 5. FIG. 10 is a view illustrating a rack and pinion gearing in the structure illustrated in FIG. 9. FIG. 11 is a top view illustrating a second embodiment of a position change structure of the balance block illustrated in FIG. 5. FIG. 12 is a view illustrating a rack and pinion gearing of the structure illustrated in FIG. 11. FIGS. 13 and 14 are views illustrating an operation state of the blade adapter illustrated in FIG. 5.

Referring to FIGS. 5 to 14, the balance adjustment apparatus for a blade transport vehicle according to the embodiment of the present disclosure may include a base 110, a blade fixing frame 120, a first moving device 200, and a second moving device 300.

Referring to FIG. 5, the base 110 may be disposed at the upper end of a lower trailer 160 of a blade transport vehicle. The lower trailer 160 includes a main body having a plurality of wheels arranged in multiple rows, and an upper end configured to be flat in order to transport a blade. Here, the base 110 may have a flat plate shape, and be made of a steel material for improving stiffness. The base 110 may be coupled to the upper end of the lower trailer 160 by bolting or welding.

The blade fixing frame 120 may be disposed on the base 110, and have a pair of columns made of a steel material. A slewing bearing unit 155 and a blade adapter 151 may be mounted on the upper end of the blade fixing frame 120. An angle adjustment cylinder 140 may be connected to the slewing bearing unit 155 between the pair of steel columns.

The slewing bearing unit 155 may include a slewing bearing 152 and a bearing block 153. The slewing bearing 152 is rotatably disposed in the bearing block 153, and a turning drive 154 is mounted to one end of the bearing block 153 so as to rotate the slewing bearing 152.

The blade adapter 151 is mounted to one side of the slewing bearing 152 and rotates along with the slewing bearing 152 by the turning drive 154. The blade adapter 151 serves to fix a heavy blade mounted to a wind turbine.

The user may circumferentially adjust the angle of the blade mounted onto the blade adapter 151 by rotating the slewing bearing 152, and may vertically adjust the angle of the blade mounted onto the blade adapter 151 by operating the angle adjustment cylinder 140.

The first moving device 200 may be disposed at the upper end of the base 110 and move the blade fixing frame 120 in the longitudinal direction of the base 110. The first moving device 200 may include a first guide rail 210, a first plate 220, and a first drive unit 230.

The first guide rail 210 may be disposed at the upper end of the base 110 in the longitudinal direction of the base 110. Referring to FIG. 7, it can be seen that the first guide rail 210 consists of a pair of guide rails in the longitudinal direction of the vehicle on the base 110. Of course, the number of first guide rails is not limited thereto. Stoppers 211 are installed to both ends of the first guide rail 210 in order to restrict the movement of the first plate 220. The first plate 220 moving along the upper end of the first guide rail 210 is not separated from the first guide rail 210 by the stoppers 211.

The first plate 220 is seated on the first guide rail 210, and has a seating groove 223 (see FIG. 13) which is formed in the lower end thereof and has a shape corresponding to the first guide rail 210 so as to be seated on the first guide rail 210. Although not shown in the drawing, a typical ball bearing unit may be mounted to the first plate 220 such that the first plate 220 smoothly moves on the upper end of the first guide rail 210.

The first drive unit 230 may be disposed adjacent to the first plate 220 at the upper end of the base 110, and may be connected to one end of the first plate 220 so as to move the first plate 220. Referring to FIG. 7, it can be seen that the first drive unit 230 is disposed on the base 110. In the embodiment of the present disclosure, the first drive unit 230 may be a hydraulic cylinder 231.

That is, the body of the hydraulic cylinder 231 may be bolted to the upper end of the base 110, and the rod of the hydraulic cylinder 231 may be coupled to one end of the first plate 220. When the user drives the first drive unit 230, the first plate 220 may move on the first guide rail 210 by the forward or rearward movement of the rod of the hydraulic cylinder 231.

The second moving device 300 may be disposed at the upper end of the first moving device 200 and move the blade fixing frame 120 in the width direction of the base 110. The second moving device 300 may include a second guide rail 310, a second plate 320, and a second drive unit 330.

The second guide rail 310 may be disposed at the upper end of the base 110 in the width direction of the base 110. Also, stoppers 311 may be installed to both ends of the second guide rail 310 in order to restrict the movement of the first plate 220.

The second plate 320 may be seated on the second guide rail 310 and support the blade fixing frame 120. Referring to FIG. 7 again, it can be seen that the blade fixing frame 120 having a pair of columns is disposed at the upper end of the second plate 320. The second plate 320 has a seating groove 328 (see FIG. 5) which is formed in the lower end thereof so as to be seated on the second guide rail 310. A ball bearing unit may be mounted into the seating groove 328 in order to smoothly move the second plate 320.

The second drive unit 330 may be disposed at the upper end of the second plate 320 and move the second plate 320. In the embodiment of the present disclosure, the second drive unit 330 may be a hydraulic cylinder 331. Referring to FIG. 7, the hydraulic cylinder 331 may consist of a pair of hydraulic cylinders disposed at the upper end of the second plate 320. The body of the hydraulic cylinder 331 may be fixed to the upper end of the second plate 320 by bolting, and the rod of the hydraulic cylinder 331 may be coupled to a support block 332 disposed at the upper end of the first plate 220. Accordingly, the second plate 320 moves in such a way to be pushed or pulled by the forward or rearward movement of the rod of the hydraulic cylinder 331.

Alternatively, the first drive unit 230 may include first rack gears 233, first motors 234, and first pinion gears 235, as illustrated in FIGS. 9 and 10.

The first rack gears 233 may be formed on both surfaces of the base 110 in the longitudinal direction thereof on the first plate 220. The first motors 234 may be disposed to face the first rack gears 233 at both sides of the base 110. As illustrated in FIG. 10, each of the first motors 234 may be mounted to a fixing bracket 236 by bolting, and the shaft thereof may be disposed downward. Each of the first pinion gears 235 may be connected to the shaft of the associated first motor 234 so as to be engaged with the associated first rack gear 233.

When the user drives the first motor 234, the first plate 220 horizontally moves in the longitudinal direction of the base 110 by the interaction of the first rack gear 233 and the first pinion gear 235 according to the rotation direction of the shaft of the first motor 234.

Alternatively, the second drive unit 330 may include second rack gears 333, second motors 334, and second pinion gears 335.

The second rack gears 333 may be formed on both surfaces of the base 110 in the width direction thereof on the second plate 320. The second motors 334 may be disposed to face the second rack gears 333 at both sides of the second plate 320. Each of the second motors 334 may be mounted to a fixing bracket by bolting, and the shaft thereof may be disposed downward. Each of the second pinion gears 335 may be connected to the shaft of the associated second motor 334 so as to be engaged with the associated second rack gear 333.

When the user drives the second motor 334, the second plate 320 horizontally moves in the width direction of the base 110 by the interaction of the second rack gear 333 and the second pinion gear 335 according to the rotation direction of the shaft of the second motor 334.

In the embodiment of the present disclosure, the balance adjustment apparatus for a blade transport vehicle may further include a balance block 130, a third moving device 400, and a fourth moving device 500.

The balance block 130 performs a balance function so as to correspond to the weight of the blade for preventing the overturn of the vehicle. The balance block 130 may be spaced apart from the blade fixing frame by a predetermined distance and be disposed on the base 110. Referring to FIG. 5, it can be seen that the balance block 130 is disposed rearward of the vehicle from the blade fixing frame. The balance block 130 may be a weight or other devices.

The third moving device 400 may be disposed at the upper end of the base 110 and move the balance block 130 in the longitudinal direction of the base 110. The third moving device 400 may include a third guide rail 410, a third plate 420, and a third drive unit 430.

The third guide rail 410 may be disposed at the upper end of the base 110 in the longitudinal direction of the base 110. Referring to FIG. 8, it can be seen that the third guide rail 410 consists of a pair of guide rails in the longitudinal direction of the vehicle on the base 110. Of course, the number of third guide rails is not limited thereto. Stoppers 411 are installed to both ends of the third guide rail 410 in order to restrict the movement of the third plate 420. The third plate 420 moving along the upper end of the third guide rail 410 is not separated from the third guide rail 410 by the stoppers 411.

The third plate 420 is seated on the third guide rail 410. Although not shown in the drawing, the third plate 420 may have a seating groove which is formed in the lower end thereof and has a shape corresponding to the third guide rail 410 so as to be seated on the third guide rail 410, and a typical ball bearing unit may be mounted to the third plate 420 such that the third plate 420 smoothly moves on the upper end of the third guide rail 410.

The third drive unit 430 may be disposed adjacent to the third plate 420 at the upper end of the base 110, and may be connected to one end of the third plate 420 so as to move the third plate 420. Referring to FIG. 8 again, it can be seen that the third drive unit 430 is disposed on the base 110. In the embodiment of the present invention, the third drive unit 430 may be a hydraulic cylinder 431.

That is, the body of the hydraulic cylinder 431 may be bolted to the upper end of the base 110, and the rod of the hydraulic cylinder 431 may be coupled to one end of the third plate 420. When the user drives the third drive unit 430, the third plate 420 may move on the third guide rail 410 by the forward or rearward movement of the rod of the hydraulic cylinder 431.

The fourth moving device 500 may be disposed at the upper end of the third moving device 400 and move the balance block 130 in the width direction of the base 110. The fourth moving device 500 may include a fourth guide rail 510, a fourth plate 520, and a fourth drive unit 530.

The fourth guide rail 510 may be disposed at the upper end of the third plate 420 in the width direction of the base 110. Also, stoppers 511 may be installed to both ends of the fourth guide rail 510 in order to restrict the movement of the fourth plate 520.

The fourth plate 520 may be seated on the fourth guide rail 510 and support the balance block 130. Referring to FIG. 8 again, it can be seen that the balance block 130 is disposed at the upper end of the fourth plate 520. Although not shown in the drawing, the fourth plate 520 may have a seating groove which is formed in the lower end thereof so as to be seated on the fourth guide rail 510, and a typical ball bearing unit may be mounted into the seating groove in order to smoothly move the fourth plate 520.

The fourth drive unit 530 may be disposed at the upper end of the fourth plate 520 and move the fourth plate 520. In the embodiment of the present invention, the fourth drive unit 530 may be a hydraulic cylinder 531. Referring to FIG. 8, the hydraulic cylinder 531 may consist of a pair of hydraulic cylinders disposed at the upper end of the fourth plate 520. The body of the hydraulic cylinder 531 may be fixed to the upper end of the fourth plate 520 by bolting, and the rod of the hydraulic cylinder 531 may be coupled to a support block 532 disposed at the upper end of the third plate 420. Accordingly, the fourth plate 520 moves in such a way to be pushed or pulled by the forward or rearward movement of the rod of the hydraulic cylinder 531.

Alternatively, the third drive unit 430 may include third rack gears 433, third motors 434, and third pinion gears 435, as illustrated in FIGS. 11 and 12.

The third rack gears 433 may be formed on both surfaces of the base 110 in the longitudinal direction thereof on the third plate 420. The third motors 434 may be disposed to face the third rack gears 433 at both sides of the base 110. As illustrated in FIG. 12, each of the third motors 434 may be mounted to a fixing bracket 436 by bolting, and the shaft thereof may be disposed downward. Each of the third pinion gears 435 may be connected to the shaft of the associated third motor 434 so as to be engaged with the associated third rack gear 433.

When the user drives the third motor 434, the third plate 420 horizontally moves in the longitudinal direction of the base 110 by the interaction of the third rack gear 433 and the third pinion gear 435 according to the rotation direction of the shaft of the third motor 434.

Alternatively, the fourth drive unit 530 may include fourth rack gears 533, fourth motors 534, and fourth pinion gears 535.

The fourth rack gears 533 may be formed on both surfaces of the base 110 in the width direction thereof on the fourth plate 520. The fourth motors 534 may be disposed to face the fourth rack gears 533 at both sides of the third plate 420. Each of the fourth motors 534 may be mounted to a fixing bracket by bolting, and the shaft thereof may be disposed downward. Each of the fourth pinion gears 535 may be connected to the shaft of the associated fourth motor 534 so as to be engaged with the associated fourth rack gear 533.

When the user drives the fourth motor 534, the fourth plate 520 horizontally moves in the width direction of the base 110 by the interaction of the fourth rack gear 533 and the fourth pinion gear 535 according to the rotation direction of the shaft of the fourth motor 534.

In the embodiment of the present disclosure, the balance adjustment apparatus for a blade transport vehicle having the above configuration has an operation structure as illustrated in FIGS. 5, 6, 13, and 14.

When the ground on which the blade transport vehicle is stopped is inclined or the blade transport vehicle goes around a curve or ascends or descends a slope, there is a risk that the vehicle title and overturns due to the weight of the large blade.

In this case, the user may move the blade fixing frame 120, to which the blade adapter 151 and the slewing bearing unit 155 are mounted, by driving the first drive unit 230. That is, as illustrated in FIGS. 5 and 6, when the first drive unit 230 configured as the hydraulic cylinder 231 is operated, the position of the first plate 220 is changed by the forward or rearward movement of the rod of the hydraulic cylinder 231. Since the first plate 220 moves forward or rearward along the first guide rail 210, the first plate 220 may stably move in the longitudinal direction of the base 110.

Of course, the user may adjust the position of the balance block 130 in order to adjust the center of gravity of the vehicle in response to the movement of the blade fixing frame 120. In this case, the user moves the balance block 130 by driving the third drive unit 430. That is, as illustrated in FIGS. 5 and 6, when the third drive unit 430 configured as the hydraulic cylinder 431 is operated, the position of the balance block 130 is changed by the forward or rearward movement of the rod of the hydraulic cylinder 431. Since the third plate 420 moves forward or rearward along the third guide rail 410, the third plate 420 may stably move in the longitudinal direction of the base 110.

When the vehicle travels on a flat land as illustrated in FIG. 13, there is no need to drive the second moving device 300. This is because there is less risk that the vehicle overturns even though the position of the blade fixing frame 120 or the balance block 130 is not adjusted. However, when the road is inclined in one direction or the ground on which the vehicle is stopped for a while is inclined as illustrated in FIG. 14, there is a risk that the vehicle overturns in an inclined direction due to the blade having a weight of several tens of tons.

In this case, the user adjusts the position of the second plate 320 in a direction opposite to the inclined direction by operating the second drive unit 330 configured as the hydraulic cylinder 331. When the hydraulic cylinder 331 is operated in the state in which the rod of the hydraulic cylinder 331 is supported by the support block 332, the second plate 320 moves in the direction opposite to the inclined direction and the blade fixing frame 120 disposed at the upper end of the second plate 320 also moves in the direction opposite to the inclined direction. Thus, since the center of gravity of the vehicle is moved in the direction opposite to the inclined direction by the blade, the risk that the blade transport vehicle overturns is lowered.

The center of gravity applied to the vehicle is adjusted by the load of the blade by moving the third and fourth plates 420 and 520, which support the balance block 130, in the direction opposite to the inclined direction in the same operation manner.

Therefore, since the center of gravity of the vehicle is maintained by properly changing the position of the blade depending on the state of the road or the ground, the blade may be safely transported to the region of wind power equipment.

[Angle Adjustment Apparatus for Blade Transport Vehicle]

Hereinafter, an angle adjustment apparatus for a blade transport vehicle according to exemplary embodiments of the present disclosure will be described in detail with reference to the accompanying drawings.

Prior to description of each embodiment, the angle adjustment apparatus for a blade transport vehicle according to the present disclosure may include the following components.

The angle adjustment apparatus for a blade transport vehicle may include a base 1110 which is disposed at the upper end of a lower trailer of a blade transport vehicle, a blade fixing frame 1120 which is disposed on the base 1110, an elevation plate 1200 which is disposed at the upper end of the base 1110 and supports the blade fixing frame 1120, and elevation devices which are disposed at both sides of the base 1110 in the width direction thereof and are connected to the lower end of the elevation plate 1200.

The elevation devices include internal elevation devices 1300 which are disposed inside both sides of the base in the width direction thereof. Each of the internal elevation devices 1300 may include a first angle hydraulic cylinder 1310 which is disposed in a first seating groove formed in the base 1110, and a first support bracket 1320 which is disposed at the lower end of the elevation plate 1200 and is connected to the rod of the first angle hydraulic cylinder 1310 by a hinge.

The internal elevation device 1300 may include a second seating groove 1340 which is formed in the base 1110 and is tapered from top to down in the width direction of the base 1110, a second angle hydraulic cylinder 1370 which has a body disposed in the second seating groove 1340 and a rod connected to the lower end of the elevation plate 1200, and a second support bracket 1350 which is disposed at the lower end in the second seating groove 1340 and is connected to the body of the second angle hydraulic cylinder 1370 by a hinge.

The elevation devices include external elevation devices 1400 which are disposed outside both sides of the base in the width direction thereof. Each of the external elevation devices 1400 may include a third support bracket 1420 which is disposed at the lower end of the elevation plate 1200, and a third angle hydraulic cylinder 1410 which has a body disposed at the outer end of the base 1110 in the width direction thereof and a rod connected to the third support bracket 1420 by a hinge.

Each of both outer ends of the base 1110 is formed as a tapered portion 1115 which is tapered from down to top in the width direction of the base 1110. The external elevation device 1400 may include a fourth support bracket 1440 which is disposed on the tapered portion 1115 of the base 1110, and a fourth angle hydraulic cylinder 1460 which has a body connected to the fourth support bracket 1440 by a hinge and a rod connected to the lower end of the elevation plate 1200.

The angle adjustment apparatus for a blade transport vehicle may further include a horizontal gyro sensor 1550 which is disposed on the elevation plate 1200 or the base 1110 so as to measure an angle of inclination of the blade fixing frame 1120.

The angle adjustment apparatus for a blade transport vehicle may further include a controller 1500 which interlocks with the horizontal gyro sensor 1550 and adjusts an angle of arrangement of the elevation plate 1200. The controller 1500 may include an angle measurement device 1510 which is connected to the horizontal gyro sensor 1550 and measures the angle of inclination of the blade fixing frame 1120, an angle conversion device 1520 which converts the angle value received from the angle measurement device 1510 into an amount of hydraulic pressure, and a hydraulic drive device 1530 which adjusts the first angle hydraulic cylinder 1310 or the second angle hydraulic 1370 based on the amount of hydraulic pressure received from the angle conversion device 1520.

[First Embodiment of Angle Adjustment Apparatus for Blade Transport Vehicle]

Figure 15:
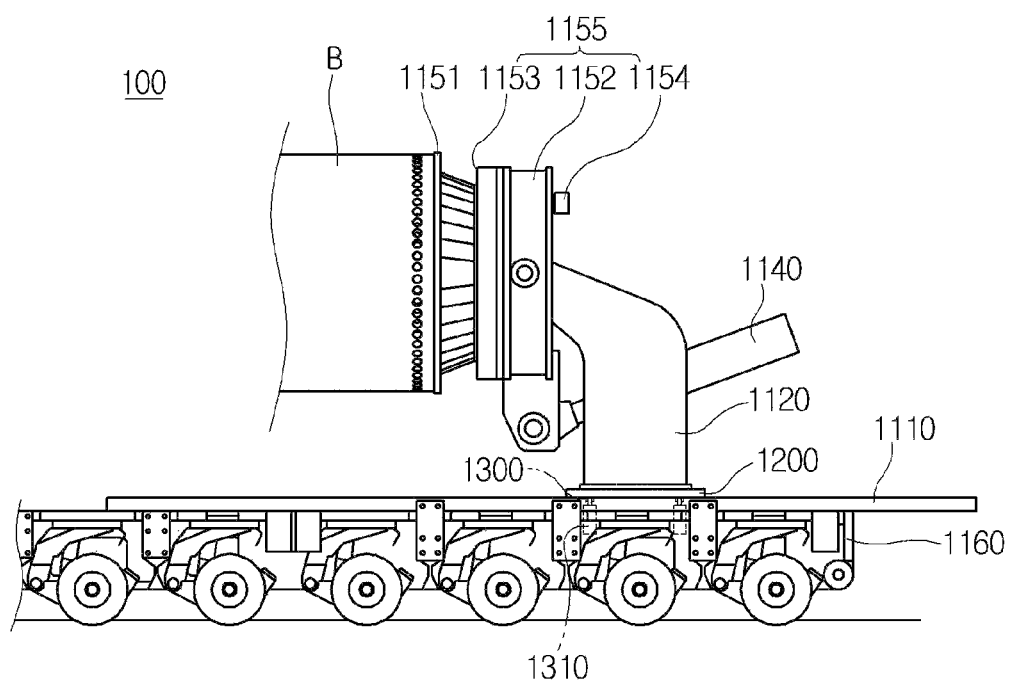
FIG. 15 is a side view illustrating a first embodiment of an angle adjustment apparatus for a blade transport vehicle according to the present disclosure.
Figure 16:
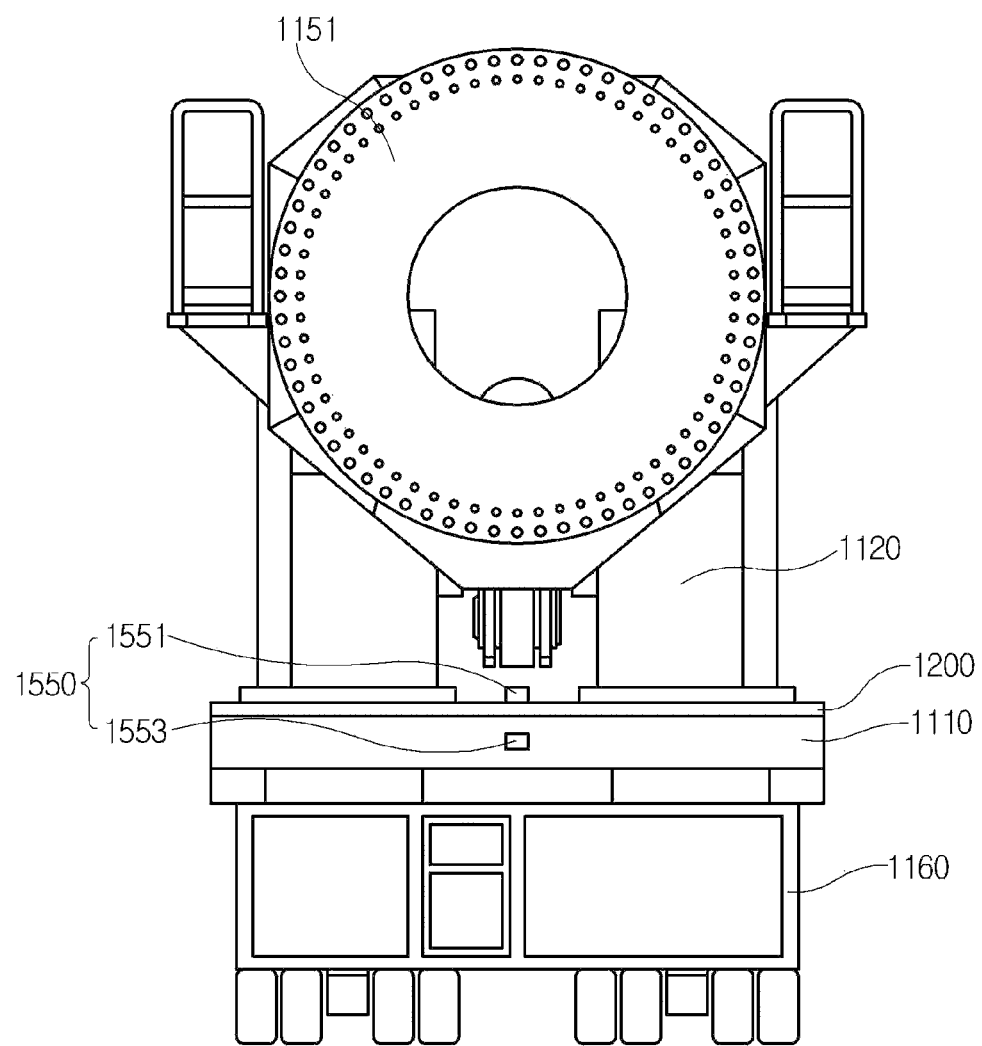
FIG. 16 is a view illustrating an operation state of the present disclosure illustrated in FIG. 15.
Figure 17:
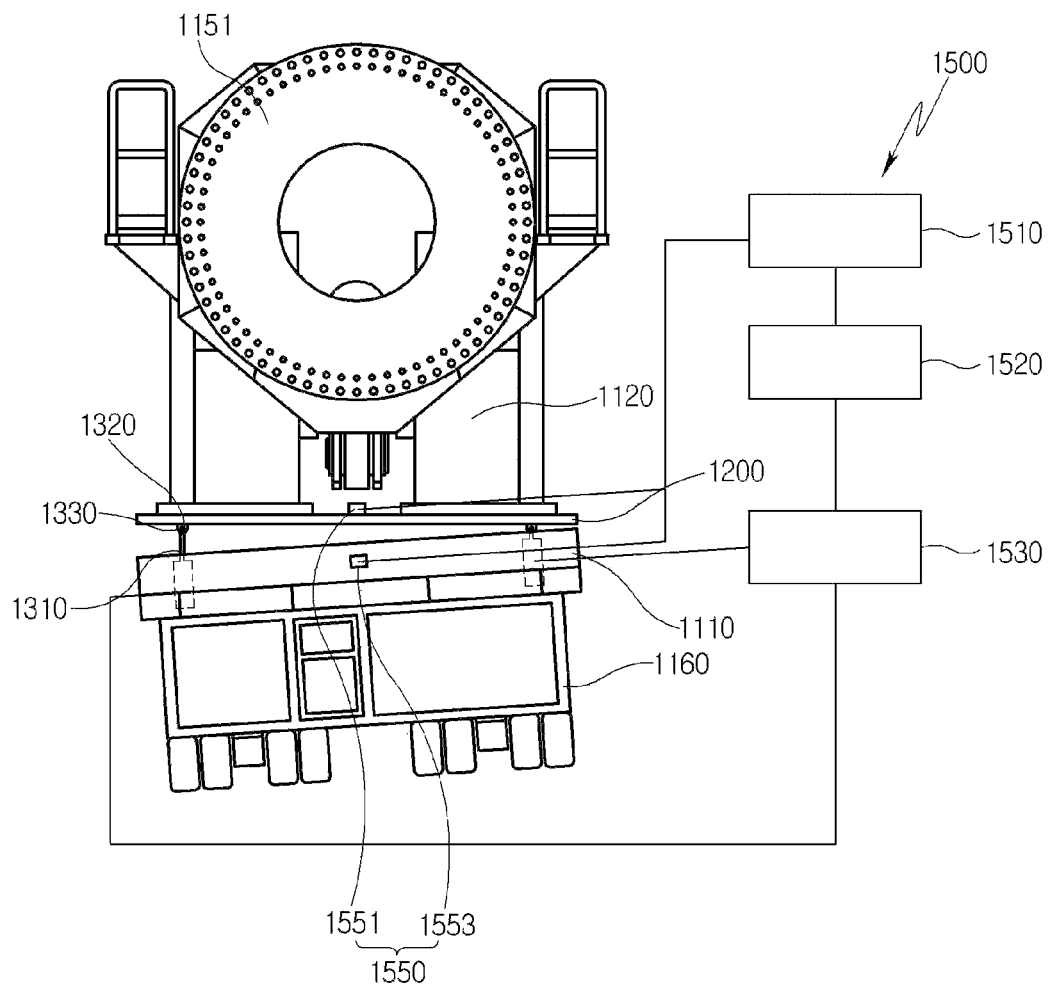
FIG. 17 is a view illustrating an operation state of the present disclosure illustrated in FIG. 15.
Figure 18:
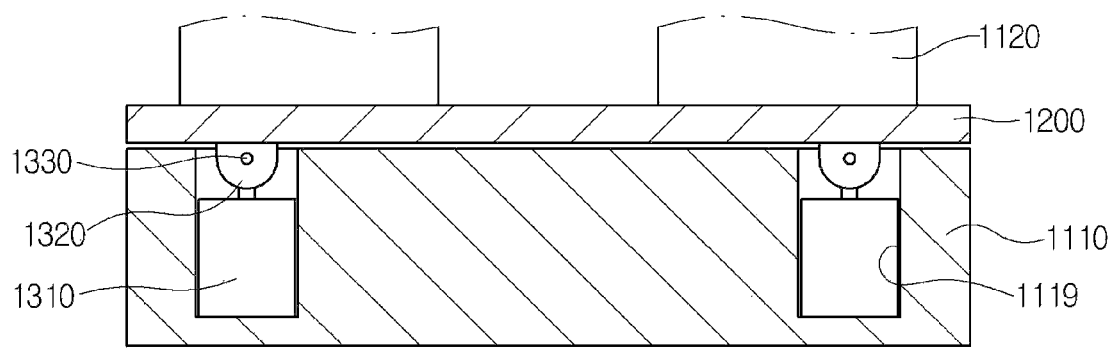
FIG. 18 is a view illustrating an embodiment of an internal elevation device of the apparatus illustrated in FIG. 15.
Figure 19:
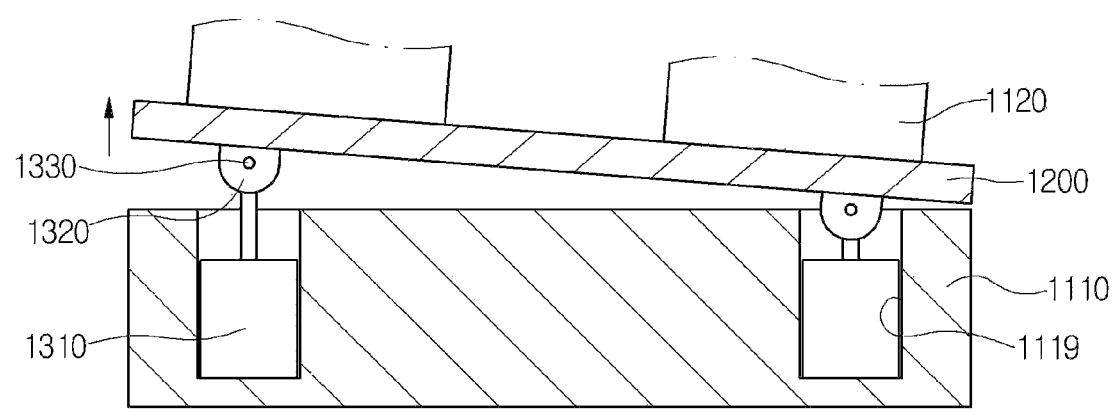
FIG. 19 is a view illustrating an embodiment of an internal elevation device of the apparatus illustrated in FIG. 15.
Figure 20:
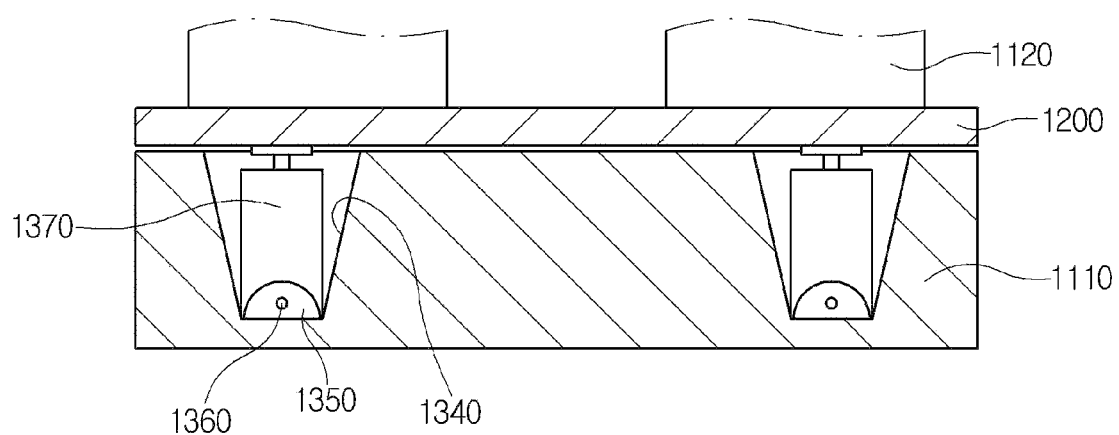
FIG. 20 is a view illustrating another embodiment of an internal elevation device of the apparatus illustrated in FIG. 15.
Figure 21:
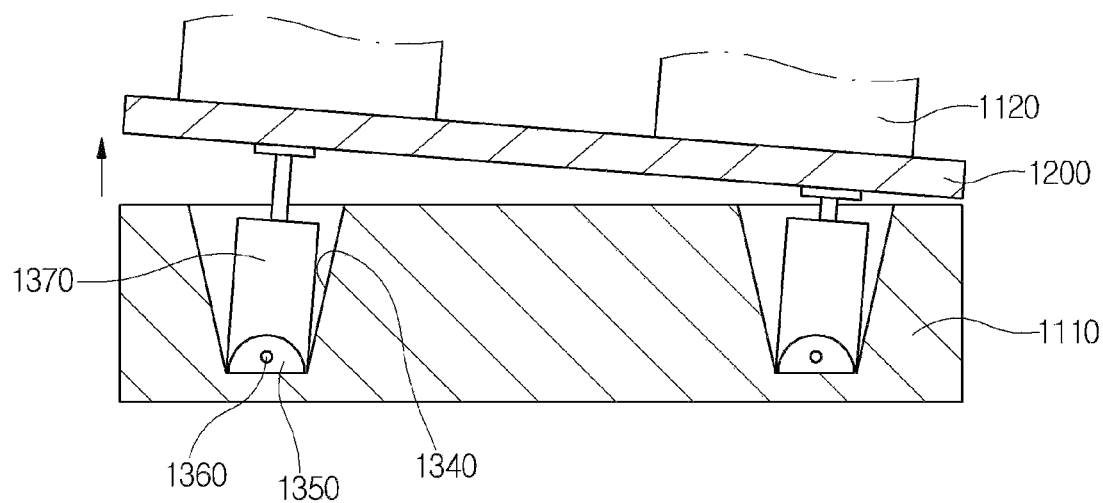
FIG. 21 is a view illustrating another embodiment of an internal elevation device of the apparatus illustrated in FIG. 15.

FIG. 15 is a side view illustrating a first embodiment of an angle adjustment apparatus for a blade transport vehicle according to the present disclosure. FIGS. 16 and 17 are views illustrating an operation state of the apparatus illustrated in FIG. 15. FIGS. 18 and 19 are views illustrating an embodiment of an internal elevation device illustrated in FIG. 15. FIGS. 20 and 21 are views illustrating another embodiment of an internal elevation device illustrated in FIG. 15.

Referring to FIGS. 15 to 21, the angle adjustment apparatus for a blade transport vehicle according to the first embodiment of the present disclosure may include a base 1110, a blade fixing frame 1120, an elevation plate 1200, and internal elevation devices 1300 which correspond to one of elevation devices.

Referring to FIG. 15, the base 1110 may be disposed at the upper end of a lower trailer 1160 of a blade transport vehicle. The lower trailer 1160 includes a main body having a plurality of wheels arranged in multiple rows, and an upper end configured to be flat in order to transport a blade. Here, the base 1110 may have a flat plate shape, and be made of a steel material for improving stiffness. The base 1110 may be coupled to the upper end of the lower trailer 1160 by bolting or welding.

The blade fixing frame 1120 may be disposed on the base 1110, and have a pair of columns made of a steel material. A slewing bearing unit 1155 and a blade adapter 1151 may be mounted on the upper end of the blade fixing frame 1120. An angle adjustment cylinder 1140 may be connected to the slewing bearing unit 1155 between the pair of steel columns.

The slewing bearing unit 1155 may include a slewing bearing 1152 and a bearing block 1153. The slewing bearing 1152 is rotatably disposed in the bearing block 1153, and a turning drive 1154 is mounted to one end of the bearing block 1153 so as to rotate the slewing bearing 1152.

The blade adapter 1151 is mounted to one side of the slewing bearing 1152 and rotates along with the slewing bearing 1152 by the turning drive 1154. The blade adapter 1151 serves to fix a heavy blade mounted to a wind turbine.

The user may circumferentially adjust the angle of the blade mounted onto the blade adapter 1511 by rotating the slewing bearing 1152, and may vertically adjust the angle of the blade mounted onto the blade adapter 1151 by operating the angle adjustment cylinder 1140.

Referring to FIGS. 16 and 17, the elevation plate 1200 may be disposed at the upper end of the base 1110 and support the blade fixing frame 1120. The elevation plate 1200 may have a flat shape and be made of a steel material.

The internal elevation devices 1300 may be disposed inside both sides of the base 1110 in the width direction thereof and be connected to the lower end of the elevation plate 1200. In the embodiment of the present disclosure, each of the internal elevation devices 1300 may include a first angle hydraulic cylinder 1310 and a first support bracket 1320.

Referring to FIGS. 18 and 19, the first angle hydraulic cylinder 1310 may be disposed in a first seating groove 1119 formed in the base 1110. The first support bracket 1320 may be disposed at the lower end of the elevation plate 1200. The rod of the first angle hydraulic cylinder 1310 may be connected to the first support bracket 1320 by a hinge 1330.

In this case, the first seating groove 1119 may have a square shape in the base 1110 and consist of four seating grooves. Thus, the first angle hydraulic cylinder 1310 disposed in the first seating groove 1119 may consist of four hydraulic cylinders. This enables the first angle hydraulic cylinders to support the respective corners of the elevation plate 1200. However, the number of first angle hydraulic cylinders is not limited thereto. The number of first angle hydraulic cylinders may be six, eight, or the like in order to the intermediate portions of the elevation plate 1200 in addition to the corners thereof.

When the user operates one first angle hydraulic cylinder 1310 on a slope in order to stabilize the arrangement position of the blade, the rod of the first angle hydraulic cylinder 1310 is lifted and the elevation plate 1200 is inclined. In this case, since the lower end of the elevation plate 1200 is connected to the rod of the first angle hydraulic cylinder 1310 by the hinge 1330 and the first support bracket 1320, a torsional load does not occur in the rod of the first angle hydraulic cylinder 1310 even though the elevation plate 1200 is inclined.

Alternatively, the internal elevation device 1300 may include a second seating groove 1340, a second angle hydraulic cylinder 1370, and a second support bracket 1350, as illustrated in FIGS. 20 and 21.

The second seating groove 1340 may be formed in the base 1110 and be tapered from top to down in the width direction of the base 1110. The body of the second angle hydraulic cylinder 1370 may be disposed in the second seating groove 1340, and the rod of the second angle hydraulic cylinder 1370 may be connected to the lower end of the elevation plate 1200 by bolting or welding. The second support bracket 1350 may be disposed at the lower end in the second seating groove 1340 and be connected to the body of the second angle hydraulic cylinder 1370 by a hinge 360.

In order to stabilize the arrangement position of the blade, the user operates the second angle hydraulic cylinder 1370 to adjust the angle of the elevation plate 1200. Since the body of the second angle hydraulic cylinder 1370 is connected to the second support bracket 1350 by the hinge 360, a torsional load does not occur according to the change of the angle of the elevation plate 1200.

Since the second seating groove 1340 is tapered therein, the second angle hydraulic cylinder 1370 may rotate in the second seating groove 1340. Although FIGS. 20 and 21 are side views, the second seating groove 1340 may consist of four seating grooves to support the respective corners of the elevation plate 1200. Thus, the second angle hydraulic cylinder 1370 may also consist of four hydraulic cylinders and support the elevation plate 1200 having a square flat shape. However, the number of second angle hydraulic cylinders is not limited thereto. The number of second angle hydraulic cylinders may be six, eight, or the like in order to the intermediate portions of the elevation plate 1200 in addition to the corners thereof.

In the first embodiment of the present disclosure, the angle adjustment apparatus for a blade transport vehicle may further include a horizontal gyro sensor 1550 which is disposed on the elevation plate 1200 so as to measure an angle of inclination of the blade fixing frame 1120.

Figure 28:
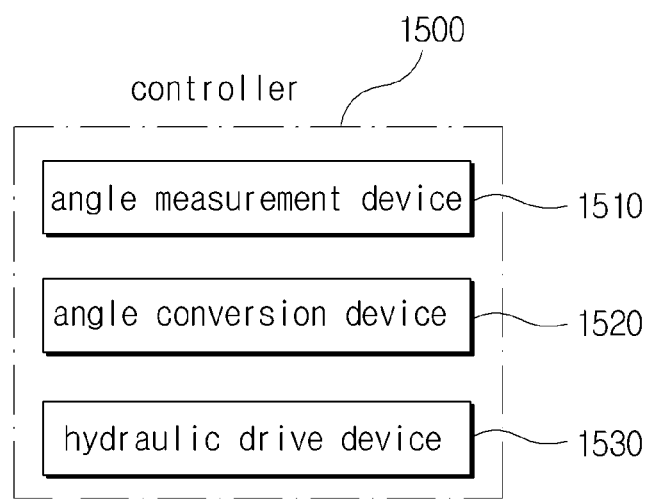
FIG. 28 is a control block diagram according to the present disclosure.

Referring to FIG. 28, the angle adjustment apparatus for a blade transport vehicle may further include a controller 1500 which interlocks with the horizontal gyro sensor 1550 and automatically adjusts an angle of arrangement of the elevation plate 1200. The controller 1500 may include an angle measurement device 1510, an angle conversion device 1520, and a hydraulic drive device 1530.

Referring to FIG. 16, it can be seen that a first horizontal sensor 1551 is mounted to the elevation plate 1200 and a second horizontal sensor 1553 is mounted to the base 1110. If the blade transport vehicle is stopped or travels on the slope, there is a risk that the vehicle leans in an inclined direction and overturns due to the blade having a weight of several tens of tons.

In order to prevent such an accident, the angle measurement device 1510 is connected to the horizontal gyro sensor 1550 and measures the angle of inclination of the blade fixing frame 1120 in real time. In this case, the first horizontal sensor 1551 measures a gradient of the elevation plate 1200 and the second horizontal sensor 1553 measures a gradient of the base 1110.

The angle measurement device 1510 transmits the above information to the angle conversion device 1520, and the angle conversion device 1520 converts the angle value, which is measured by and received from the angle measurement device 1510, into an amount of hydraulic pressure. When the converted amount of hydraulic pressure is transmitted to the hydraulic drive device 1530, the hydraulic drive device 1530 drives the first or second angle hydraulic cylinder 1310 or 1370.

Referring to FIG. 17, it can be seen that the elevation plate 1200 is located horizontally again on the slope by the operation of the first angle hydraulic cylinder 1310 disposed at one side of the base 1110. Whether or not the angle adjustment of the elevation plate 1200 is completed is performed by comparing the angle values measured by the first and second horizontal sensors 1551 and 1553. That is, when the angle adjustment device 1510 compares the angle values measured by the first and second horizontal sensors 1551 and 1553 in real time and the angle value input from the first horizontal sensor 151 is "0", the elevation plate 1200 is determined to be located horizontally. Therefore, the controller transmits a signal to the hydraulic drive device 1530, and the hydraulic drive device 1530 stops the operation of the first angle hydraulic cylinder 1310. Of course, the operation of the second angle hydraulic cylinder 1370 is performed similar to the above case.

Accordingly, sine the blade is located horizontally and stably, the risk that the blade transport vehicle overturns on the slope due to the load of the blade is prevented.

[Second Embodiment of Angle Adjustment Apparatus for Blade Transport Vehicle]

Figure 22:
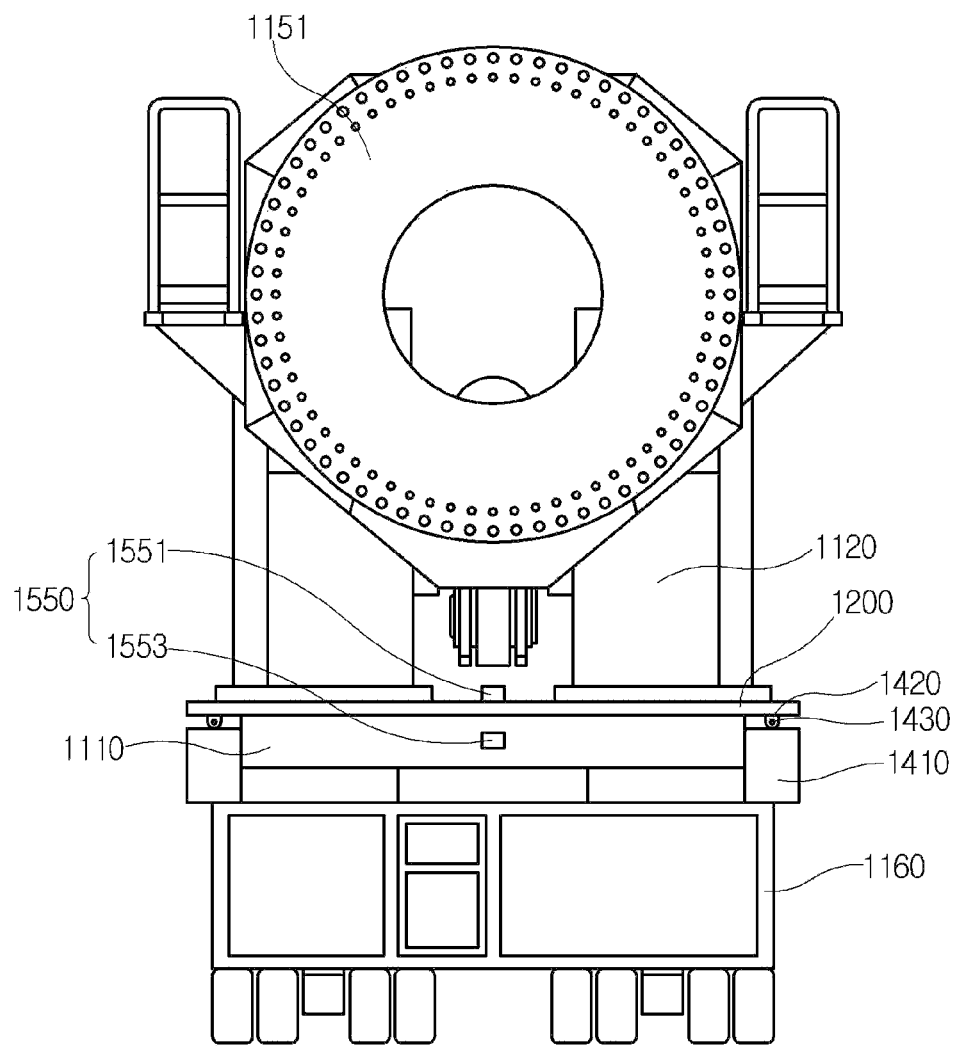
FIG. 22 is a view illustrating an operation state of a second embodiment of a blade transport vehicle according to the present disclosure.
Figure 23:
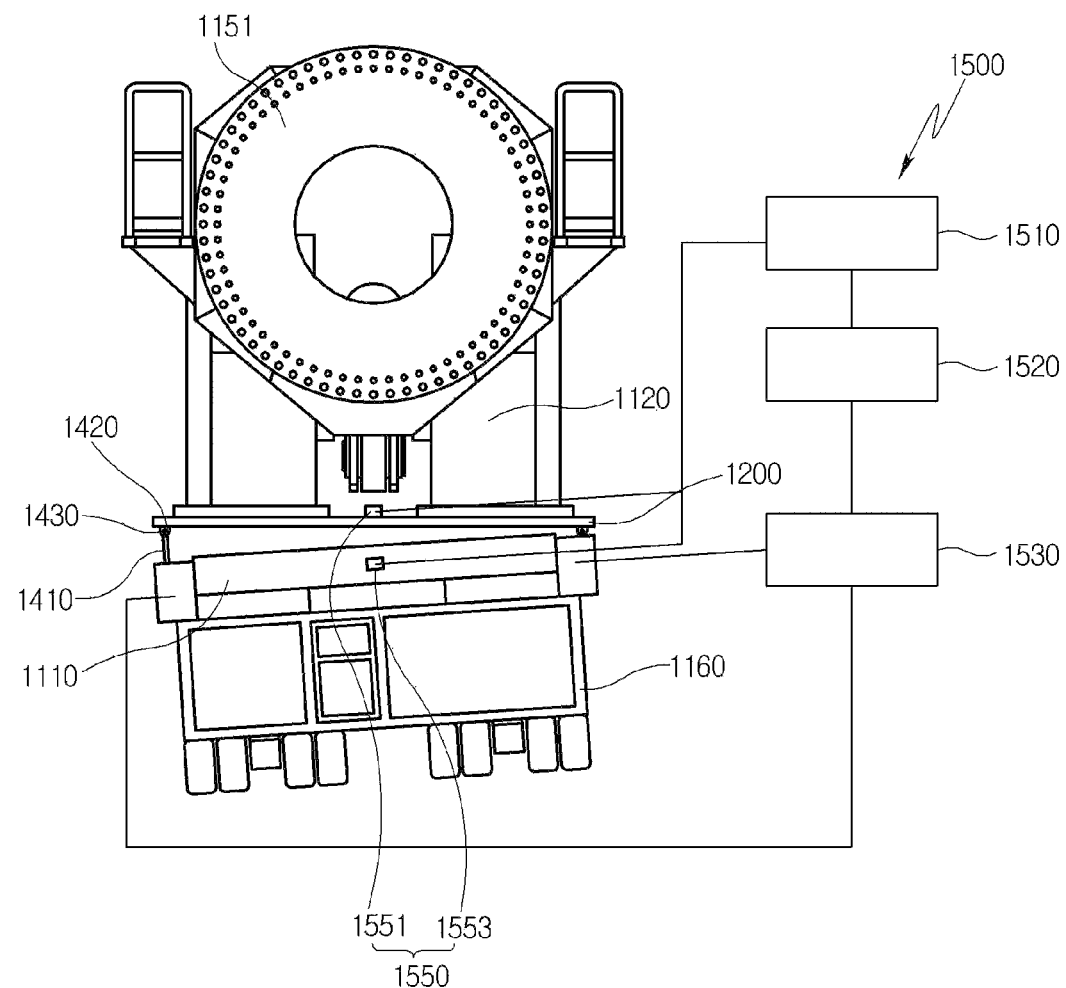
FIG. 23 is a view illustrating an operation state of a second embodiment of a blade transport vehicle according to the present disclosure.
Figure 24:
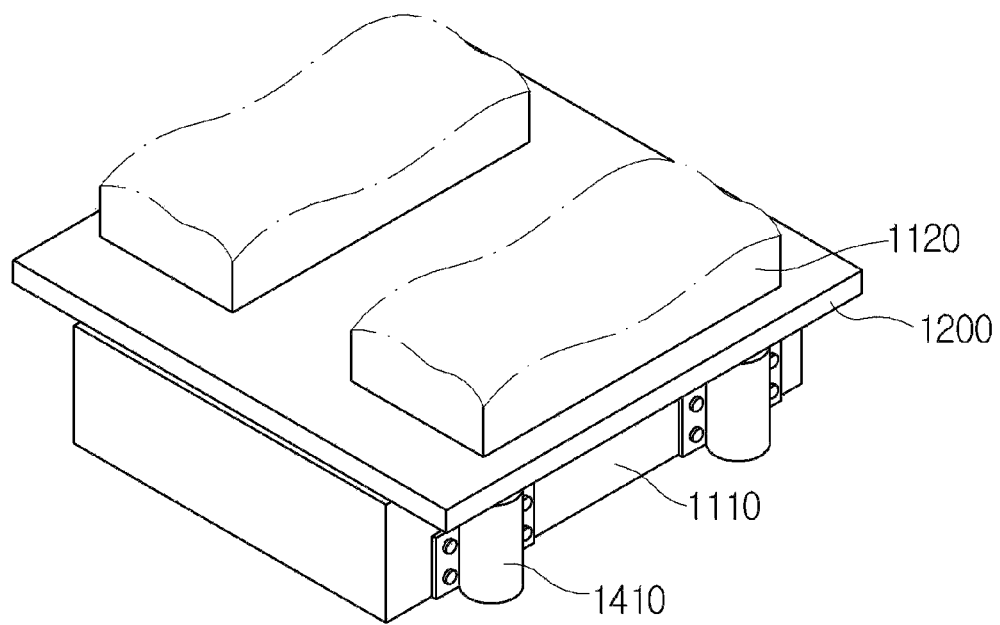
FIG. 24 is a view illustrating an embodiment of an external elevation device illustrated in FIG. 22.
Figure 25:
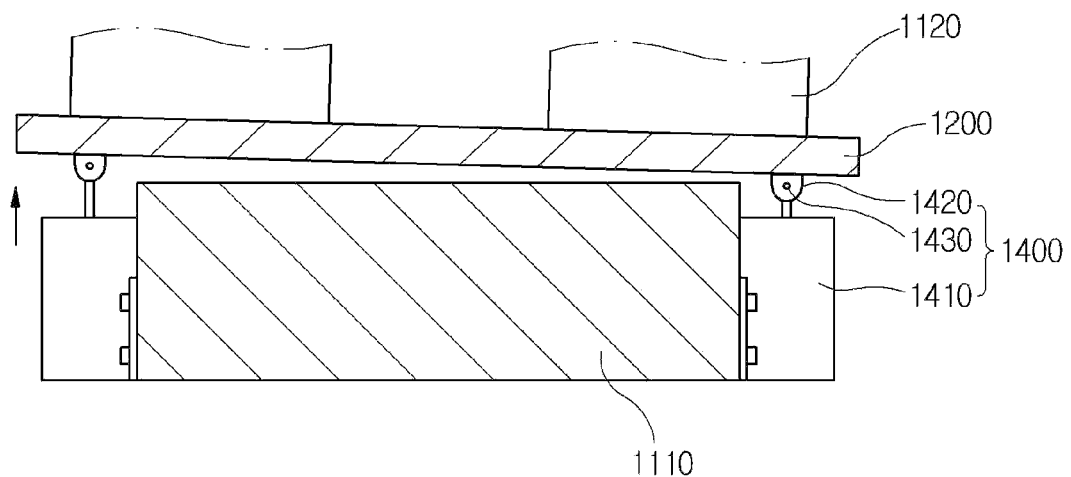
FIG. 25 is a view illustrating an embodiment of an external elevation device illustrated in FIG. 22.
Figure 26:
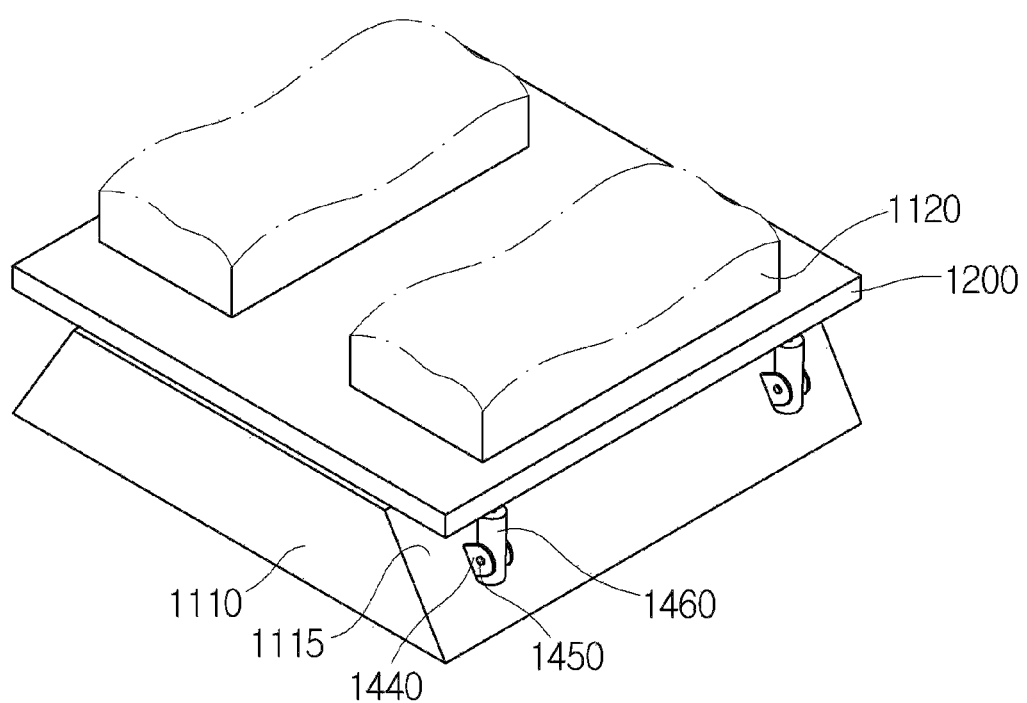
FIG. 26 is a view illustrating another embodiment of an external elevation device illustrated in FIG. 22.
Figure 27:
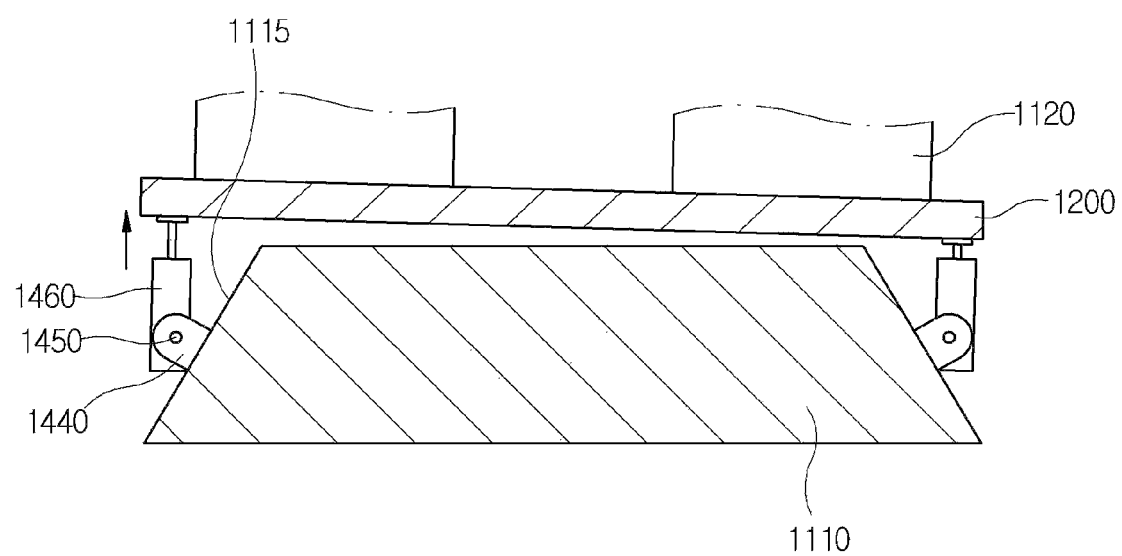
FIG. 27 is a view illustrating another embodiment of an external elevation device illustrated in FIG. 22.

FIGS. 22 and 23 are views illustrating an operation state of a second embodiment of a blade transport vehicle according to the present disclosure. FIGS. 24 and 25 are views illustrating an embodiment of an external elevation device illustrated in FIG. 22. FIGS. 26 and 27 are views illustrating another embodiment of an external elevation device illustrated in FIG. 22.

Referring to FIGS. 22 to 27, the angle adjustment apparatus for a blade transport vehicle according to the second embodiment of the present disclosure may include a base 1110, a blade fixing frame 1120, an elevation plate 1200, and external elevation devices 1400 which correspond to one of elevation devices. Since a lower trailer 1160, a stewing bearing unit 1155, an angle adjustment cylinder 1140, and a blade adapter 1151 in addition to the base 1110 and the blade fixing frame 1120 are similar to those of the first embodiment of the present invention, the basic description thereof will be omitted.

Referring to FIGS. 24 and 25, the elevation plate 1200 may be disposed at the upper end of the base 1110 and support the blade fixing frame 1120. The elevation plate 1200 may have a flat shape and be made of a steel material.

The external elevation devices 1400 may be disposed outside both sides of the base in the width direction thereof and be connected to the lower end of the elevation plate 1200. In the embodiment of the present invention, each of the external elevation devices 1400 may include a third angle hydraulic cylinder 1410 and a third support bracket 1420.

Referring to FIGS. 24 and 25, the body of the third angle hydraulic cylinder 1410 may be bolted to the outer end of the base 1110. The third support bracket 1420 may be disposed at the lower end of the elevation plate 1200. The rod of the third angle hydraulic cylinder 1410 may be connected to the third support bracket 1420 by a hinge 1430.

In this case, the third angle hydraulic cylinder 1410 may consist of a total of four hydraulic cylinders, in which case two hydraulic cylinders are disposed on each of both outer ends of the base 1110. This enables the third angle hydraulic cylinders to support the respective corners of the elevation plate 1200. However, the number of third angle hydraulic cylinders is not limited thereto. The number of third angle hydraulic cylinders may be six, eight, or the like in order to the intermediate portions of the elevation plate 1200 in addition to the corners thereof.

When the user operates one third angle hydraulic cylinder 1410 on a slope in order to stabilize the arrangement position of the blade, the rod of the third angle hydraulic cylinder 1410 is lifted and the elevation plate 1200 is inclined. In this case, since the lower end of the elevation plate 1200 is connected to the rod of the third angle hydraulic cylinder 1410 by the hinge 1430 and the third support bracket 1420, a torsional load does not occur in the rod of the third angle hydraulic cylinder 1410 even though the elevation plate 1200 is inclined.

Alternatively, the external elevation device 1400 may include a fourth angle hydraulic cylinder 1460, and a fourth support bracket 1440, as illustrated in FIGS. 26 and 27.

Each of both outer ends of the base 1110 is formed as a tapered portion 1115 which is tapered from down to top in the width direction of the base 1110. The fourth support bracket 1440 may be disposed on the tapered portion 1115 of the base 1110. The body of the fourth angle hydraulic cylinder 1460 may be connected to the fourth support bracket 1440 by a hinge 1450, and the rod of the fourth angle hydraulic cylinder 1460 may be coupled to the lower end of the elevation plate 1200 by bolting or welding.

In order to stabilize the arrangement position of the blade, the user operates the fourth angle hydraulic cylinder 1460 to adjust the angle of the elevation plate 1200. Since the body of the fourth angle hydraulic cylinder 1460 is connected to the fourth support bracket 1440 by the hinge 1450, a torsional load does not occur according to the change of the angle of the elevation plate 1200.

Since both sides of the base 1110 are tapered, the fourth angle hydraulic cylinder 1460 may rotate on the side of the base 1110. The fourth support bracket 1440 may consist of four brackets to support the respective corners of the elevation plate 1200, as illustrated in FIG. 26. Thus, the fourth angle hydraulic cylinder 1460 may also consist of four hydraulic cylinders and support the elevation plate 1200 having a square flat shape. However, the number of fourth angle hydraulic cylinders is not limited thereto. The number of fourth angle hydraulic cylinders may be six, eight, or the like in order to the intermediate portions of the elevation plate 1200 in addition to the corners thereof.

In the second embodiment of the present disclosure, the angle adjustment apparatus for a blade transport vehicle may further include a horizontal gyro sensor 1550 which is disposed on the elevation plate 1200 so as to measure an angle of inclination of the blade fixing frame 1120.

Referring to FIG. 28, the angle adjustment apparatus for a blade transport vehicle may further include a controller 1500 which interlocks with the horizontal gyro sensor 1550 and automatically adjusts an angle of arrangement of the elevation plate 1200. The controller 1500 may include an angle measurement device 1510, an angle conversion device 1520, and a hydraulic drive device 1530.

Referring to FIG. 22, it can be seen that a first horizontal sensor 1551 is mounted to the elevation plate 1200 and a second horizontal sensor 1553 is mounted to the base 1110. If the blade transport vehicle is stopped or travels on the slope, there is a risk that the vehicle leans in an inclined direction and overturns due to the blade having a weight of several tens of tons.

In order to prevent such an accident, the angle measurement device 1510 is connected to the horizontal gyro sensor 1550 and measures the angle of inclination of the blade fixing frame 1120 in real time. In this case, the first horizontal sensor 1551 measures a gradient of the elevation plate 1200 and the second horizontal sensor 1553 measures a gradient of the base 1110.

The angle measurement device 1510 transmits the above information to the angle conversion device 1520, and the angle conversion device 1520 converts the angle value, which is measured by and received from the angle measurement device 1510, into an amount of hydraulic pressure. When the converted amount of hydraulic pressure is transmitted to the hydraulic drive device 1530, the hydraulic drive device 1530 drives the third or fourth angle hydraulic cylinder 1410 or 1460.

Referring to FIG. 23, it can be seen that the elevation plate 1200 is located horizontally again on the slope by the operation of the first angle hydraulic cylinder 1310 disposed at one side of the base 1110. Whether or not the angle adjustment of the elevation plate 1200 is completed is performed by comparing the angle values measured by the first and second horizontal sensors 1551 and 1553. That is, when the angle adjustment device 1510 compares the angle values measured by the first and second horizontal sensors 1551 and 1553 in real time and the angle value input from the first horizontal sensor 151 is "0", the elevation plate 1200 is determined to be located horizontally. Therefore, the controller transmits a signal to the hydraulic drive device 1530, and the hydraulic drive device 1530 stops the operation of the third angle hydraulic cylinder 1410. Of course, the operation of the fourth angle hydraulic cylinder 1460 is performed similar to the above case.

Accordingly, sine the blade is located horizontally and stably, the risk that the blade transport vehicle overturns on the slope due to the load of the blade is prevented.

[Safety Control System for Blade Transport Vehicle]

Hereinafter, a safety control system for a blade transport vehicle according to exemplary embodiments of the present disclosure will be described in detail with reference to the accompanying drawings.

Prior to description of each embodiment, the safety control system for a blade transport vehicle according to the present disclosure may include the following components.

The safety control system for a blade transport vehicle may include a wind vane and anemometer 2310 which is disposed at the end of a blade so as to measure a wind direction and a wind speed applied to the blade, at least one acceleration sensor 2320 which is disposed in the longitudinal direction of the blade to measure the rolling of the blade, and a controller 2200 which adjusts the position of the blade based on the values obtained by measuring the wind direction and speed applied to the blade and the rolling of the blade.

The controller 2200 may include a wind direction and speed measurement device 2210 which receives information on the wind direction and speed applied to the blade from the wind vane and anemometer 2310 in real time, and an acceleration measurement device 2220 which receives information on the rolling acceleration generated in the blade from the acceleration sensor 2320 in real time.

The safety control system for a blade transport vehicle may further include a first angle sensor 2330 which is disposed in a slewing bearing unit of a blade transport vehicle in order to measure an angle of inclination of the blade to the rod of a hydraulic cylinder 2140.

The safety control system for a blade transport vehicle may further include a second angle sensor 2340 which is disposed in a base 2110 of the blade transport vehicle in order to measure an angle of inclination of the vehicle to the ground.

The controller 2200 may further include an angle measurement device 2230 which receives information on the angle of inclination of the blade from the first angle sensor 2330 and information on the angle of inclination of the vehicle from the second angle sensor 2340.

The controller 2200 may further include a conversion device 2240 which converts the information, received from the wind direction and speed measurement device 2210, the acceleration measurement device 2220, and the angle measurement device 2230, into an amount of hydraulic pressure corresponding to the changed angle value of the blade or the changed rotation value of the blade.

The controller 2200 may further include a hydraulic drive device 2250 which adjusts the hydraulic cylinder 2140 according to the amount of hydraulic pressure received from the conversion device 2240, and a rotation drive device 2260 which rotates a slewing bearing 2153 according to the changed rotation value received from the conversion device 2240.

The controller 2200 may further include a limit device 2270 which drives the conversion device 2240 only when the measured values exceed the preset limit values of wind direction and speed applied to the blade, the preset limit rolling acceleration value of the blade, and the preset limit gradient value of the blade.

Figure 29:
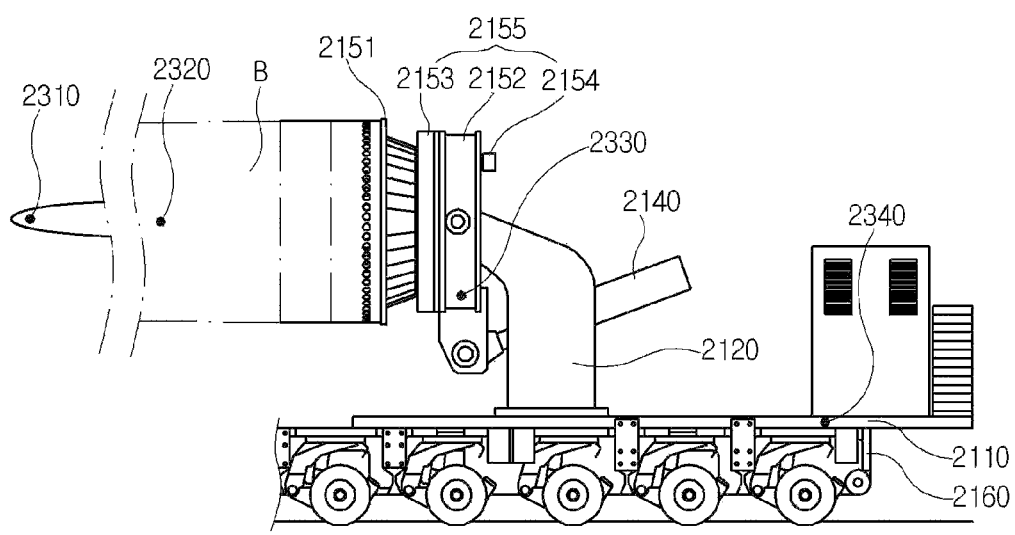
FIG. 29 is a view illustrating a safety control system for a blade transport vehicle according to the present disclosure.
Figure 30:
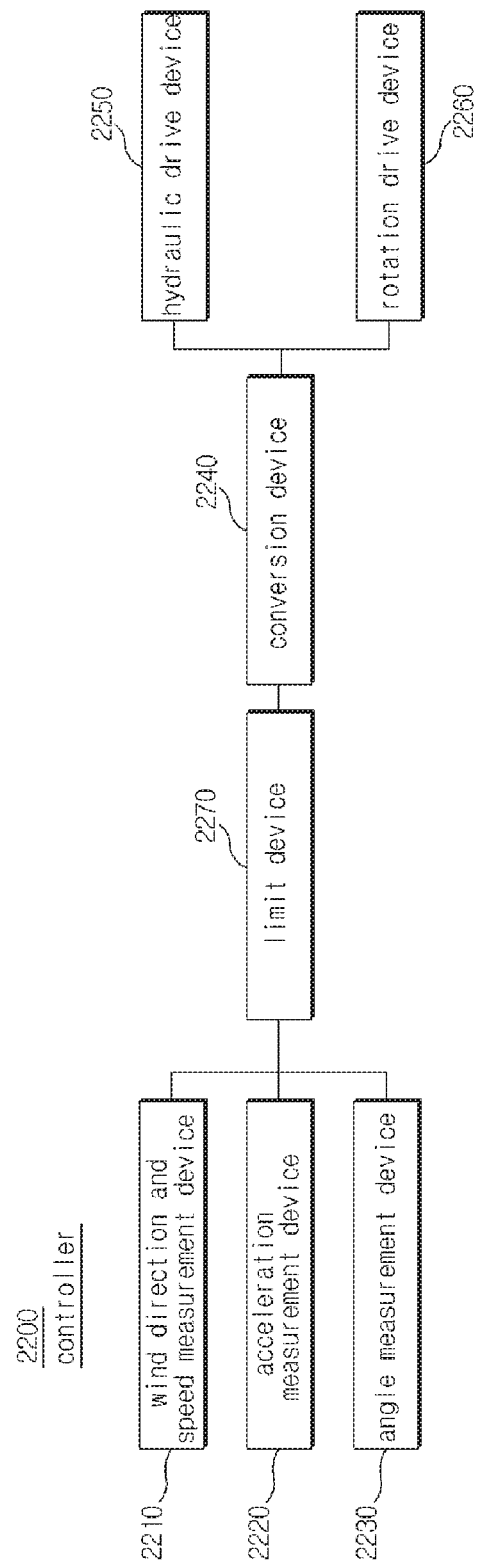
FIG. 30 is a control block diagram of the present disclosure illustrated in FIG. 29.
Figure 31:
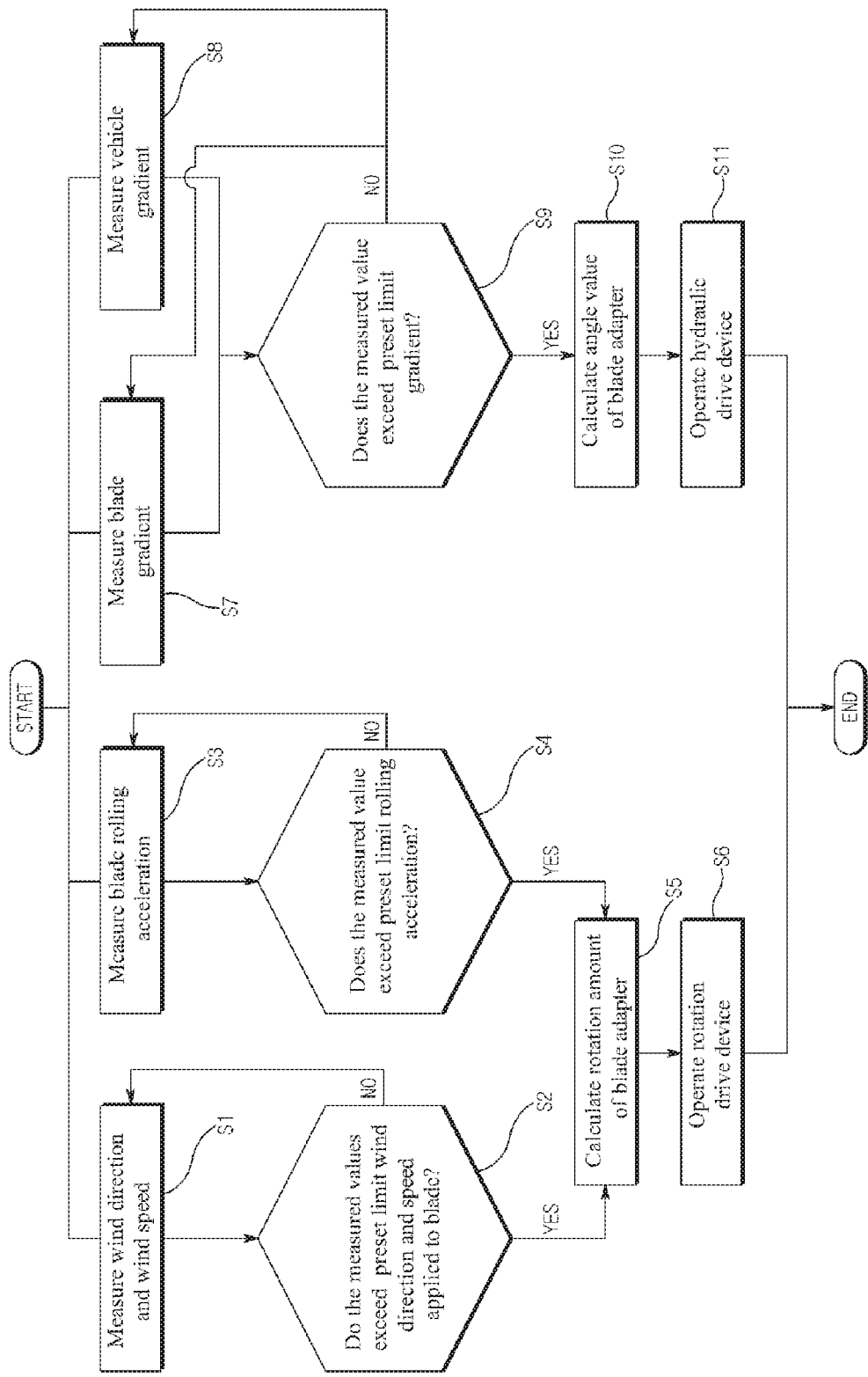
FIG. 31 is a flowchart of the present disclosure illustrated in FIG. 30.
Figure 32:
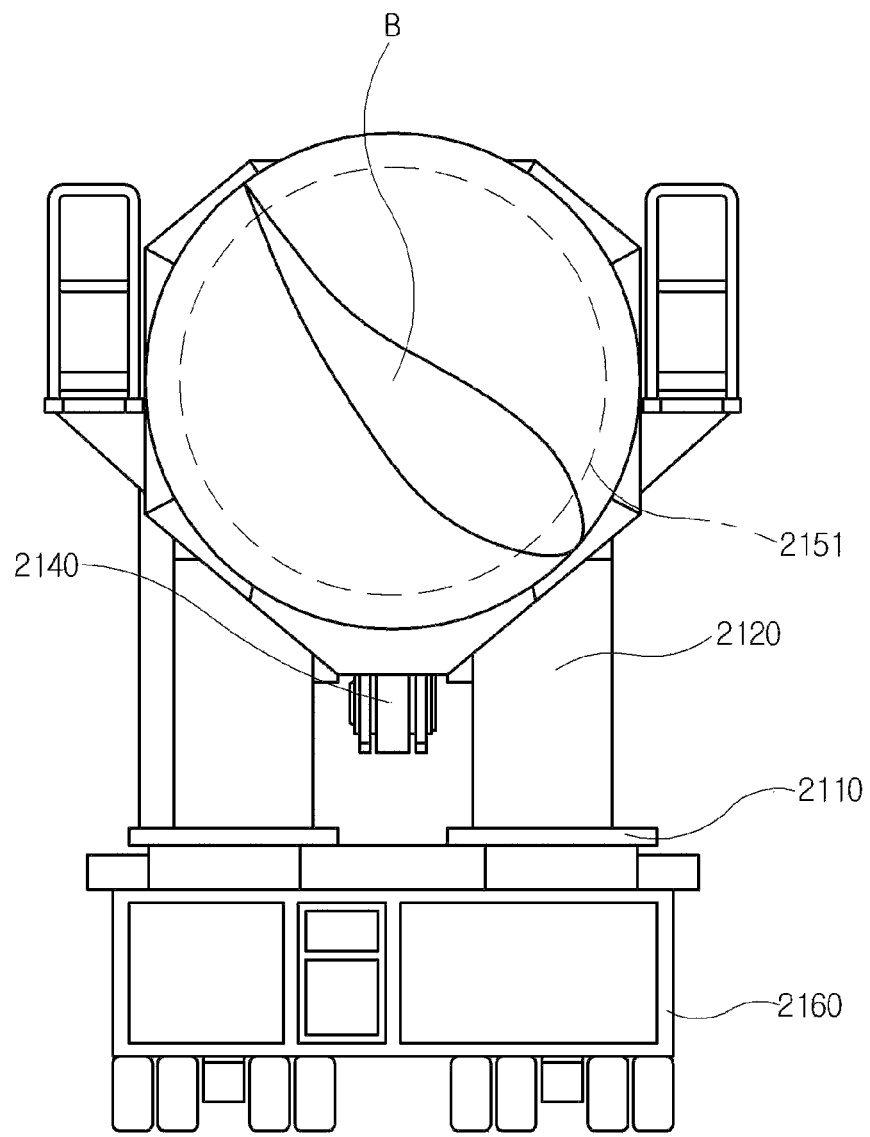
FIG. 32 is a view illustrating a state in which a blade is rotated corresponding to a wind direction and a wind speed or the rolling of the blade by the wind direction and the wind speed.
Figure 33:
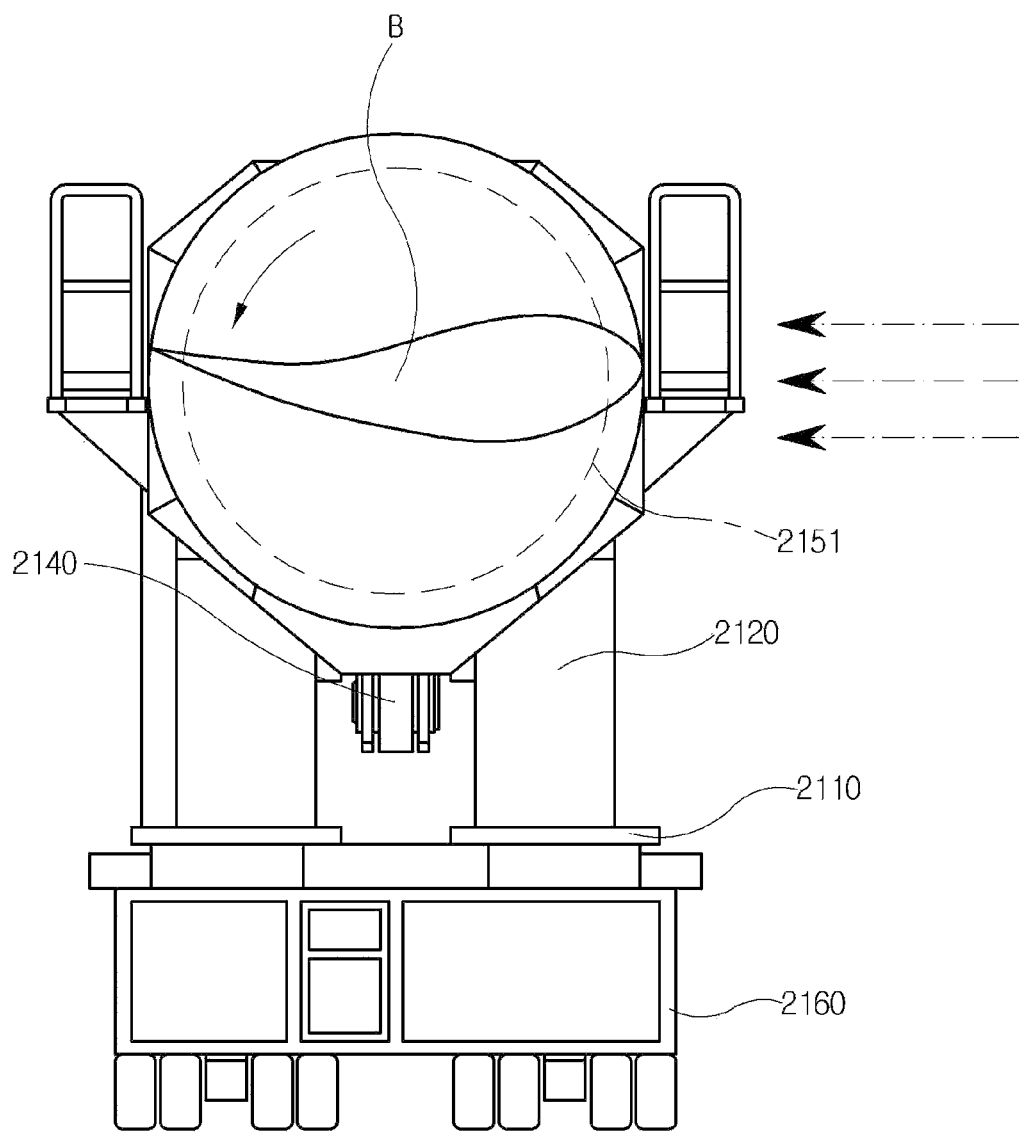
FIG. 33 is a view illustrating a state in which a blade is rotated corresponding to a wind direction and a wind speed or the rolling of the blade by the wind direction and the wind speed.
Figure 34:
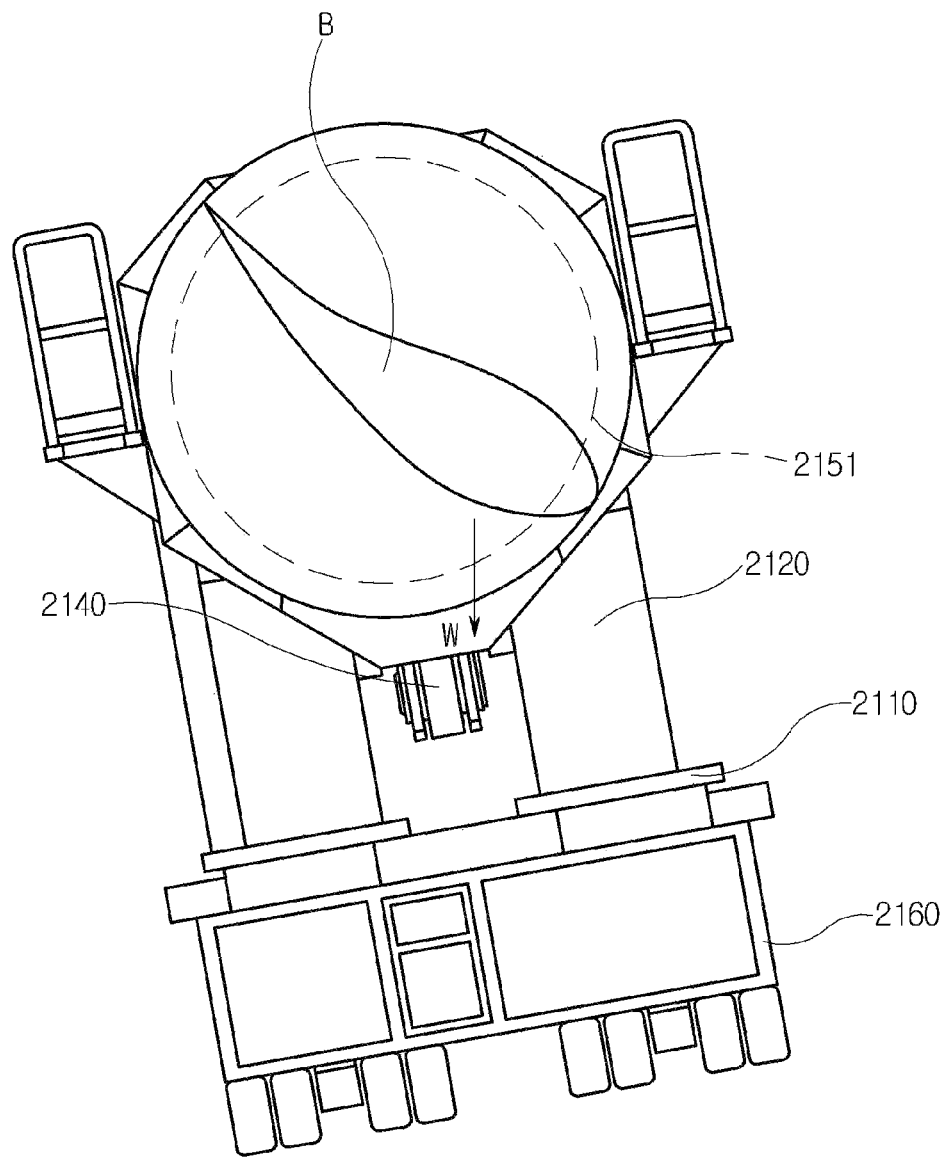
FIG. 34 is a view illustrating a state in which a blade is rotated corresponding to a gradient of the ground or the rolling of the blade by the gradient of the ground.
Figure 35:
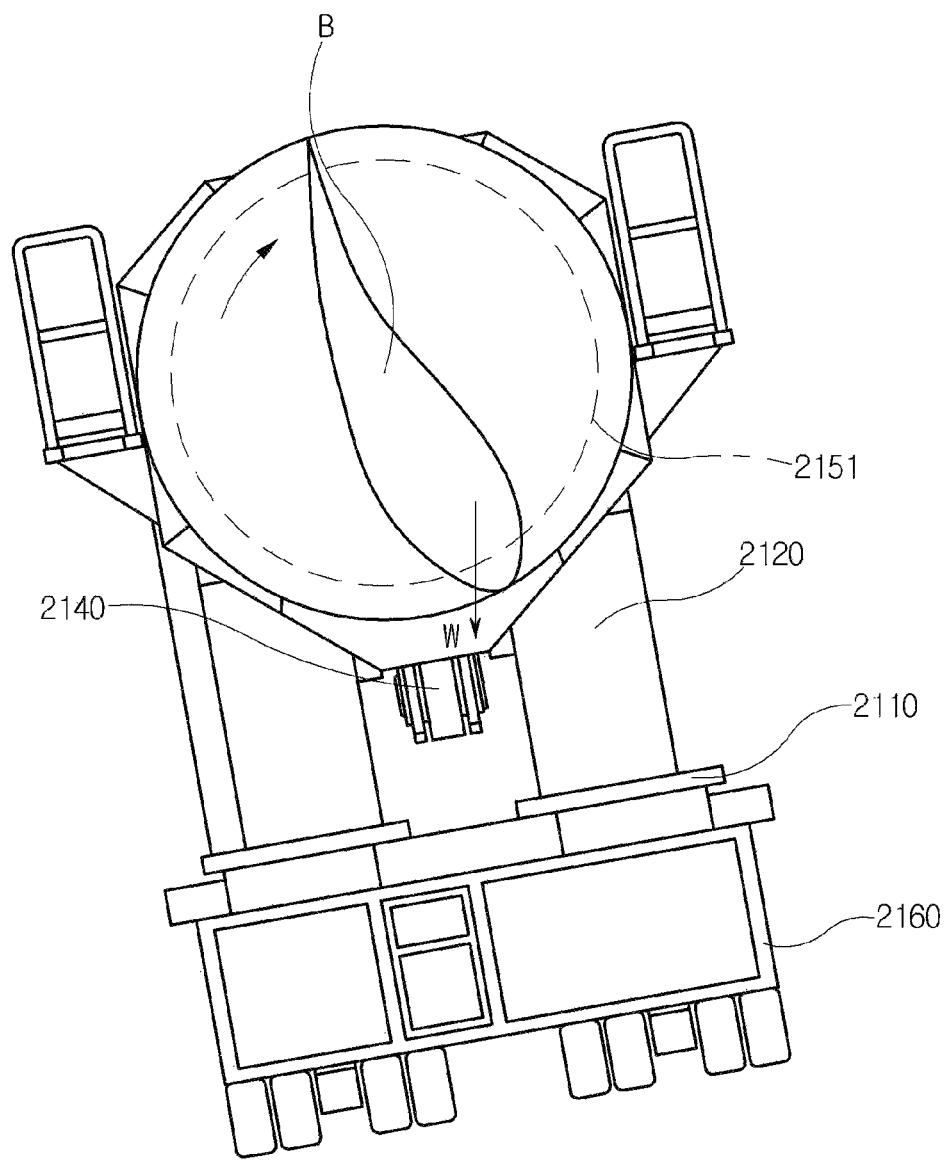
FIG. 35 is a view illustrating a state in which a blade is rotated corresponding to a gradient of the ground or the rolling of the blade by the gradient of the ground.

FIG. 29 is a view illustrating an embodiment of a safety control system for a blade transport vehicle according to the present disclosure. FIG. 30 is a control block diagram of the system illustrated in FIG. 29. FIG. 31 is a flowchart of the control block diagram illustrated in FIG. 30. FIGS. 32 and 33 are views illustrating a state in which a blade is rotated corresponding to a wind direction and a wind speed or the rolling of the blade by the wind direction and the wind speed. FIGS. 34 and 35 are views illustrating a state in which a blade is rotated corresponding to a gradient of the ground or the rolling of the blade by the gradient of the ground.

Referring to FIGS. 29 to 31, the safety control system for a blade transport vehicle according to the embodiment of the present disclosure may include a wind vane and anemometer 2310, an acceleration sensor 2320, a first angle sensor 2330, a second angle sensor 2340, and a controller 2200.

Prior to description, a blade transport vehicle applied to the present disclosure may include a lower trailer 2160, a base 2110, a blade fixing frame 2120, a hydraulic cylinder 2140, a slewing bearing unit 2155, and a blade adapter 2151, as illustrated in FIG. 29.

The base 2110 may be disposed at the upper end of the lower trailer 2160 of the blade transport vehicle. The lower trailer 2160 includes a main body having a plurality of wheels arranged in multiple rows, and an upper end configured to be flat in order to transport a blade. Here, the base 2110 may have a flat plate shape, and be made of a steel material for improving stiffness. The base 2110 may be coupled to the upper end of the lower trailer 2160 by bolting or welding. The lower trailer 2160 may be connected to a tow truck having an engine, a driver seat, etc., so as to be moved thereby.

The blade fixing frame 2120 may be disposed on the base 2110, and have a pair of columns made of a steel material. A slewing bearing unit 2155 and a blade adapter 2151 may be mounted on the upper end of the blade fixing frame 2120. An angle adjustment cylinder 2140 may be connected to the slewing bearing unit 2155 between the pair of steel columns.

The slewing bearing unit 2155 may include a slewing bearing 2152 and a bearing block 2153. The slewing bearing 2152 is rotatably disposed in the bearing block 2153, and a turning drive 2154 is mounted to one end of the bearing block 2153 so as to rotate the slewing bearing 2152.

The blade adapter 2151, to which one end of the blade is assembled, is mounted to one side of the slewing bearing 2152 and rotates along with the slewing bearing 2152 by the turning drive 2154. The blade adapter 2151 serves to fix a heavy blade mounted to a wind turbine.

The user may circumferentially adjust the angle of the blade mounted onto the blade adapter 2151 by rotating the slewing bearing 2152, and may vertically adjust the angle of the blade mounted onto the blade adapter 2151 by operating the angle adjustment cylinder 2140.

The wind vane and anemometer 2310 may be disposed at the other end of the blade so as to measure a wind direction and a wind speed applied to the blade. Referring to FIG. 29, it can be seen that the wind vane and anemometer 2310 is mounted to the tip of the blade. This is because the tip of the blade is largely affected by the wind direction and the wind speed.

Since one end of the blade is fixedly assembled to the blade adapter 2151, it is not nearly affected by the wind direction and the wind speed. However, since the other end of the blade is fixed by a belt or a wire, external force is generated in the blade by substantial wind when the specific curved surface of the blade is directed to windward. This external force acts as force that deteriorates the fixing force of the blade and changes the position of the blade.

When the wind speed is strong and the specific curved surface of the blade is directed to windward, the strong wind speed acts as external force that pushes the blade. This external force consistently acts as a load that deteriorates the fixing force of the blade and separates the blade from the blade adapter 2151.

Accordingly, in the embodiment of the present disclosure, the wind vane and anemometer 2310 is disposed at the tip of the blade to measure the wind direction and speed applied to the blade, and the controller 2200 adjusts the arrangement position of the blade by adjusting the angle of rotation of the blade adapter 2151 based on the measured wind direction and speed value, as illustrated in FIGS. 32 and 33. That is, since the blade rotated by wind has a curved shape, it is possible to reduce external force (load) due to wind by changing the surface of the blade facing the wind.

The at least one acceleration sensor 2320 may be disposed in the longitudinal direction of the blade to measure the rolling of the blade. The rolling of the blade may occur due to the wind direction and speed applied to the blade while the vehicle is traveling, or may occur due to the gradient of the road and when the vehicle travels on the slope.

When the rolling consistently occurs in the blade, it is difficult for the driver to control the vehicle while driving the vehicle and vibration or shock consistently occurs in the connection between the blade end and the blade adapter 2151. This disturbs the stable transportation of the blade.

Accordingly, in the embodiment of the present disclosure, the at least one acceleration sensor 2320 is disposed in the longitudinal direction of the blade to measure the rolling of the blade, and the controller 2200 adjusts the arrangement position of the blade by adjusting the angle of rotation of the blade adapter 2151 based on the measured rolling value of the blade, as illustrated in FIGS. 34 and 35.

That is, when the surface of the blade, which is largely affected by external force due to wind, is changed by rotating the curved blade, it is possible to relieve the rolling value of the blade due to wind. When the vehicle travels on the slope, it is possible to relieve the rolling value of the blade by rotating the blade and adjusting the center of gravity of the blade. Since the blade itself has a curved cross section, it is possible to stably adjust the center of gravity of the blade relative to the inclined ground by rotating the blade adapter 2151.

The first angle sensor 2330 may be disposed in the slewing bearing unit 2155 in order to measure an angle of inclination of the blade to the rod of the hydraulic cylinder 2140. The second angle sensor 2340 may be disposed in the base 2110 of the blade transport vehicle in order to measure an angle of inclination of the vehicle to the ground.

Referring to FIG. 29, it can be seen that the first angle sensor 2330 is disposed at the lower portion of the bearing block 2152 constituting the slewing bearing unit 2155. When the user adjusts the angle of the slewing bearing unit 2155 by driving the hydraulic cylinder 2140, the angle of the blade adapter 2151 assembled to the slewing bearing unit 2155 is also adjusted. Thus, the angle of the blade mounted to the blade adapter 2151 is also determined. The first angle sensor 2330 measures whether the blade is located horizontally to the center line of the rod of the hydraulic cylinder 2140 or whether the blade is lifted at some angle in real time.

Referring to FIG. 29, it can be seen that the second angle sensor 2340 is mounted on the base 2110 disposed at the upper end of the lower trailer 2160. When the vehicle travels on the slope or is stopped in the region of wind power equipment to install the blade, the second angle sensor 2340 measures an angle formed by the ground and the vehicle.

In this case, the controller 2200 drives the hydraulic cylinder 2140 and changes an angle of arrangement of the blade so as to stably adjust the center of gravity of the blade in response to a current gradient, based on the angle values of the blade and the vehicle received from the first and second angle sensors 2330 and 2340.

Referring to FIGS. 30 and 31, the controller 2200 performs a function that measures the values of wind direction and speed applied to the blade, the rolling value of the blade, and the gradient value of the blade and properly adjusts the position of the blade. The controller 2200 may include a wind direction and speed measurement device 2210, an acceleration measurement device 2220, an angle measurement device 2230, a conversion device 2240, a hydraulic drive device 2250, a rotation drive device 2260, and a limit device 2270.

The wind direction and speed measurement device 2210 receives information on the wind direction and speed applied to the blade from the wind vane and anemometer 2310 in real time (S1). The acceleration measurement device 2220 receives information on the rolling acceleration generated in the blade from the acceleration sensor 2320 in real time (S3). The angle measurement device 2230 receives information on the angle of inclination of the blade from the first angle sensor 2330 (S7) and receives information on the angle of inclination of the vehicle from the second angle sensor 2340 (S8).

The limit device 2270 may drive the conversion device 2240 only when the measured values exceed the preset limit values of wind direction and speed applied to the blade, the preset limit rolling acceleration value of the blade, and the preset limit gradient value of the blade (S2, S4, and S9).

That is, the limit device 2270 determines whether or not to give an operation signal to the conversion device 2240 such that the rotation drive device 2260 may be operated only when the values of wind direction and speed applied to the blade, which are received from the wind vane and anemometer 2310 in real time, exceed the maximum allowable wind direction and speed values of the blade while the vehicle is traveling (S2). In this case, the user may preset the maximum allowable wind direction and speed values of the blade as limit wind direction and speed values. In this case, the limit device 2270 operates the conversion device 2240 only when the measured values exceed the preset limit wind direction and speed values.

The limit device 2270 determines whether or not to give an operation signal to the conversion device 2240 such that the rotation drive device 2260 may be operated only when the rolling acceleration value of the blade, which is received from the acceleration sensor 2320 in real time, exceeds a maximum allowable rolling acceleration value for the safety of the vehicle while the vehicle is traveling (S4).

In this case, the user may also preset the maximum allowable rolling acceleration value of the blade as a limit rolling acceleration value. In this case, the limit device 2270 operates the conversion device 2240 only when the measured value exceeds the preset limit rolling acceleration value.

Similarly, the limit device 2270 determines whether or not to give an operation signal to the conversion device 2240 such that the hydraulic drive device 2250 may be operated only when the gradient value of the blade, which is received from the first and second angle sensors 2330 and 2340 in real time, exceeds a maximum allowable gradient value of the blade at which safety is not disturbed when the vehicle travels (S9).

Similar to the limit wind direction and speed values and the limit rolling acceleration value, the user may preset the maximum allowable gradient value of the blade as a limit gradient value. In this case, the limit device 2270 operates the conversion device 2240 only when the measured value exceeds the preset limit gradient value.

The conversion device 2240 converts the information, received from the wind direction and speed measurement device 2210, the acceleration measurement device 2220, and the angle measurement device 2230, into an amount of hydraulic pressure corresponding to the changed angle value of the blade or the changed rotation value of the blade (S5 and S10). As described above, the limit device 2270 may operate the conversion device 2240 only when the respective measured values exceed the limit values of information.

That is, the conversion device 2240 converts the wind direction and speed values received from the wind direction and speed measurement device 2210 into a rotation value at which the position of the blade is changed (S5). This serves to determine a rotation amount of the turning drive 2154 for rotating the slewing bearing 2153 connected to the blade adapter 2151. When the turning drive 2154 rotates based on the rotation value converted by the conversion device 2240, the position of the blade is changed by the rotation amount of the turning drive 2154. FIGS. 32 and 33 illustrate the state in which the arrangement position of the blade is changed by rotating the blade adapter 2151 according to the wind direction and the wind speed.

The conversion device 2240 converts the rolling acceleration value received from the acceleration measurement device 2220 into a rotation value at which the position of the blade is changed (S5). This serves to determine a rotation amount of the turning drive 2154 for rotating the slewing bearing 2153 connected to the blade adapter 2151. When the turning drive 2154 rotates based on the rotation value converted by the conversion device 2240, the position of the blade is changed by the rotation amount of the turning drive 2154. FIGS. 34 and 35 illustrate the state in which the arrangement position of the blade is changed by rotating the blade adapter 2151 in order to relieve the rolling of the blade generated by the inclined ground.

The conversion device 2240 converts the angle value received from the angle measurement device 2230 into an amount of hydraulic pressure at which the position of the blade is changed (S10). This serves to determine an amount of hydraulic pressure for operating the hydraulic cylinder 2140. When the rod of the hydraulic cylinder is extended based on the amount of hydraulic pressure converted by the conversion device 2240, the angle of arrangement of the blade is changed by the amount of hydraulic pressure. Referring to FIG. 29, it is possible to determine how to operate the hydraulic cylinder 2140 according to the inclination of the ground.

When the changed rotation value or the amount of hydraulic pressure is determined by the conversion device 2240, the signal is given to the hydraulic drive device 2250 and the rotation drive device 2260 (S6 and S11). The hydraulic drive device 2250 adjusts the hydraulic cylinder 2140 according to the amount of hydraulic pressure received from the conversion device 2240 (S6). The rotation drive device 2260 rotates the slewing bearing 2153 according to the changed rotation value received from the conversion device 2240 (S11). Accordingly, since the blade is properly arranged according to the wind direction and speed, the ground state, etc. when the vehicle travels or is stopped, the vehicle can stably transport the blade.

[Adapter Positioning Apparatus for Blade Transport Vehicle]

Hereinafter, an adapter positioning apparatus for a blade transport vehicle according to exemplary embodiments of the present disclosure will be described in detail with reference to the accompanying drawings.

Prior to description of each embodiment, the adapter positioning apparatus for a blade transport vehicle according to the present disclosure may include the following components.

The adapter positioning apparatus for a blade transport vehicle may include a slewing bearing unit 3160 which is mounted at a fixed frame 3120 disposed at the upper end of a base 3110 of a blade transport vehicle 100, an angle adjustment cylinder 3140 which is connected to the slewing bearing unit 3160 and is disposed at the fixed frame 3120 so as to adjust the angle of the slewing bearing unit 3160, a blade adapter 3150 which is rotatably connected to the slewing bearing unit 3160 so as to fix one end of a blade, and a positioning device 3200 which is disposed to interlock with the slewing bearing unit 3160 and the blade adapter 3150 so as to adjust the position of the blade adapter 3150.

The slewing bearing unit 3160 may include a bearing block 3161 which is disposed at the upper end of the fixed frame 3120, a slewing bearing 3163 which is disposed at the bearing block 3161 and is connected to one end of the blade adapter 3150, and a turning drive 3165 which is disposed at the bearing block 3161 and rotates the slewing bearing 3163.

The positioning device 3200 may include a rotary plate 3167 which is disposed along the outer peripheral surface of the slewing bearing 3163, a plurality of first housing brackets 3211 disposed at positions corresponding to seating grooves 3231 in the blade adapter 3150, each having a spherical hollow formed therein, and a plurality of first hydraulic cylinders 3213 which has a plurality of bodies arranged circumferentially at predetermined intervals on the rotary plate 3167 and rods connected to the first housing brackets 3211 by hinge balls 3212.

Alternatively, the positioning device 3200 may include a rotary plate 3167 which has a plurality of seating grooves 3231 formed circumferentially at predetermined intervals and is disposed along the outer peripheral surface of the slewing bearing 3163, a plurality of second housing brackets 3221 disposed at positions corresponding to the seating grooves 3231 in the blade adapter 3150, each having a spherical hollow formed therein, and a plurality of second hydraulic cylinders 3223, each having a body disposed in the associated seating groove 3231 of the rotary plate 3167 and a rod connected to the associated second housing bracket 3221 by a hinge ball 3212.

Alternatively, the positioning device 3200 may include a rotary plate 3167 which has a plurality of seating grooves 3231 formed circumferentially at predetermined intervals while being tapered from outside to inside and is disposed along the outer peripheral surface of the slewing bearing 3163, support brackets 3235 disposed in the seating grooves 3231 of the rotary plate 3167, each having a spherical hollow formed therein, and a plurality of third hydraulic cylinders 3237, each having a body connected to the associated support bracket 3235 by a hinge ball 3212 and a rod connected to the blade adapter.

Each of the first, second, and third hydraulic cylinders 3213, 3223, and 3237 may consist of four hydraulic cylinders arranged at the intervals of 90 degrees on the rotary plate.

The slewing bearing 3163 is disposed to face the blade adapter 3150 in the bearing block 3161 and is connected to one end of the blade adapter 3150. The turning drive 3165 is disposed at the side opposite to the slewing bearing 3163 in the bearing block 3161 and is connected to the slewing bearing 3163 by a gear.

The fixed frame 3120 has a pair of columns formed at the upper end of the base 3110. The body of the angle adjustment cylinder 3140 is disposed between the pair of columns so as to be rotatable by a shaft, and the rod of the angle adjustment cylinder 3140 is connected by a hinge to a bracket disposed at the lower end of the bearing block 3161.

[First Embodiment of Adapter Positioning Apparatus for Blade Transport Vehicle]

Figure 36:
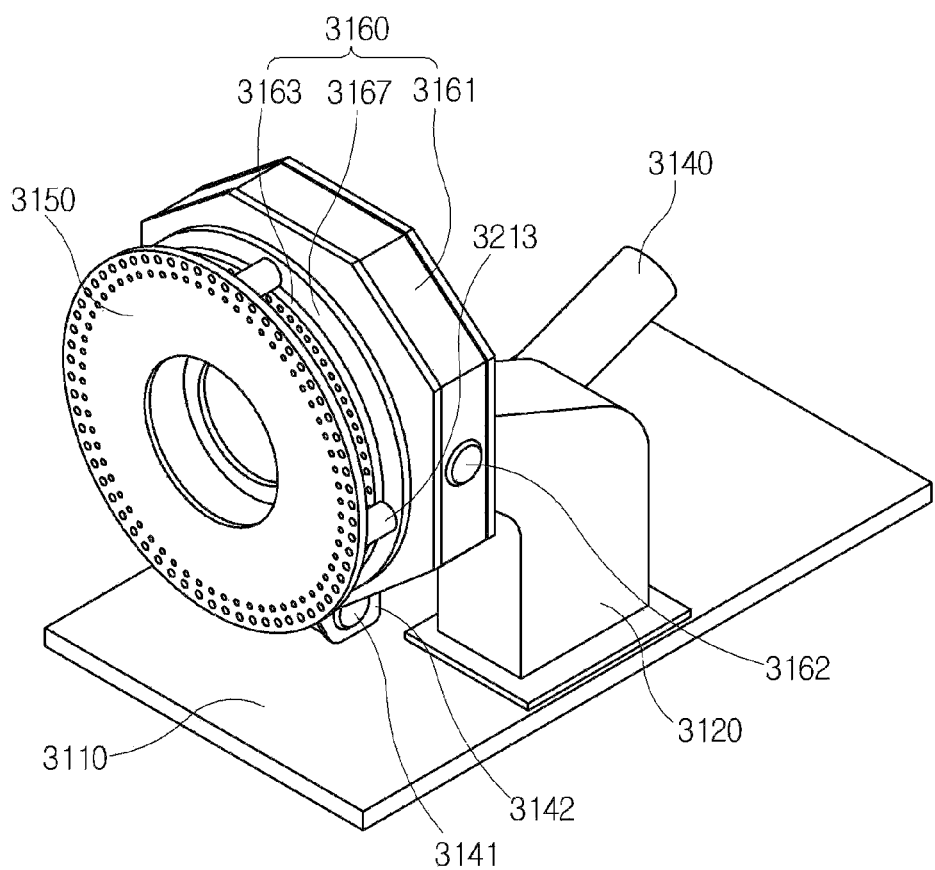
FIG. 36 is a perspective view illustrating a first embodiment of an adapter positioning apparatus for a blade transport vehicle according to the present disclosure.
Figure 37:
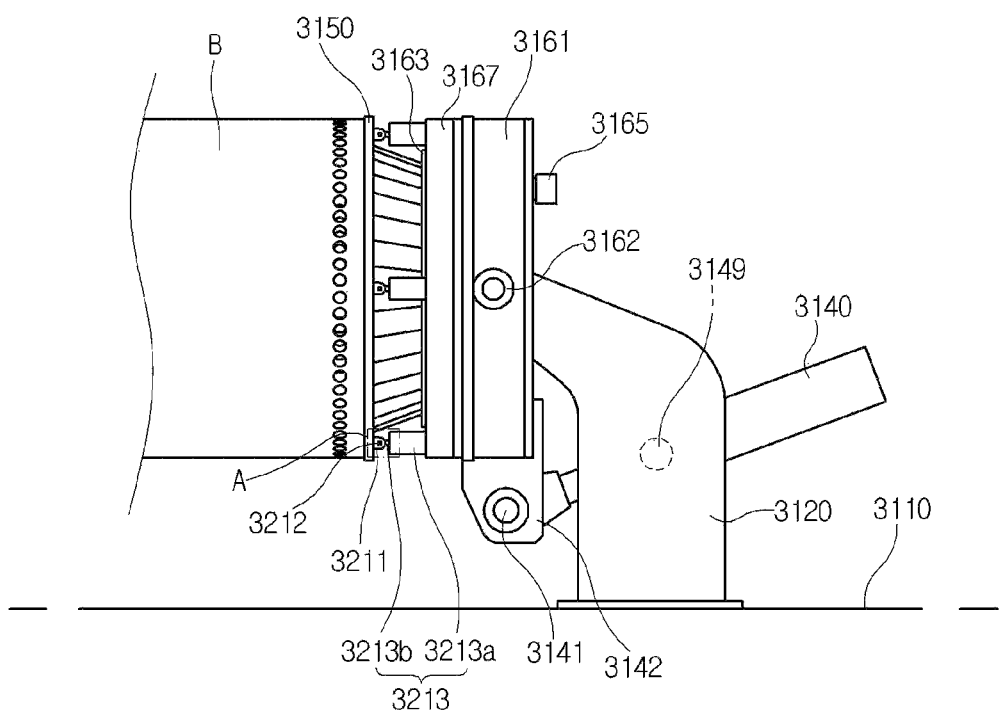
FIG. 37 is a partial side view of the apparatus illustrated in FIG. 36.
Figure 38:
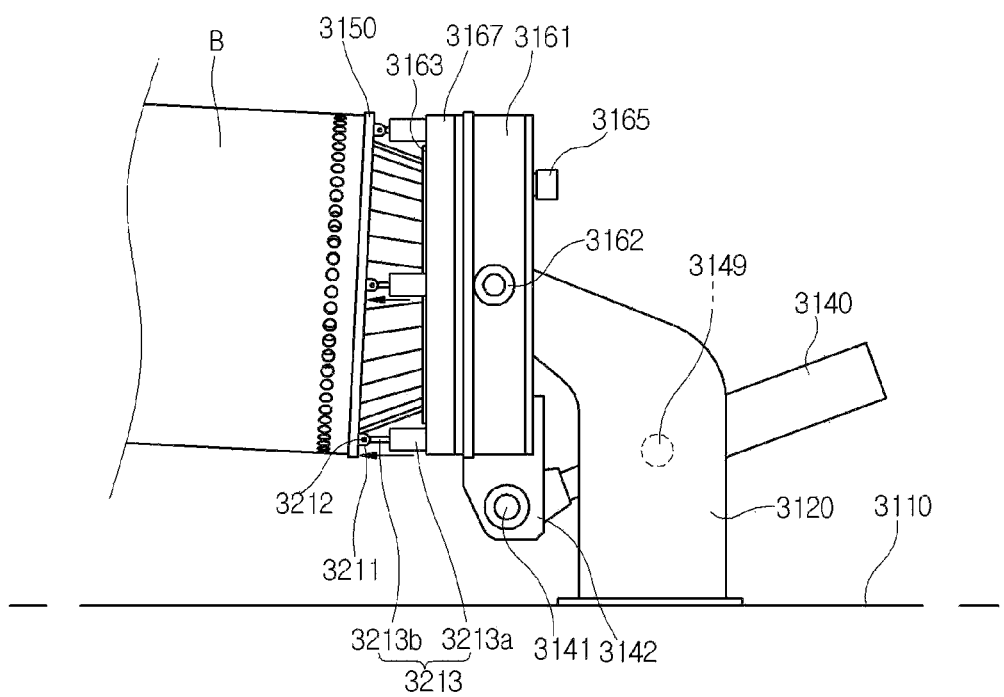
FIG. 38 is a view illustrating a state in which the position of an adapter is adjusted.
Figure 39:
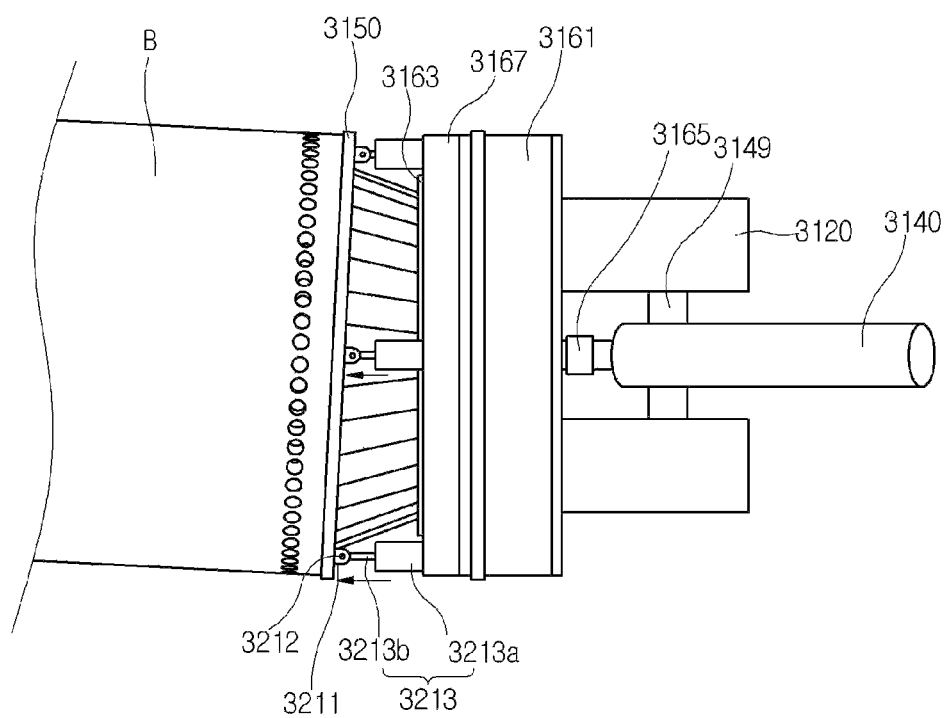
FIG. 39 is a view illustrating a state in which the position of the adapter illustrated in FIG. 38 is adjusted.

FIG. 36 is a perspective view illustrating a first embodiment of an adapter positioning apparatus for a blade transport vehicle according to the present disclosure. FIG. 37 is a partial side view of the apparatus illustrated in FIG. 36. FIG. 38 is a view illustrating a state in which the position of an adapter illustrated in FIG. 37 is adjusted. FIG. 39 is a view illustrating a state in which the position of the adapter illustrated in FIG. 38.

Referring to FIGS. 36 to 39, the adapter positioning apparatus for a blade transport vehicle according to the first embodiment of the present disclosure may include a slewing bearing unit 3160, an angle adjustment cylinder 3140, a blade adapter 3150, and a positioning device 3200.

The slewing bearing unit 3160 may be mounted at a fixed frame 3120 disposed at the upper end of a base 3110 of a blade transport vehicle. The base 3110 may have a flat plate shape, and be made of a steel material. The base 3110 may be coupled to the upper end of a lower trainer having wheels arranged in multiple rows by bolting or welding. The fixed frame 3120 may be disposed at the upper end of the base 3110, and have a pair of columns made of a steel material. The slewing bearing unit 3160 may be disposed at the upper end of the fixed frame 3120.

The slewing bearing unit 3160 may include a bearing block 3161, a slewing bearing 3163, and a turning drive 3165. The bearing block 3161 may be connected to the upper end of the fixed frame 3120 by a hinge 3162. The bearing block 3161 may have a plate shape and be made of a steel material. The bearing block 3161 may have an octagonal column in the embodiment, but the present disclosure is not limited thereto.

The slewing bearing 3163 may be disposed to face the blade adapter 3150 in the bearing block 3161 and be connected to one end of the blade adapter 3150. The slewing bearing 3163 may have an annular shape for mounting the blade adapter 3150 thereto. Although not shown in the drawings, a plurality of rolling balls may be arranged circumferentially on the inner peripheral surface of the slewing bearing 3163 so as to smoothly rotate the blade adapter 3150.

The turning drive 3165 may be disposed on a surface opposite to the surface on which the slewing bearing 3163 is mounted in the bearing block 3161, and may be connected to the slewing bearing 3163 by a gear to rotate the slewing bearing 3163.

The angle adjustment cylinder 3140 may be connected to the slewing bearing unit 3160 and be disposed at the fixed frame 3120 so as to adjust the angle of the slewing bearing unit 3160. Referring to FIG. 36, it can be seen that the body of the angle adjustment cylinder 3140 is disposed between the pair of columns of the fixed frame 3120 so as to be rotatable by a shaft, and the rod of the angle adjustment cylinder 3140 is connected by a hinge 3141 to a bracket 3142 disposed at the lower end of the bearing block 3161.

When the user drives the angle adjustment cylinder 3140, the rod of the angle adjustment cylinder 3140 is extended so that the angle of the bearing block 3161 is vertically adjusted about a hinge 3162 as the rotary shaft. The angle adjustment cylinder 3140 vertically adjusts the angle of the blade adapter 3150, which is connected to the slewing bearing 3163 disposed at the bearing block 3161, by moving the bearing block 3161. Ultimately, the angle of the blade is vertically adjusted. Of course, the angle adjustment cylinder 3140 is used to adjust the angle of the blade in a relatively wide range, rather than minutely adjusting the angle of the blade.

In order to change the arrangement position of the blade in various directions by the positioning device, one end of the blade adapter 3150 is fluidly engaged to the slewing bearing 3163 by a gear such that the slewing bearing 3163 is movable, with the consequence that the blade adapter 3150 is rotatable together with the slewing bearing 3163. The other end of the blade adapter 3150 is fixedly coupled to the end of the blade by bolting.

The positioning device 3200 may be disposed to interlock with the slewing bearing unit 3160 and the blade adapter 3150 so as to adjust the position of the blade adapter 3150. The positioning device 3200 may include a rotary plate 3167 and first hydraulic cylinders 3213.

The rotary plate 3167 may be disposed along the outer peripheral surface of the slewing bearing 3163. The rotary plate 3167 may have a disk shape and be made of a steel material. The rotary plate 3167 may rotate along with the rotation of the slewing bearing 3163.

Referring to FIG. 37, the first hydraulic cylinders 3213 may have a plurality of bodies 3213a arranged circumferentially at predetermined intervals on the rotary plate 3167 and rods 3213b connected to first housing brackets 3211 mounted to the blade adapter 3150 by hinge balls 3212.

Figure 42:
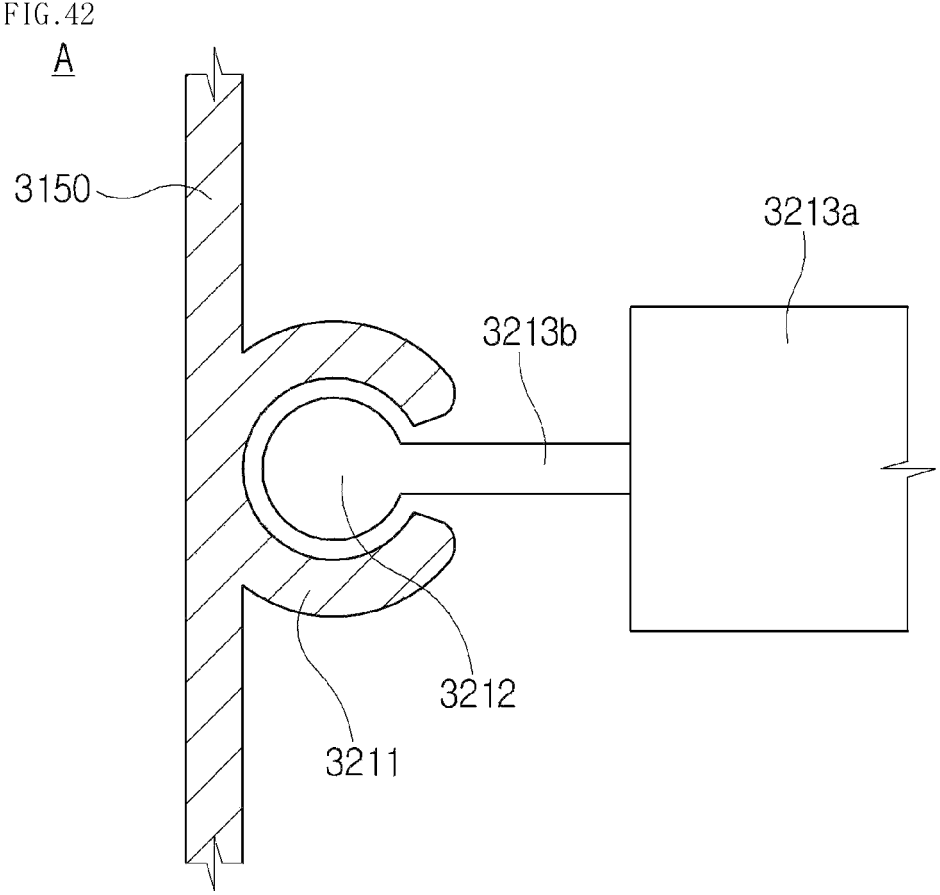
FIG. 42 is a cross-sectional view illustrating portion A of the first embodiment of the present disclosure.

Referring to FIG. 42, each of the first housing brackets 3211 may have a spherical hollow formed therein so as to dispose the associated hinge ball 3212 therein, and the first housing bracket 3211 may be disposed at a position corresponding to an associated seating groove 3231 in the blade adapter 3150. The hinge ball 3212 may have a spherical shape such that the blade adapter 3150 is movable in various directions.

The user may drive the first hydraulic cylinders 3213 in order to avoid obstacles or improve the turning width of the blade when the vehicle travels in a sharp curve section or on a slope or passes through a tunnel or a pedestrian overpass.

In the first embodiment of the present disclosure, the first hydraulic cylinders 3213 may consist of four hydraulic cylinders arranged at the intervals of 90 degrees, but the present disclosure is not limited thereto. For example, the number of first hydraulic cylinders may be three, six, or the like.

When the four first hydraulic cylinders are arranged as in the first embodiment of the present disclosure, the user may facilitate to minutely adjust the angle of the blade adapter 3150.

For example, referring to FIG. 38, when the user intends to minutely adjust the blade in the left direction, the user decreases the amount of hydraulic pressure in the first hydraulic cylinder 3213 disposed to the left and increases the amount of hydraulic pressure in the first hydraulic cylinder 3213 disposed to the right. In this case, the user maintains the amount of hydraulic pressure in each of the first hydraulic cylinders 3213 disposed above and below. Consequently, the arrangement position of the blade is adjusted in the left direction.

On the contrary, when the user intends to minutely adjust the blade in the right direction, the user decreases the amount of hydraulic pressure in the first hydraulic cylinder 3213 disposed to the right and increases the amount of hydraulic pressure in the first hydraulic cylinder 3213 disposed to the left. In this case, the user maintains the amount of hydraulic pressure in each of the first hydraulic cylinders 3213 disposed above and below.

In addition, when the user intends to minutely adjust the blade in the upward direction, the user decreases the amount of hydraulic pressure in the first hydraulic cylinder 3213 disposed above and increases the amount of hydraulic pressure in the first hydraulic cylinder 3213 disposed below. In this case, the user maintains the amount of hydraulic pressure in each of the first hydraulic cylinders 3213 disposed to the left and the right. Consequently, the arrangement position of the blade is adjusted in the upward direction.

The user may drive the first hydraulic cylinders 3213 in order to avoid obstacles or improve the turning width of the blade when the vehicle travels in a sharp curve section or on a slope or passes through a tunnel or a pedestrian overpass.

In the first embodiment of the present disclosure, the arrangement position of the blade may be minutely adjusted through the above configuration while the vehicle is traveling. Therefore, it is possible to reduce the centrifugal force, the load, or the like applied to the vehicle in the sharp curve section or the slope, and to minimize the contact of the blade with various obstacles and thus damage on the blade while the vehicle is traveling. Ultimately, it is possible to stably transport the blade.

[Second Embodiment of Adapter Positioning Apparatus for Blade Transport Vehicle]

Figure 40:
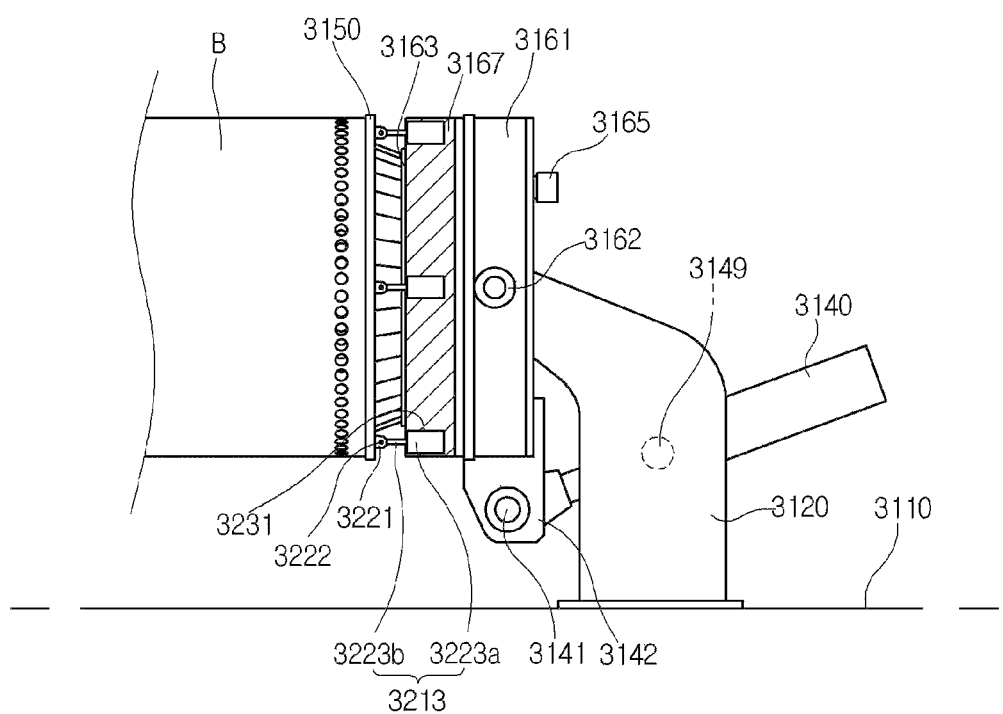
FIG. 40 is a perspective view illustrating a second embodiment of an adapter positioning apparatus for a blade transport vehicle according to the present disclosure.

FIG. 40 is a perspective view illustrating a second embodiment of an adapter positioning apparatus for a blade transport vehicle according to the present disclosure.

Referring to FIG. 40, the adapter positioning apparatus for a blade transport vehicle according to the second embodiment of the present disclosure may include a slewing bearing unit 3160, an angle adjustment cylinder 3140, a blade adapter 3150, and a positioning device 3200.

The slewing bearing unit 3160 may be mounted at a fixed frame 3120 disposed at the upper end of a base 3110 of a blade transport vehicle. The base 3110 may have a flat plate shape and be made of a steel material. The base 3110 may be coupled to the upper end of a lower trainer having wheels arranged in multiple rows by bolting or welding. The fixed frame 3120 may be disposed at the upper end of the base 3110, and have a pair of columns made of a steel material. The slewing bearing unit 3160 may be disposed at the upper end of the fixed frame 3120.

The slewing bearing unit 3160 may include a bearing block 3161, a slewing bearing 3163, and a turning drive 3165. The bearing block 3161 may be connected to the upper end of the fixed frame 3120 by a hinge 3162. The bearing block 3161 may have a plate shape and be made of a steel material. The bearing block 3161 may have an octagonal column in the embodiment, but the present invention is not limited thereto.

The slewing bearing 3163 may be disposed to face the blade adapter 3150 in the bearing block 3161 and be connected to one end of the blade adapter 3150. The slewing bearing 3163 may have an annular shape for mounting the blade adapter 3150 thereto. A plurality of rolling balls may be arranged circumferentially on the inner peripheral surface of the slewing bearing 3163 so as to smoothly rotate the blade adapter 3150.

The turning drive 3165 may be disposed on a surface opposite to the surface on which the slewing bearing 3163 is mounted in the bearing block 3161, and may be connected to the slewing bearing 3163 by a gear to rotate the slewing bearing 3163.

The angle adjustment cylinder 3140 may be connected to the slewing bearing unit 3160 and be disposed at the fixed frame 3120 so as to adjust the angle of the slewing bearing unit 3160. The body of the angle adjustment cylinder 3140 may be disposed between the pair of columns of the fixed frame 3120 so as to be rotatable by a shaft, and the rod of the angle adjustment cylinder 3140 may be connected by a hinge 3141 to a bracket 3142 disposed at the lower end of the bearing block 3161.

When the user drives the angle adjustment cylinder 3140, the rod of the angle adjustment cylinder 3140 is extended so that the angle of the bearing block 3161 is vertically adjusted about a hinge 3162 as the rotary shaft. The angle adjustment cylinder 3140 vertically adjusts the angle of the blade adapter 3150, which is connected to the slewing bearing 3163 disposed at the bearing block 3161, by moving the bearing block 3161. Ultimately, the angle of the blade is vertically adjusted. Of course, the angle adjustment cylinder 3140 is used to adjust the angle of the blade in a relatively wide range, rather than minutely adjusting the angle of the blade.

In order to change the arrangement position of the blade in various directions by the positioning device, one end of the blade adapter 3150 is fluidly engaged to the slewing bearing 3163 by a gear such that the slewing bearing 3163 is movable, with the consequence that the blade adapter 3150 is rotatable together with the slewing bearing 3163. The other end of the blade adapter 3150 is fixedly coupled to the end of the blade by bolting.

The positioning device 3200 may be disposed to interlock with the slewing bearing unit 3160 and the blade adapter 3150 so as to adjust the position of the blade adapter 3150. The positioning device 3200 may include a rotary plate 3167 and second hydraulic cylinders 3223.

The rotary plate 3167 may have a plurality of seating grooves 3231 formed circumferentially at predetermined intervals and be disposed along the outer peripheral surface of the slewing bearing 3163. The rotary plate 3167 may have a disk shape and be made of a steel material. The rotary plate 3167 may rotate along with the rotation of the slewing bearing 3163. In the second embodiment of the present invention, since the rotary plate 3167 has the seating grooves 3231 formed therein, each seating groove 3231 having a depth corresponding to the length of a body 3223*a* of the associated second hydraulic cylinder 3223, the thickness of the rotary plate is increased compared to that of the first embodiment.

The second hydraulic cylinders 3223 may have a plurality of bodies 3223*a* arranged circumferentially at predetermined intervals in the seating grooves 3231 of the rotary plate 3167 and rods 3223*b* connected to second housing brackets 3221 mounted to the blade adapter 3150 by hinge balls 3222.

Similar to the first housing brackets 3211 of the first embodiment, each of the second housing brackets 3221 may have a spherical hollow formed therein so as to dispose the associated hinge ball 3222 therein, and the second housing bracket 3221 may be disposed at a position corresponding to the associated seating groove 3231 in the blade adapter 3150. The hinge ball 3222 may have a spherical shape such that the blade adapter 3150 is movable in various directions.

Since the respective bodies 3223*a* of the second hydraulic cylinders 3223 are inserted and coupled into the seating grooves 3231 of the rotary plate 3167 by bolting or welding, the second hydraulic cylinders 3223 are supported by the lower ends of the respective seating grooves 3231 and are connected to the blade adapter 3150. Therefore, when the arrangement position of the blade adapter 3150, connected to the rods 3223*b* of the second hydraulic cylinders 3223 is adjusted, it is possible to more stably change the blade adapter by reducing swing, vibration, etc.

The user may drive the second hydraulic cylinders 3223 in order to avoid obstacles or improve the turning width of the blade when the vehicle travels in a sharp curve section or on a slope or passes through a tunnel or a pedestrian overpass.

Similar to the first embodiment, the second hydraulic cylinders 3223 may consist of four hydraulic cylinders arranged at the intervals of 90 degrees in the second embodiment, but the present invention is not limited thereto. For example, the number of second hydraulic cylinders may be three, six, or the like.

When the four second hydraulic cylinders are arranged as in the second embodiment of the present invention, the user may facilitate to minutely adjust the angle of the blade adapter 3150.

For example, as described in the first embodiment with reference to FIG. 38, when the user intends to minutely adjust the blade in the left direction, the user decreases the amount of hydraulic pressure in the second hydraulic cylinder 3223 disposed to the left and increases the amount of hydraulic pressure in the second hydraulic cylinder 3223 disposed to the right. In this case, the user maintains the amount of hydraulic pressure in each of the second hydraulic cylinders 3223 disposed above and below. Consequently, the arrangement position of the blade is adjusted in the left direction.

On the contrary, when the user intends to minutely adjust the blade in the right direction, the user decreases the amount of hydraulic pressure in the second hydraulic cylinder 3223 disposed to the right and increases the amount of hydraulic pressure in the second hydraulic cylinder 3223 disposed to the left. In this case, the user maintains the amount of hydraulic pressure in each of the second hydraulic cylinders 3223 disposed above and below.

In addition, as described in the first embodiment with reference to FIG. 39, when the user intends to minutely adjust the blade in the upward direction, the user decreases the amount of hydraulic pressure in the second hydraulic cylinder 3223 disposed above and increases the amount of hydraulic pressure in the second hydraulic cylinder 3223 disposed below. In this case, the user maintains the amount of hydraulic pressure in each of the second hydraulic cylinders 3223 disposed to the left and the right. Consequently, the arrangement position of the blade is adjusted in the upward direction.

Unlike the first embodiment of the present disclosure, since the second hydraulic cylinders 3223 are disposed in the seating grooves 3231 of the rotary plate 3167 in the second embodiment, the second hydraulic cylinders 3223 may be more stably supported and thus it is possible to more stably fix the blade by reducing swing, vibration, etc.

[Third Embodiment of Adapter Positioning Apparatus for Blade Transport Vehicle]

Figure 41:
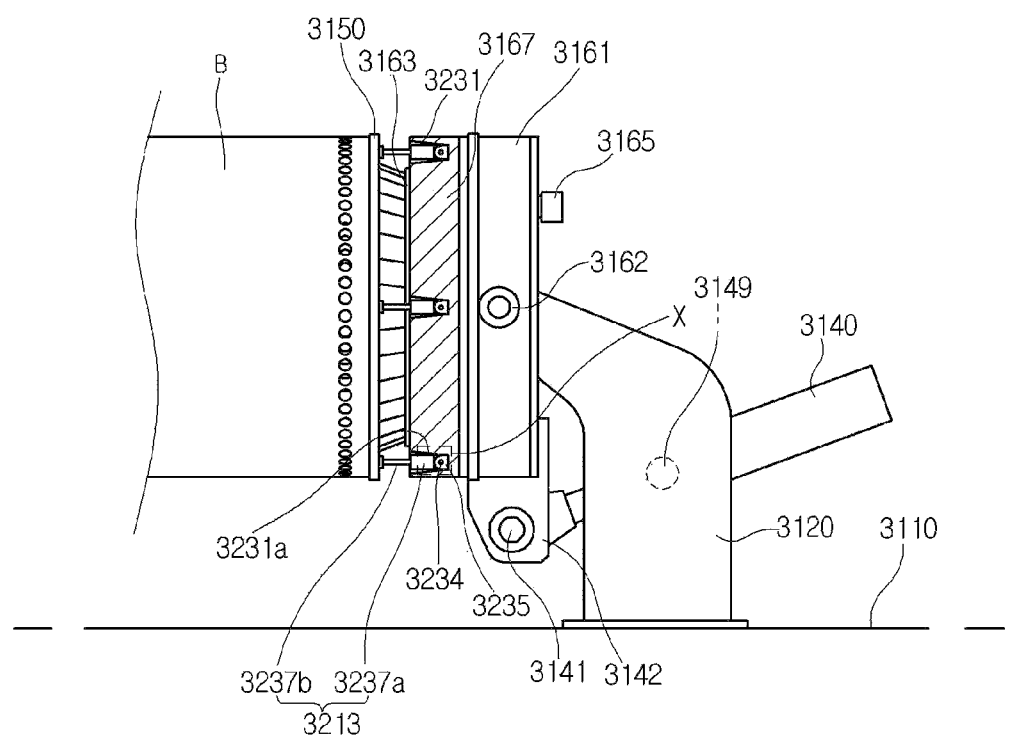
FIG. 41 is a perspective view illustrating a third embodiment of an adapter positioning apparatus for a blade transport vehicle according to the present disclosure.

FIG. 41 is a perspective view illustrating a third embodiment of an adapter positioning apparatus for a blade transport vehicle according to the present disclosure.

Referring to FIG. 41, the adapter positioning apparatus for a blade transport vehicle according to the third embodiment of the present invention may include a slewing bearing unit 3160, an angle adjustment cylinder 3140, a blade adapter 3150, and a positioning device 3200.

The slewing bearing unit 3160 may be mounted at a fixed frame 3120 disposed at the upper end of a base 3110 of a blade transport vehicle. The base 3110 may have a flat plate shape and be made of a steel material. The base 3110 may be coupled to the upper end of a lower trainer having wheels arranged in multiple rows by bolting or welding. The fixed frame 3120 may be disposed at the upper end of the base 3110, and have a pair of columns made of a steel material. The slewing bearing unit 3160 may be disposed at the upper end of the fixed frame 3120.

The slewing bearing unit 3160 may include a bearing block 3161, a slewing bearing 3163, and a turning drive 3165. The bearing block 3161 may be connected to the upper end of the fixed frame 3120 by a hinge 3162. The bearing block 3161 may have a plate shape and be made of a steel material. The bearing block 3161 may have an octagonal column in the embodiment, but the present disclosure is not limited thereto.

The slewing bearing 3163 may be disposed to face the blade adapter 3150 in the bearing block 3161 and be connected to one end of the blade adapter 3150. The slewing bearing 3163 may have an annular shape for mounting the blade adapter 3150 thereto. Although not shown in the drawings, a plurality of rolling balls may be arranged circumferentially on the inner peripheral surface of the slewing bearing 3163 so as to smoothly rotate the blade adapter 3150.

The turning drive 3165 may be disposed on a surface opposite to the surface on which the slewing bearing 3163 is mounted in the bearing block 3161, and may be connected to the slewing bearing 3163 by a gear to rotate the slewing bearing 3163.

The angle adjustment cylinder 3140 may be connected to the slewing bearing unit 3160 and be disposed at the fixed frame 3120 so as to adjust the angle of the slewing bearing unit 3160. The body of the angle adjustment cylinder 3140 may be disposed between the pair of columns of the fixed frame 3120 so as to be rotatable by a shaft, and the rod of the angle adjustment cylinder 3140 may be connected by a hinge 3141 to a bracket 3142 disposed at the lower end of the bearing block 3161.

When the user drives the angle adjustment cylinder 3140, the rod of the angle adjustment cylinder 3140 is extended so that the angle of the bearing block 3161 is vertically adjusted about a hinge 3162 as the rotary shaft. The angle adjustment cylinder 3140 vertically adjusts the angle of the blade adapter 3150, which is connected to the slewing bearing 3163 disposed at the bearing block 3161, by moving the bearing block 3161. Ultimately, the angle of the blade is vertically adjusted. Of course, the angle adjustment cylinder 3140 is used to adjust the angle of the blade in a relatively wide range, rather than minutely adjusting the angle of the blade.

In order to change the arrangement position of the blade in various directions by the positioning device, one end of the blade adapter 3150 is fluidly engaged to the slewing bearing 3163 by a gear such that the slewing bearing 3163 is movable, with the consequence that the blade adapter 3150 is rotatable together with the slewing bearing 3163. The other end of the blade adapter 3150 is fixedly coupled to the end of the blade by bolting.

The positioning device 3200 may be disposed to interlock with the slewing bearing unit 3160 and the blade adapter 3150 so as to adjust the position of the blade adapter 3150. The positioning device 3200 may include a rotary plate 3167 and third hydraulic cylinders 3237.

The rotary plate 3167 may have a plurality of seating grooves 3231 formed circumferentially at predetermined intervals while each having a tapered portion 3232 tapered from outside to inside, and may be disposed along the outer peripheral surface of the slewing bearing. The rotary plate 3167 may have a disk shape and be made of a steel material. The rotary plate 3167 may rotate along with the rotation of the slewing bearing.

Each of the seating grooves 3231 of the rotary plate 3167 may have a circular cross section, and may have a diameter reduced from outside to inside such that each of the third hydraulic cylinders 3237 is movable in the direction of 360 degrees in the seating groove 3231.

The third hydraulic cylinders 3237 may be arranged circumferentially at predetermined intervals in the respective seating grooves 3231 of the rotary plate 3167. In this case, each of the third hydraulic cylinders 3237 may have a body 3237a connected to a support bracket 3235 by a hinge ball 3234 and a rod 3237b connected to the blade adapter 3150 by bolting.

Figure 43:
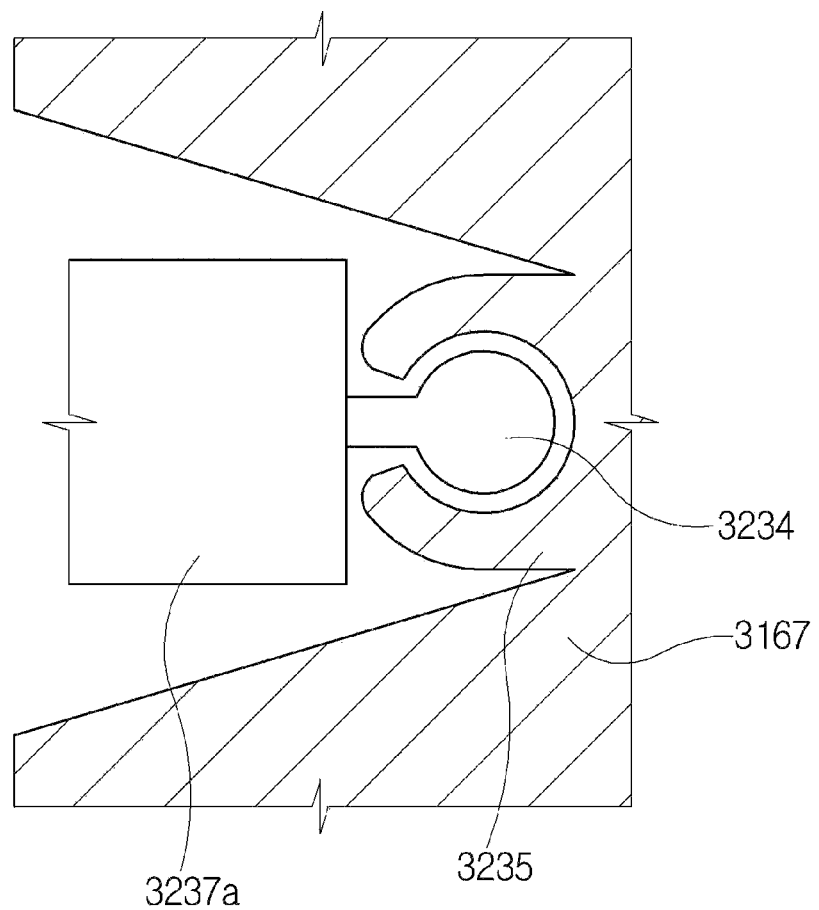
FIG. 43 is a cross-sectional view illustrating portion B of the third embodiment of the present disclosure.

Referring to FIG. 43, the support bracket 3235 may have a spherical hollow formed therein such that the hinge ball 3234 is disposed therein, and the hinge ball 3234 may have a spherical shape such that the third hydraulic cylinder 3237 is freely movable therein.

When the user drives the third hydraulic cylinders 3237, the body 3237a of each of the third hydraulic cylinders 3237 minutely moves about the hinge ball 3234 as a support axis so as to minutely adjust the position of the blade adapter 3150.

The user may drive the third hydraulic cylinders 3237 in order to avoid obstacles or improve the turning width of the blade when the vehicle travels in a sharp curve section or on a slope or passes through a tunnel or a pedestrian overpass.

Similar to the first embodiment, the third hydraulic cylinders 3237 may consist of four hydraulic cylinders arranged at the intervals of 90 degrees in the third embodiment, but the present invention is not limited thereto. For example, the number of third hydraulic cylinders may be three, six, or the like.

When the four third hydraulic cylinders are arranged as in the third embodiment of the present disclosure, the user may facilitate to minutely adjust the angle of the blade adapter 3150.

For example, as described in the first embodiment with reference to FIG. 38, when the user intends to minutely adjust the blade in the left direction, the user decreases the amount of hydraulic pressure in the third hydraulic cylinder 3237 disposed to the left and increases the amount of hydraulic pressure in the third hydraulic cylinder 3237 disposed to the right. In this case, the user maintains the amount of hydraulic pressure in each of the third hydraulic cylinders 3237 disposed above and below. Consequently, the arrangement position of the blade is adjusted in the left direction.

On the contrary, when the user intends to minutely adjust the blade in the right direction, the user decreases the amount of hydraulic pressure in the third hydraulic cylinder 3237 disposed to the right and increases the amount of hydraulic pressure in the third hydraulic cylinder 3237 disposed to the left. In this case, the user maintains the amount of hydraulic pressure in each of the third hydraulic cylinders 3237 disposed above and below.

In addition, as described in the first embodiment with reference to FIG. 39, when the user intends to minutely adjust the blade in the upward direction, the user decreases the amount of hydraulic pressure in the third hydraulic cylinder 3237 disposed above and increases the amount of hydraulic pressure in the third hydraulic cylinder 3237 disposed below. In this case, the user maintains the amount of hydraulic pressure in each of the third hydraulic cylinders 3237 disposed to the left and the right. Consequently, the arrangement position of the blade is adjusted in the upward direction.

Unlike the second embodiment of the present disclosure, since the body 3237a of each of the third hydraulic cylinders 3237 is connected to the support bracket 3235 by the hinge ball 3234 in the tapered seating groove 3231, the third hydraulic cylinder 3237 is driven by the user and minutely adjusts the angle of the blade adapter 3150.

[Connection Structure for Blade Transport Vehicle]

Hereinafter, a connection structure for a blade transport vehicle according to exemplary embodiments of the present disclosure will be described in detail with reference to the accompanying drawings.

[First Embodiment of Connection Structure for Blade Transport Vehicle]

Figure 44:
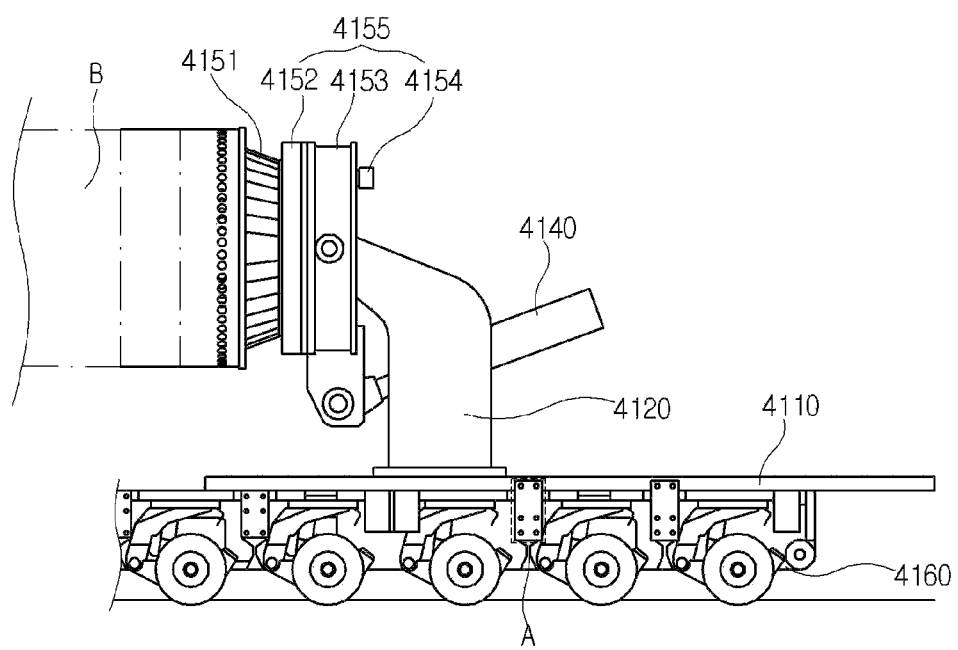
FIG. 44 is a view illustrating a connection structure for a blade transport vehicle according to the present disclosure.
Figure 45:
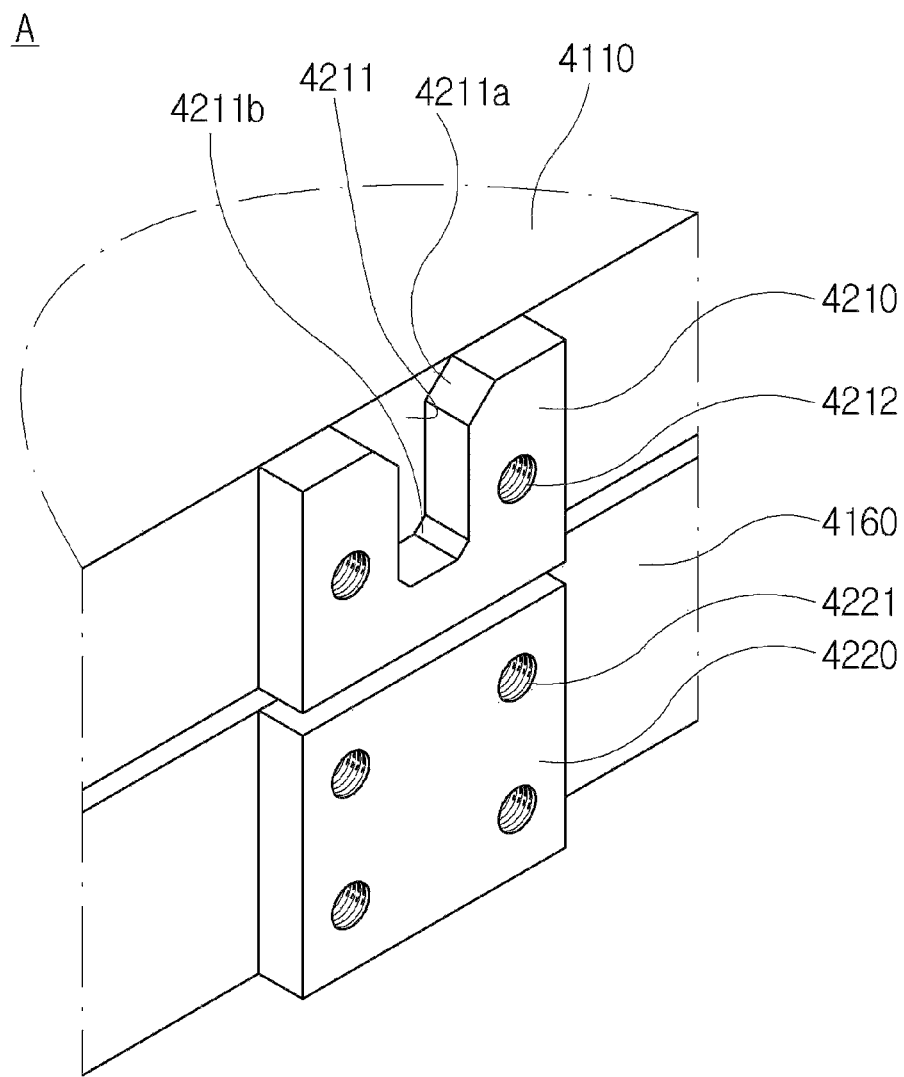
FIG. 45 is a view illustrating a first embodiment of a connection structure for a blade transport vehicle according to the present disclosure.
Figure 46:
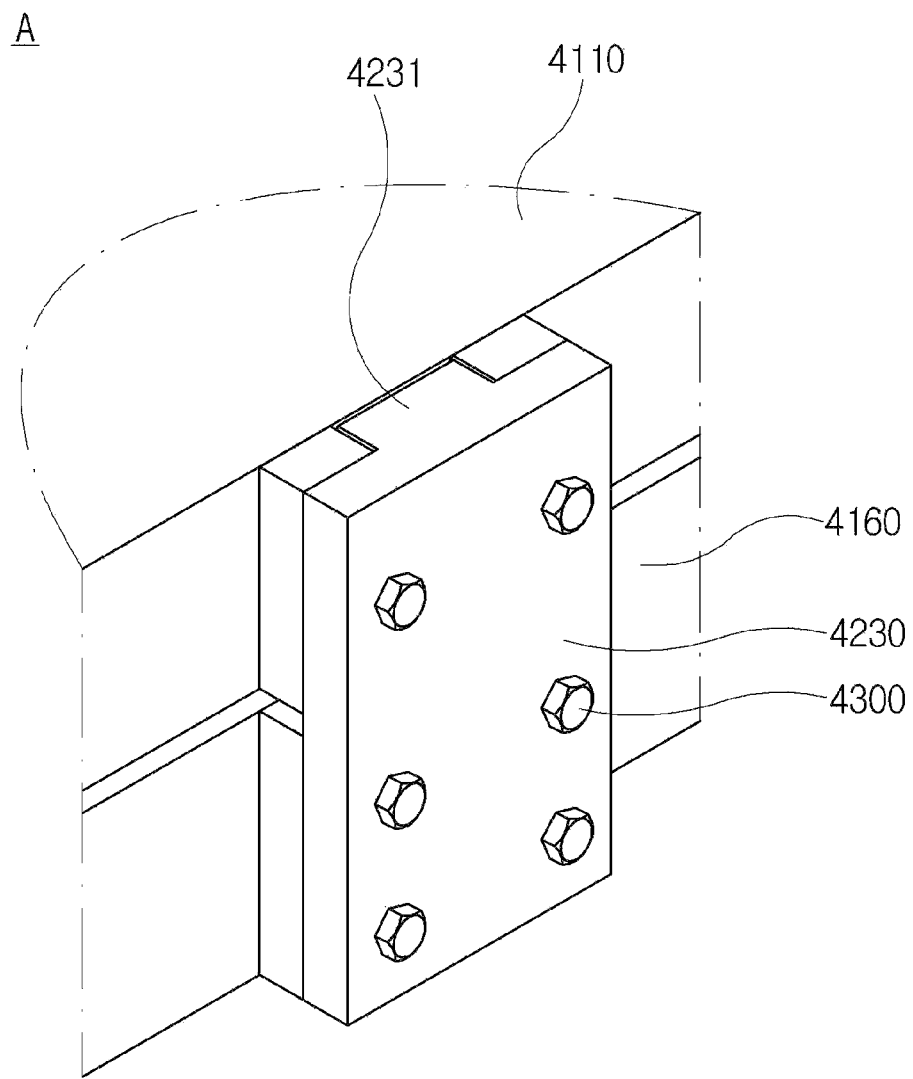
FIG. 46 is a view illustrating a first embodiment of a connection structure for a blade transport vehicle according to the present disclosure.
Figure 47:
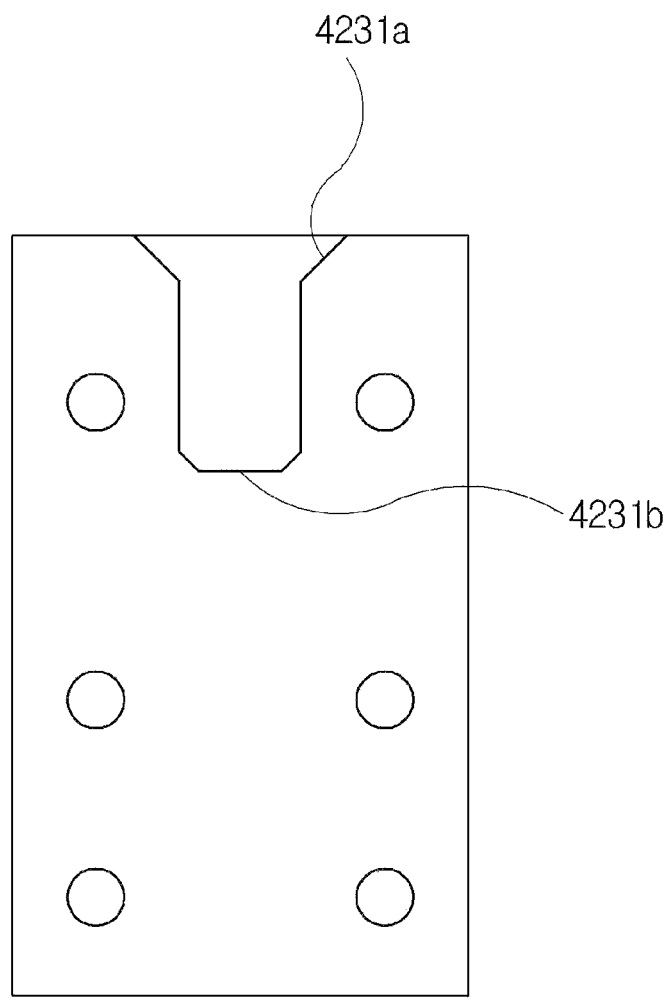
FIG. 47 is a view illustrating a connection plate illustrated in FIG. 46.
Figure 48:
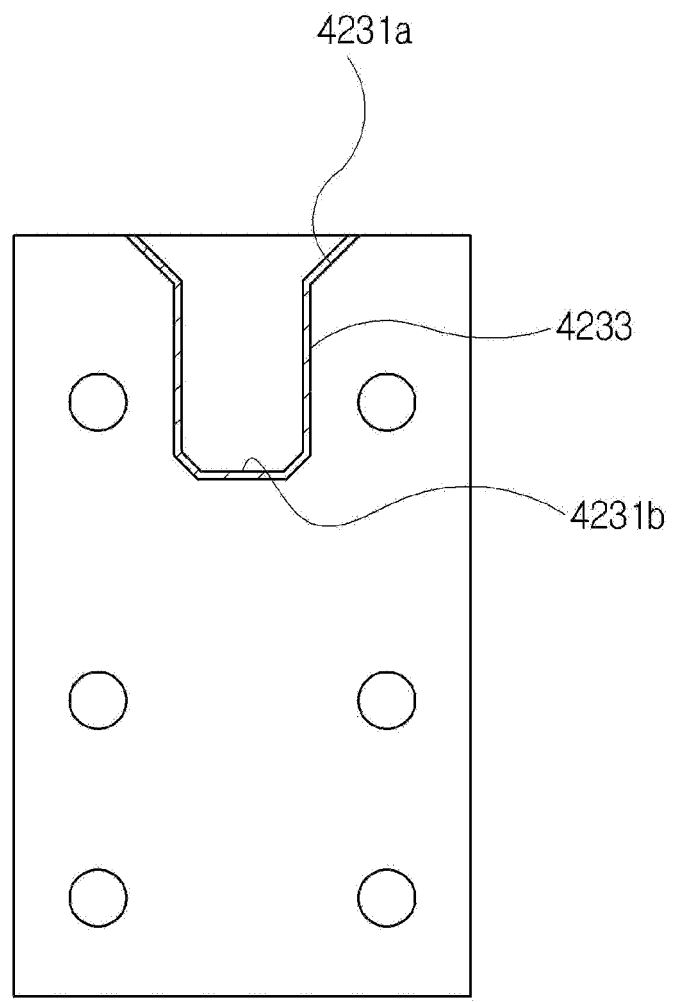
FIG. 48 is a view illustrating a connection plate illustrated in FIG. 46.
Figure 49:
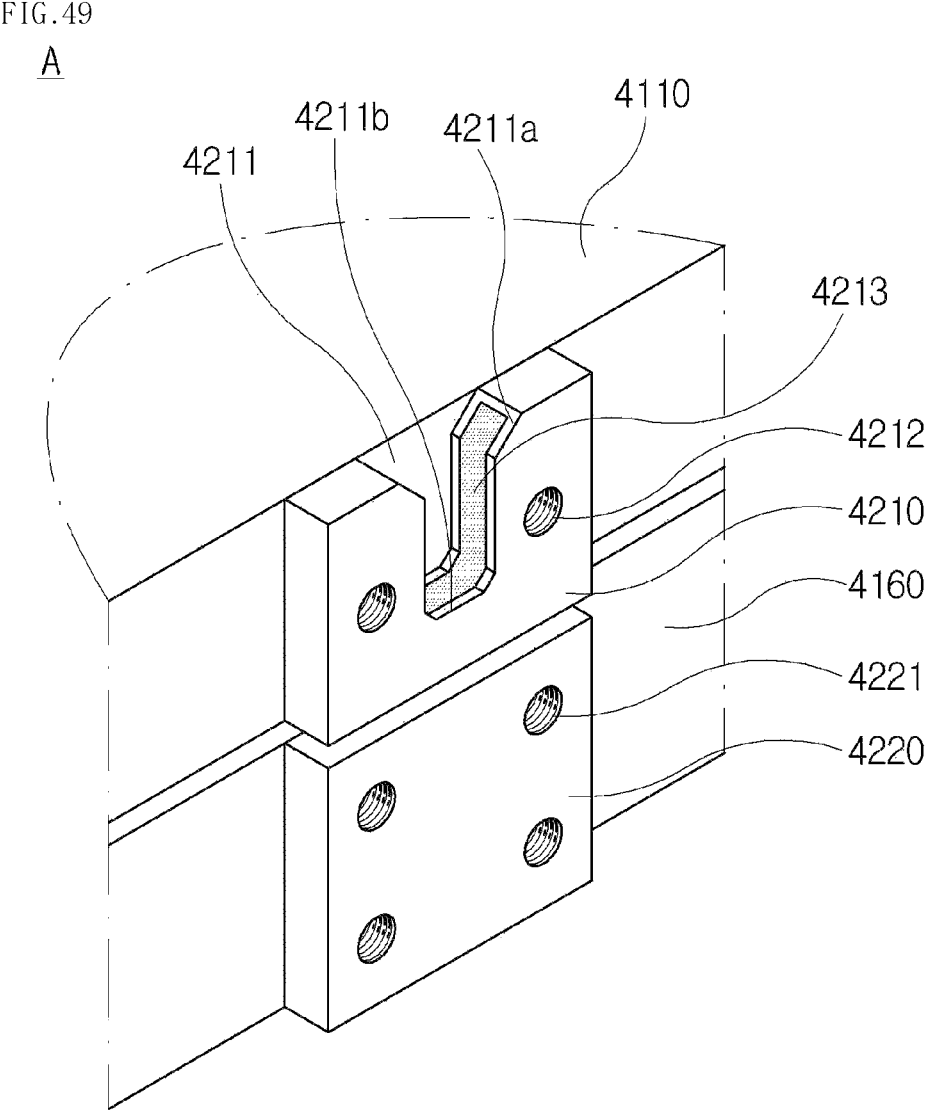
FIG. 49 is a view illustrating an embodiment of an upper bracket illustrated in FIG. 46.

FIG. 44 is a view illustrating a connection structure for a blade transport vehicle according to the present disclosure. FIGS. 45 and 46 are views illustrating a first embodiment of a connection structure for a blade transport vehicle (A) according to the present disclosure. FIGS. 47 and 48 are views illustrating a connection plate illustrated in FIG. 46. FIG. 49 is a view illustrating an embodiment of an upper bracket illustrated in FIG. 46.

Referring to FIGS. 44 and 49, the connection structure for a blade transport vehicle according to the first embodiment of the present disclosure may include a lower bracket 4220, an upper bracket 4210, and a connection plate 4230.

The lower bracket 4220 may be disposed on the side of a lower trailer 4160 of a blade transport vehicle. The lower trailer 4160 forms the lower portion of the blade transport vehicle and has a plurality of wheels arranged in multiple rows in order to distribute the load applied to the blade and stably transport the blade.

The lower bracket 4220 may consist of a plurality of lower brackets arranged at predetermined intervals in the longitudinal direction of the vehicle along the upper side of the lower trailer 4160. The lower bracket 4220 may be fixed to the lower trailer 4160 by welding, but the present invention is not limited thereto. The lower bracket 4220 may have a rectangular flat shape and have four thread holes 4221.

The upper bracket 4210 may be disposed along the side of a base 4110 mounted to the upper end of the lower trailer 4160, and may have a seating groove 4211 formed at the center thereof. The base 4110 may have a flat plate shape and be made of a steel material. The base 4110 may be coupled to the upper end of the lower trainer 4160 by bolting or welding.

A blade fixing frame 4120, an angle adjustment cylinder 4140, a slewing bearing unit 4155, and a blade adapter 4151 may be disposed at the upper end of the base 4110.

The blade fixing frame 4120 may be disposed on the base 4110, and have a pair of columns made of a steel material. The slewing bearing unit 4155 and the blade adapter 4151 may be mounted on the upper end of the blade fixing frame 4120. The angle adjustment cylinder 4140 may be connected to the slewing bearing unit 4155 between the pair of steel columns.

The slewing bearing unit 4155 may include a slewing bearing 4152 and a bearing block 4153. The slewing bearing 4152 is rotatably disposed in the bearing block 4153, and a turning drive 4154 is mounted to one end of the bearing block 4153 so as to rotate the slewing bearing 4152.

The blade adapter 4151 is mounted to one side of the slewing bearing 4152 and rotates along with the slewing bearing 4152 by the turning drive 4154. The blade adapter 4151 serves to fix a heavy blade mounted to a wind turbine.

The user may vertically adjust the angle of the blade mounted onto the blade adapter 4151 by rotating the slewing bearing 4152, and may vertically adjust the angle of the blade mounted onto the blade adapter 4151 by operating the angle adjustment cylinder 4140.

The upper bracket 4210 may consist of a plurality of upper brackets arranged in the longitudinal direction of the vehicle along the side of the base 4110, and may be disposed at a position corresponding to the lower bracket 4220. The upper bracket 4210 may have a square flat shape and have two thread holes 4212 formed at both sides thereof.

The seating groove 4211 may be formed at the center of the upper bracket 4210, and may have a first seating portion 4211a and a second seating portion 4211b. The first seating portion 4211a may be formed at the upper side of the upper bracket 4210 and may be inclined from top to down. The second seating portion 4211b may be formed below the first seating portion 4211a and may generally have a U shape.

The connection plate 4230 may have a protrusion block 4231 coupled to the seating groove 4211 and may connect the upper and lower brackets 4210 and 4220 using bolts 4300. The connection plate 4230 may have the same size as the contact area of the upper and lower brackets 4210 and 4220, and may thus have a rectangular flat shape.

The protrusion block 4231 may be formed on the side of the connection plate 4230 facing the upper bracket 4210, and may include a first protrusion portion 4231a and a second protrusion portion 4231b.

The first protrusion portion 4231a may have a shape corresponding to the shape of the first seating portion 4211a so as to be pressed against the first seating portion 4211a. That is, the first protrusion portion 4231a may be inclined from top to down at the same angle as the first seating portion 4211a. The second protrusion portion 4231b may be formed below the first protrusion portion 4231a so as to be pressed against the second seating portion 4211b while having a shape corresponding to the second seating portion 4211b. That is, the second protrusion portion 4231b may generally have a U shape.

In the embodiment of the present disclosure, the connection structure for a blade transport vehicle may further include a buffer pad 4213 or 4233 disposed between the seating groove 4211 and the protrusion block 4231 in order to reduce the abrasion of the contact surface between the seating groove 4211 and the protrusion block 4231.

Referring to FIG. 48, it can be seen that the buffer pad 4233 having elastic force is disposed on the protrusion block 4231 around the coupled portion of the protrusion block 4231 and the seating groove 4211 in the embodiment of the present invention.

When the protrusion block 4231 is pressed against and coupled to the seating groove 4211, the buffer pad 4233 is compressed therebetween so as to thereby improve the contact force between the protrusion block 4231 and the seating groove 4211. Thus, it is possible to more securely perform the contact between the protrusion block 4231 and the seating groove 4211 and to absorb vibration or shocks caused while the transport vehicle is traveling. Therefore, it is possible to reduce abrasion or fatigue failure between the protrusion block 4231 and the seating groove 4211, which are made of a steel material.

Referring to FIG. 49, it can be seen that the buffer pad 4213 is disposed on the seating groove 4211 around the coupled portion of the protrusion block 4231 and the seating groove 4211 in the embodiment of the present invention.

When the protrusion block 4231 is pressed against and coupled to the seating groove 4211, the buffer pad 4213 is compressed therebetween so as to thereby improve the contact force between the protrusion block 4231 and the seating groove 4211. Thus, similar to the above case, it is possible to improve the contact force between the protrusion block 4231 and the seating groove 4211 and to absorb vibration or shocks caused while the transport vehicle is traveling. Therefore, it is possible to reduce abrasion or fatigue failure between the protrusion block 4231 and the seating groove 4211, which are made of a steel material.

In the first embodiment of the present disclosure, since the separate seating groove 4211 and the protrusion block 4231 fitted into the seating groove 4211 are formed, it is possible to improve the fastening force between the base 4110 and the lower trailer 4160. In addition, the buffer pad 4213 or 4233 may prevent abrasion or fatigue failure of a portion of the upper or lower bracket 4210 or 4220 due to vibration or shock while the vehicle is traveling.

[Second Embodiment of Connection Structure for Blade Transport Vehicle]

Figure 50:
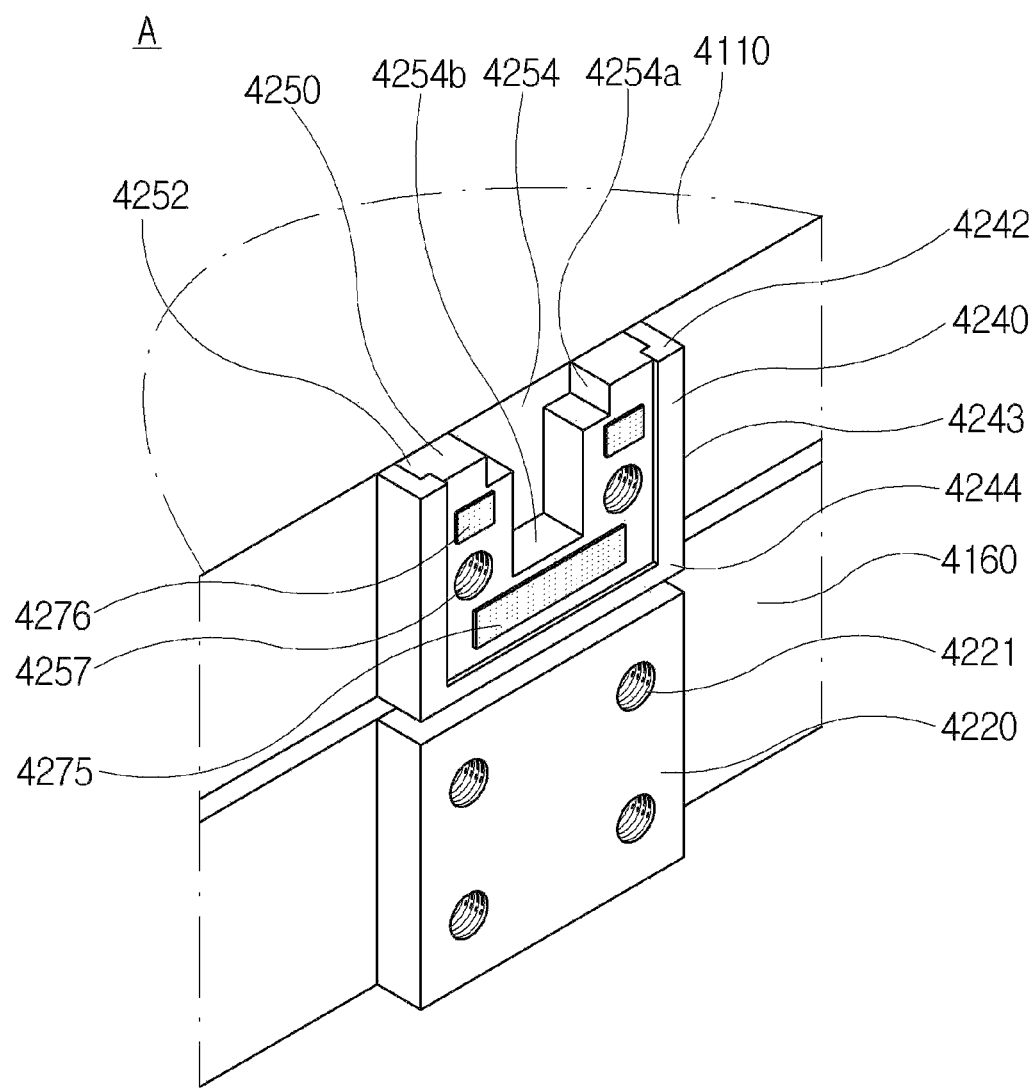
FIG. 50 is a view illustrating another embodiment of an upper bracket illustrated in FIG. 46.
Figure 51:
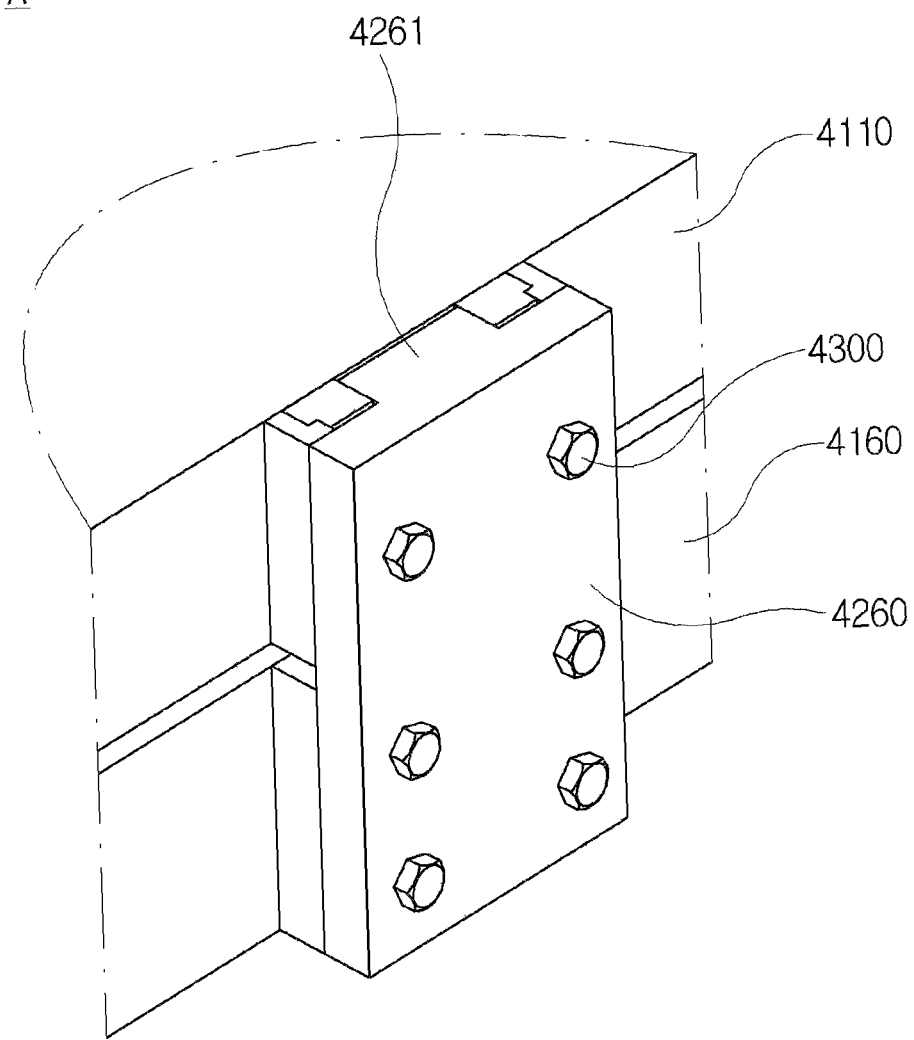
FIG. 51 is a view illustrating a second embodiment of a connection structure for a blade transport vehicle according to the present disclosure.
Figure 52:
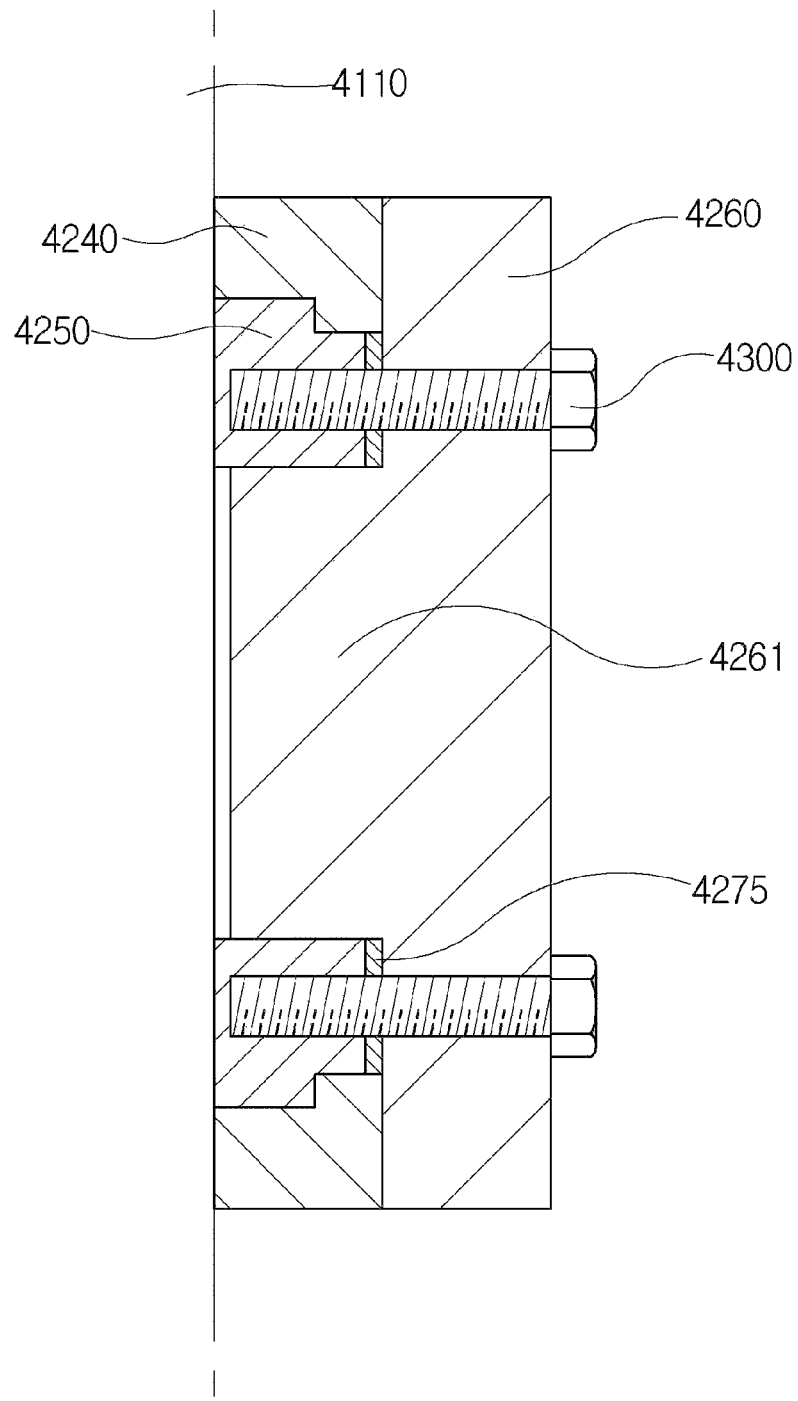
FIG. 52 is a view illustrating a second embodiment of a connection structure for a blade transport vehicle according to the present disclosure.
Figure 53:
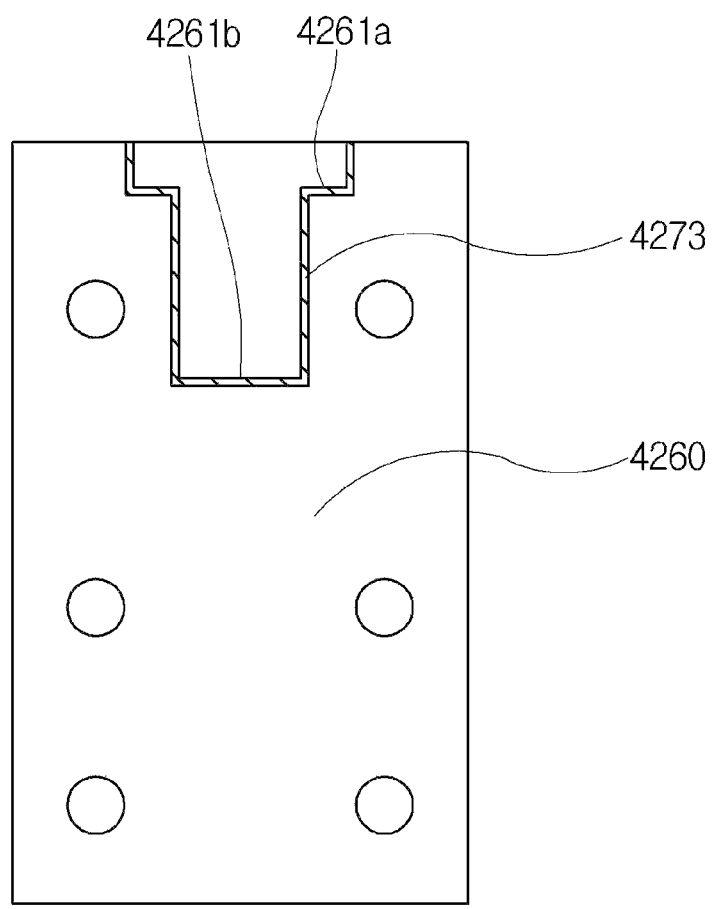
FIG. 53 is a view illustrating a connection plate illustrated in FIG. 51.

FIG. 44 is a view illustrating a connection structure for a blade transport vehicle according to the present disclosure. FIGS. 50 to 52 are views illustrating a second embodiment of a connection structure for a blade transport vehicle (A) according to the present disclosure. FIG. 53 is a view illustrating a connection plate illustrated in FIG. 51.

Referring to FIGS. 44 and 50 to 53, the connection structure for a blade transport vehicle according to the second embodiment of the present invention may include a support slot 4240, a lower bracket 4220, a fixed plate 4250, and a connection plate 4260.

The lower bracket 4220 may be disposed on the side of a lower trailer 4160 of a blade transport vehicle. The lower trailer 4160 forms the lower portion of the blade transport vehicle and has a plurality of wheels arranged in multiple rows in order to distribute the load applied to the blade and stably transport the blade.

The lower bracket 4220 may consist of a plurality of lower brackets arranged at predetermined intervals in the longitudinal direction of the vehicle along the upper side of the lower trailer 4160. The lower bracket 4220 may be fixed to the lower trailer 4160 by welding, but the present disclosure is not limited thereto. The lower bracket 4220 may have a rectangular flat shape and have four thread holes 4221.

The support slot 4240 may be disposed along the side of a base 4110 mounted to the upper end of the lower trailer 4160, and may have a fastening groove formed at the center thereof. The base 4110 may have a flat plate shape and be made of a steel material. The base 4110 may be coupled to the upper end of the lower trailer 4160 by bolting or welding.

A blade fixing frame 4120, an angle adjustment cylinder 4140, a slewing bearing unit 4155, and a blade adapter 4151 may be disposed at the upper end of the base 4110.

The blade fixing frame 4120 may be disposed on the base 4110, and have a pair of columns made of a steel material. The slewing bearing unit 4155 and the blade adapter 4151 may be mounted on the upper end of the blade fixing frame 4120. The angle adjustment cylinder 4140 may be connected to the slewing bearing unit 4155 between the pair of steel columns.

The slewing bearing unit 4155 may include a slewing bearing 4152 and a bearing block 4153. The slewing bearing 4152 is rotatably disposed in the bearing block 4153, and a turning drive 4154 is mounted to one end of the bearing block 4153 so as to rotate the slewing bearing 4152.

The blade adapter 4151 is mounted to one side of the slewing bearing 4152 and rotates along with the slewing bearing 4152 by the turning drive 4154. The blade adapter 4151 serves to fix a heavy blade mounted to a wind turbine.

The user may circumferentially adjust the angle of the blade mounted onto the blade adapter 4151 by rotating the slewing bearing 4152, and may vertically adjust the angle of the blade mounted onto the blade adapter 4151 by operating the angle adjustment cylinder 4140.

The support slot 4240 may consist of a plurality of support slots arranged in the longitudinal direction of the vehicle along the side of the base 4110, and may be disposed at a position corresponding to the lower bracket 4220. The support slot 4240 may include support beam 4243, a support plate 4244, and first extension portions 4242.

The support beams 4243 may consist of a pair of support beams arranged vertically at a predetermined interval on the base 4110 so as to support both sides of the fixed plate 4250. The distance between the support beams 4243 may correspond to the horizontal length of the fixed plate 4250. The support plate 4244 may connect the lower portions of the support beams 4243 so as to support the lower end of the fixed plate 4250. The first extension portions 4243 may protrude outward from the support beams 4243 so as to face each other, and may support the fixed plate 4250.

The fixed plate 4250 may have a seating groove 4254 formed at the center thereof, and the support slot 4240 may be fitted to fixed plate 4250. The fixed plate 4250 may include second extension portions 4252 which are formed at both sides on the contact surface with the base 4110 and pressed against the first extension portions 4242. The seating groove 4254 of the fixed plate 4250 may include a first seating portion 4254*a* which is formed at the upper side of the fixed plate 4250 and has a plane shape, and a second seating portion 4254*b* which is formed below the first seating portion 4254*a* and has a plane shape. Thread holes 4257 may be formed at both sides of the seating groove 4254.

The connection plate 4260 may have a protrusion block 4261 having a shape corresponding to the seating groove 4254 and may connect the fixed plate 4250 and the lower bracket 4220. The connection plate 4260 may have the same size as the contact area of the support slot 4240 and the lower bracket 4220, and may thus have a rectangular flat shape.

The protrusion block 4261 may be formed on the side of the connection plate 4260 facing the fixed plate 4250, and may include a first protrusion portion 4261*a* and a second protrusion portion 4261*b*.

The first protrusion portion 4261*a* may have a shape corresponding to the shape of the first seating portion 4254*a* so as to be pressed against the first seating portion 4254*a*. That is, the first protrusion portion 4261*a* may have a stepped shape. The second protrusion portion 4261*b* may be formed below the first protrusion portion 4261*a* so as to be pressed against the second seating portion 4254*b* while having a shape corresponding to the second seating portion 4254*b*. That is, the second protrusion portion 4261*b* may generally have a plane shape.

In the embodiment of the present disclosure, the connection structure for a blade transport vehicle may further include a first elastic pad 4273 disposed between the seating groove 4254 and the protrusion block 4261 in order to reduce the abrasion of the contact surface between the seating groove 4254 and the protrusion block 4261.

Referring to FIG. 53, it can be seen that the first elastic pad 4273 having elastic force is disposed on the protrusion block 4261 around the coupled portion of the protrusion block 4261 and the seating groove 4254 in the embodiment of the present invention.

When the protrusion block 4261 is pressed against and coupled to the seating groove 4254, the first elastic pad 4273 is compressed therebetween so as to thereby improve the contact force between the protrusion block 4261 and the seating groove 4254. Thus, it is possible to more securely perform the contact between the protrusion block 4261 and the seating groove 4254 and to absorb vibration or shocks caused while the transport vehicle is traveling. Therefore, it is possible to reduce abrasion or fatigue failure between the protrusion block 4261 and the seating groove 4254, which are made of a steel material.

In the embodiment of the present disclosure, the connection structure for a blade transport vehicle may further include second elastic pads 4275 and 4276 disposed between the fixed plate 4250 and the connection plate 4260 in order to reduce the abrasion of the contact surface between the fixed plate 4250 and the connection plate 4260.

Referring to FIG. 50, it can be seen that the second elastic pads 4275 and 4276 are disposed on the surface of the fixed plate 4250 facing the connection plate 4260 in the embodiment of the present invention. Specifically, the second elastic pad 4275 having a relatively large size is disposed below the thread holes 4257 and the second elastic pad 4276 having a relatively small size is disposed above the thread holes 4257.

When the connection plate 4260 is fastened to the fixed plate 4250 using bolts 4300, the second elastic pad 4275 is compressed between the fixed plate 4250 and the connection plate 4260. Thus, the contact force between the fixed plate 4250 and the connection plate 4260 is improved by the elastic restoring force of the second elastic pad 4275. In addition, since the second elastic pads 4275 and 4276 absorb vibration or shocks caused while the transport vehicle is traveling, it is possible to reduce abrasion or fatigue failure between the fixed plate 4250 and the connection plate 4260, which are made of a steel material.

Through the above structure, it is possible to improve the fastening force between the base 4110 and the lower trailer 4160 by forming the separate seating groove 4254 and the protrusion block 4261 fitted into the seating groove 4254. In addition, the first and second elastic pads 4273, 4275, and 4276 may prevent abrasion or fatigue failure of a portion of the fixed plate 4250 or the lower bracket 4220 due to vibration or shock while the vehicle is traveling.

In the second embodiment of the present disclosure, the support slot 4240 may be separated from the fixed plate 4250. Accordingly, when abrasion or fatigue failure occurs in the seating groove 4254 of the fixed plate 4250 due to use for a long time, the user may separate only the fixed plate 4250 and replace it with a new product. Therefore, it is possible to reduce replacement costs. Since only the support slot 4240 is fixed to the side of the base 4110 and the fixed plate 4250 itself is detachably fitted thereto, it is possible to easily replace the fixed plate and reduce the work load of the operator.

As is apparent from the above description, in accordance with the present disclosure, it is possible to prevent a blade transport vehicle from overturning due to the weight of a blade on a slope by changing the position of a blade adapter in all directions using a hydraulic cylinder or a rack and pinion gearing.

Since a separate balance block for adjusting the center of gravity of the transport vehicle is disposed therein, it is possible to relieve the load applied to the transport vehicle in a specific direction by changing the position of the balance block or automatically changing the position of the balance block in response to the movement of the blade adapter.

Since the hydraulic cylinder is disposed on a base disposed at the lower trailer of the blade transport vehicle, it is possible to properly balance the load which is partially transferred to the vehicle due to the weight of the blade by adjusting the angle of arrangement of the blade adapter according to the gradient of the road.

It is possible to check the state of the blade during transport in real time by measuring the wind direction and speed applied to the blade, the rolling acceleration of the blade, and the angle of arrangement of the blade while the blade is transported by the vehicle.

When the wind direction and speed, the rolling acceleration, and the angle of arrangement reach preset limit values, the measured values are converted into an amount of hydraulic pressure or an angle value, and thus the position of the blade can be properly adjusted during transport by operating the hydraulic cylinder or the slewing bearing based on the converted values.

It is possible to secure safety of blade transport in a sharp curve section, a tunnel, a pedestrian overpass, a slope, or the like by arranging a plurality of hydraulic cylinders at predetermined intervals along the circumference of the blade adapter such that the arrangement position of the blade is minutely adjusted.

It is possible to assure the quality and performance of the blade since the contact of the blade with various obstacles and thus damage on the blade according to the road situations are prevented while the vehicle is traveling.

Since a groove is formed in a bracket disposed at the upper end of the vehicle while a protrusion is formed on a connection plate connecting upper and lower ends and they are bolted to each other so as to be engaged therewith, it is possible to reinforce the connection state from the vibration, swing, or external shocks of the vehicle and to improve the stiffness of the fastening device itself, compared to conventional bolting methods.

Since a contact buffer pad is disposed on the groove in the bracket, on the protrusion on the connection plate, or between the bracket and the connection plate, the buffer pad can absorb the vibration, swing, or external shocks of the vehicle. In addition, it is possible to prevent abrasion occurring in the bracket, the connection plate, or the bolts which are made of a steel material, or to prevent damage due to consistent shocks.

Although the present invention has been described with respect to the illustrative embodiments of the blade transport vehicle, it will be apparent to those skilled in the art that various variations and modifications may be made without departing from the spirit and scope of the disclosure as defined in the following claims.

What is claimed is:

1. A blade transport vehicle, comprising:
a lower trailer;
a base disposed at an upper end of the lower trailer;

a blade fixing frame disposed on the base;
a first moving device disposed at an upper end of the base and operable to move the blade fixing frame in a longitudinal direction of the base;
a second moving device disposed at an upper end of the first moving device and operable to move the blade fixing frame in a width direction of the base;
a third moving device disposed at the upper end of the base;
a fourth moving device disposed at an upper end of the third moving device; and
a balance block spaced apart from the blade fixing frame and disposed on the base, the balance block configured to be moved by the third moving device in the longitudinal direction of the base and configured to be moved by the fourth moving device in the width direction of the base.

2. The blade transport vehicle according to claim 1, wherein the first moving device includes:
a first guide rail disposed at the upper end of the base and arranged in the longitudinal direction;
a first plate coupled to the first guide rail; and
a first drive unit operable to move the first plate, the first drive unit being disposed at the upper end of the base and coupled to an end of the first plate.

3. The blade transport vehicle according to claim 2, wherein the first drive unit includes a hydraulic cylinder.

4. The blade transport vehicle according to claim 2, wherein the second moving device includes:
a second guide rail disposed at an upper end of the first plate and arranged in the width direction of the base;
a second plate coupled to the second guide rail to support the blade fixing frame; and
a second drive unit operable to move the second plate, the second drive unit being disposed at an upper end of the second plate.

5. The blade transport vehicle according to claim 4, wherein the second drive unit includes a hydraulic cylinder.

6. The blade transport vehicle according to claim 1, wherein the third moving device includes:
a third guide rail disposed at the upper end of the base and arranged in the longitudinal direction;
a third plate coupled to the third guide rail; and
a third drive unit operable to move the third plate, the third drive unit being disposed at the upper end of the base and coupled to one end of the third plate.

7. The blade transport vehicle according to claim 6, wherein the fourth moving device includes:
a fourth guide rail disposed at an upper end of the third plate and arranged in the width direction of the base;
a fourth plate coupled to the fourth guide rail to support the balance block; and
a fourth drive unit operable to move the fourth plate, the fourth drive unit being disposed at an upper end of the fourth plate.

8. A blade transport vehicle, comprising:
a lower trailer;
a base disposed at an upper end of the lower trailer;
a blade fixing frame disposed on the base, the blade fixing frame configured to be moved in a longitudinal direction of the base and in a width direction of the base;
a first moving device disposed at an upper end of the base;
a second moving device disposed at an upper end of the first moving device; and
a balance block spaced apart from the blade fixing frame and disposed on the base, the balance block configured to be moved by the first moving device in the longitudinal direction of the base and configured to be moved by the second moving device in the width direction of the base.

9. The blade transport vehicle according to claim 8, further comprising a third moving device disposed at an upper end of the base and operable to move the blade fixing frame in the longitudinal direction of the base, the third moving device including:
a first guide rail disposed at the upper end of the base and arranged in the longitudinal direction;
a first plate coupled to the first guide rail; and
a first drive unit operable to move the first plate, the first drive unit being disposed at the upper end of the base and coupled to an end of the first plate.

10. The blade transport vehicle according to claim 9, further comprising a fourth moving device disposed at an upper end of the third moving device and operable to move the blade fixing frame in the width direction of the base, the fourth moving device including:
a second guide rail disposed at an upper end of the first plate and arranged in the width direction of the base;
a second plate coupled to the second guide rail to support the blade fixing frame; and
a second drive unit operable to move the second plate, the second drive unit being disposed at an upper end of the second plate.

11. The blade transport vehicle according to claim 8, wherein the first moving device comprises:
a first guide rail disposed at the upper end of the base and arranged in the longitudinal direction;
a first plate coupled to the first guide rail; and
a first drive unit operable to move the first plate, the first drive unit being disposed at the upper end of the base and coupled to one end of the first plate.

12. The blade transport vehicle according to claim 11, wherein the second moving device comprises:
a second guide rail disposed at an upper end of the first plate and arranged in the width direction of the base;
a second plate coupled to the second guide rail to support the balance block; and
a second drive unit operable to move the second plate, the second drive unit being disposed at an upper end of the second plate.

13. A vehicle for transporting a blade, the vehicle comprising:
a lower trailer;
a base disposed at an upper end of the lower trailer;
a first moving device disposed at an upper end of the base;
a second moving device disposed at an upper end of the first moving device; and
a balance block disposed on the base and configured to be moved by the first moving device in a longitudinal direction of the base and configured to be moved by the second moving device in a width direction of the base.

14. The vehicle according to claim 13,
wherein the balance block includes a weight, and
wherein the first and second moving devices are configured to move the weight of the balance block to prevent the vehicle from overturning by performing a balance function in correspondence to a weight of the blade.

15. The vehicle according to claim 13, further comprising:
a blade fixing frame disposed on the base; and
a third moving device disposed at the upper end of the base and operable to move the blade fixing frame in the longitudinal direction of the base,
wherein the balance block is spaced apart from the blade fixing frame in the longitudinal direction of the base.

16. The vehicle according to claim 15,
wherein the balance block is disposed at a position rearward of the blade fixing frame, and
wherein the first moving device is configured to move the balance block to adjust a center of gravity of the vehicle in response to movement of the blade fixing frame.

17. The vehicle according to claim 15,
wherein the first moving device includes:
- a first guide rail disposed at the upper end of the base and arranged in the longitudinal direction;
- a first plate coupled to the first guide rail; and
- a first drive unit operable to move the first plate, the first drive unit being disposed at the upper end of the base and coupled to one end of the first plate, wherein the balance block is disposed at a position rearward of the blade fixing frame to adjust a center of gravity of the vehicle; and
wherein the center of gravity of the vehicle is adjusted by driving the first drive unit to change the position of the balance block forward or rearward along the first guide rail in order to move the first plate in the longitudinal direction of the base.

\* \* \* \* \*